US006281881B1

(12) United States Patent
Siddiqui et al.

(10) Patent No.: US 6,281,881 B1
(45) Date of Patent: Aug. 28, 2001

(54) SYSTEM AND METHOD OF ADJUSTING DISPLAY CHARACTERISTICS OF A DISPLAYABLE DATA FILE USING AN ERGONOMIC COMPUTER INPUT DEVICE

(75) Inventors: Kabir Siddiqui, Redmond; Aditha M. Adams, Seattle; Carl Ledbetter, Lynnwood; Todd Holmdahl, Bothell, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/182,603

(22) Filed: Oct. 29, 1998

Related U.S. Application Data

(63) Continuation of application No. 08/614,147, filed on Mar. 12, 1996, which is a continuation of application No. 08/583,650, filed on Jan. 5, 1996, now abandoned.

(51) Int. Cl.$^7$ ....................................................... G09G 5/08
(52) U.S. Cl. .............................................................. 345/164
(58) Field of Search .................................... 345/123, 145, 345/156, 157, 163, 164, 165, 166, 168, 184, 162, 158

(56) References Cited

U.S. PATENT DOCUMENTS

Re. 32,633   3/1988  Hovey et al. .

(List continued on next page.)

FOREIGN PATENT DOCUMENTS 42 11 189 A1   10/1993   (DE) .

(List continued on next page.)

OTHER PUBLICATIONS

*Computer Products*, Selected Pages, Oct. 1990.
Lewis, Peter H., "Building a Better Mouse," *San Jose Merc. News*, Feb. 3, 1991.

(List continued on next page.)

Primary Examiner—Chanh Nguyen
(74) Attorney, Agent, or Firm—Westman, Champlin & Kelly, P.A.

(57) ABSTRACT

An ergonomic pointing device, such as a mouse, includes a wheel to provide an input signal in addition to X and Y position signals provided by a rotatable ball of a standard mouse. The wheel extends from an upper surface of the pointing device and may be rotated and depressed by the finger of the user, the wheel being positioned and configured to allow a user to activate the wheel while maintaining a finger in a biomechanically neutral position. The wheel and associated structure, as well as the forces required to rotate and depress the wheel, are configured to reduce inadvertent actuation and to provide a user with tactile feedback, thereby allowing the user to accurately and intuitively activate the pointing device without exceeding an acceptable extension and range of motion for the user's finger and wrist.

The mouse is coupled to a computer having a visual display device. The computer is capable of displaying a data file such as a word processing or spreadsheet document, where the data file has adjustable display characteristics such as size (zoom) or data structure (content). As a user rotates the roller, the mouse generates computer signals that are interpreted by an operating system and software applications running on the computer. The signals generated by the roller, together with a given software application, can be used in at least two ways: spatial navigation and data navigation. In spatial navigation, a user rotates the roller to cause the computer and the visual display to zoom into and out of the document and thereby display increasing or decreasing magnification levels of the document on the display. Other modes of spatial navigation allow the user to activate a roller switch, depress special function keys on a keyboard and/or move the mouse to pan, automatically scroll or manually scroll through the document. In data navigation, the user rotates the roller to view differing levels of content or detail with respect to the document.

34 Claims, 29 Drawing Sheets

U.S. PATENT DOCUMENTS

| | | |
|---|---|---|
| D. 291,318 | 8/1987 | Kim . |
| D. 302,426 | 7/1989 | Bradley et al. . |
| D. 328,596 | 8/1992 | Manabe . |
| D. 328,597 | 8/1992 | Clouss . |
| D. 335,874 | 5/1993 | Chen . |
| D. 340,923 | 11/1993 | Tso . |
| D. 349,280 | 8/1994 | Kaneko . |
| D. 349,493 | 8/1994 | Cheng . |
| D. 362,431 | 9/1995 | Kaneko et al. . |
| 3,643,148 | 2/1972 | Brown et al. . |
| 3,835,464 | 9/1974 | Rider . |
| 3,987,685 | 10/1976 | Opocensky ......................... 74/471 R |
| 4,180,860 | 12/1979 | Driscoll et al. . |
| 4,464,652 | 8/1984 | Lapson et al. . |
| 4,514,726 | 4/1985 | Whetstone et al. . |
| 4,533,830 | 8/1985 | Beauprey . |
| 4,538,476 | 9/1985 | Luque ................................... 74/471 |
| 4,550,316 | 10/1985 | Whetstone et al. . |
| 4,559,532 | 12/1985 | Hosogoe . |
| 4,562,314 | 12/1985 | Hosogoe et al. . |
| 4,573,925 | 3/1986 | Styers . |
| 4,581,761 | 4/1986 | Ichinokawa et al. . |
| 4,613,853 | 9/1986 | Hosogoe et al. . |
| 4,698,626 | 10/1987 | Sato et al. . |
| 4,782,335 | 11/1988 | Gussin . |
| 4,786,768 | 11/1988 | Langewis et al. . |
| 4,786,892 | 11/1988 | Kubo et al. . |
| 4,823,634 | 4/1989 | Culver ............................. 74/471 XY |
| 4,862,165 | 8/1989 | Gart . |
| 4,917,516 | 4/1990 | Retter .................................. 400/489 |
| 5,157,381 | 10/1992 | Cheng . |
| 5,186,629 | 2/1993 | Rohen ................................ 434/114 |
| 5,204,947 | 4/1993 | Bernstein et al. . |
| 5,252,970 | 10/1993 | Baronowsky . |
| 5,298,919 | 3/1994 | Chang ................................. 345/163 |
| 5,313,230 | 5/1994 | Venolia et al. ....................... 345/163 |
| 5,414,445 | 5/1995 | Kaneko et al. ...................... 345/163 |

FOREIGN PATENT DOCUMENTS

| | | |
|---|---|---|
| 0 403 782 | 12/1990 | (EP) . |
| 0 531 829 A1 | 3/1993 | (EP) . |
| 0 609 819 A1 | 8/1994 | (EP) . |
| 1100620 | 4/1989 | (JP) . |
| 3184118 | 12/1991 | (JP) . |
| WO 93/03475 | 2/1993 | (WO) . |
| WO 93/11526 | 6/1993 | (WO) . |
| 5,446,481 | 8/1995 | Gillick et al. . |

OTHER PUBLICATIONS

Tessler, Franklin N., "Input Alternatives; How–and why–to choose a better pointing device," *Macworld*, pp. 154–159, Jun. 1992.

Gruman, Galen, "What Price Mice?", *Infoworld*, pp. 53–55, 58–59, Apr. 23, 1990.

Gruman, Galen and Raphael Needleman, "Graphical Interfaces Spur the Development of Alternative Input Devices," *Infoworld*, p. 72, Apr. 23, 1990.

Lusty, Susan and Lincoln Spector, "Keyboards, Mice, and Trackballs With the Personal Touch," *PC World*, pp. 166–170, Jun. 1990.

ProAgio!, by Mouse Systems Corporation, Product Brochure, 1995.

MacDonald, Stephen, "Tiny Mouse Holds Many Design Problems," *The Wall Street Journal*, Jul. 8, 1988, p. 15, cols. 1–2.

"Consumer Products," 1988 Annual Design Review, pp. 107, 194–195, 12, 207.

Rice, Lorraine, "Mice vs. Trackballs: The Anatomy of a Choice," *PC Magazine*, Aug. 1990, pp. 216–217.

"Alternate Input, Mice and Trackballs," *PC Magazine*, Aug. 1990, 4 pages.

Stanton, Tom, "From Our Maus to Baumaus: Logitech vs. Microsoft," *PC Magazine*, Feb. 16, 1988, pp. 201–202, 204, 206, 210–211, 216–217, 219.

Hodes, Diane and Kenichi, "Study, Development, and Design of a Mouse," *Proceedings of the Human Factors Society—30th Annual Meeting*, pp. 900–904, 1986.

Lewis, James R. and Pedro, Alfonso, "Developing the IBM Personal System/2 Mouse: An Industrial Design/Human Factors Collaboration," *Proceedings of Interface 89*, pp. 263–267, 1989.

"Makers offer a diverse range of mice," *Computer Products*, pp. 176–184, 196–208, 220–226 & 238–242, Oct. 1990.

"EasyScroll: A Giant Leap in Windows Productivity!!" , by Genius, Product Brochure, 1995.

Series/2 Mouse, Logitech, 2 pages, 1988.

Mack, Robert and Frank Montaniz, "A Comparison of Touch and Mouse Interaction Techniques for a Graphical Windowing Software Environment," *Proceedings of the Human Factors Society*, $35^{th}$ Annual Meeting, 1991, pp. 286–289.

EasyScroll–II, "A Giant Leap in Windows Productivity," 400 DPI Serial Mouse with Scroll–Roller, Genius, Product Brochure, 4 pages, 1995.

Sicos Mouse, Natürliche Maus–Bedienun, Sicos Computer—Zubehor, Product Brochure, 1 page, 1993.

Mosley, J. D., "Low–Cost Trackball Offers 3–D I/O Control For CAE," *EDN*, Mar. 18, 1987, p. 116.

Holtzman, Jeff, "Four Surrogate Mice," *Byte*, Aug. 1988, pp. 173–174, 176, 178, 180.

Puglia, Vincent and Mike Falkner, "Analyzing Data From All The Angles," *PC Magazine*, Oct. 27, 1987, pp. 141–146, 148–152.

"Peripheral hardware," *Machine Design, CAD/CAM Reference Issue*, No. 14:71, Jun. 16, 1988.

Grabowski, Ralph, "Z Mouse Gives CAD Designers 3–D control", *Infoworld*, p. 93, Jul. 13, 1992.

"Mouse Device for Inputting Direction on 2D Screen," *IBM Technical Disclosure Bulletin* 35(4B):p. 348, Sep. 1992.

"Depth/Force Capability for Mouse Pointing Devices," *2244 Research Dislosure 342*, 1 page, Oct. 1992.

Venolia, Dan, "Facile 3D Direct Manipulation," *Interchi '93*, pp. 31–36, Apr. 1993.

"The Evolving Mouse," *PC Magazine*, p. 250, Jan. 11, 1994.

FastTRAP for IBM Personal Computers and 100% Compatibles, MicroSpeed, Inc., 6 pages, 1987.

"Method to Select and Manipulate the Plane on a 3–D Object in an Interactive Draw Graphics Systems," *Research Disclosure*, p. 434, Sep. 1985.

"Method for Controlling the Direction and Amount of Stretch Dynamically," *Research Disclosure*, p. 434, Sep. 1985.

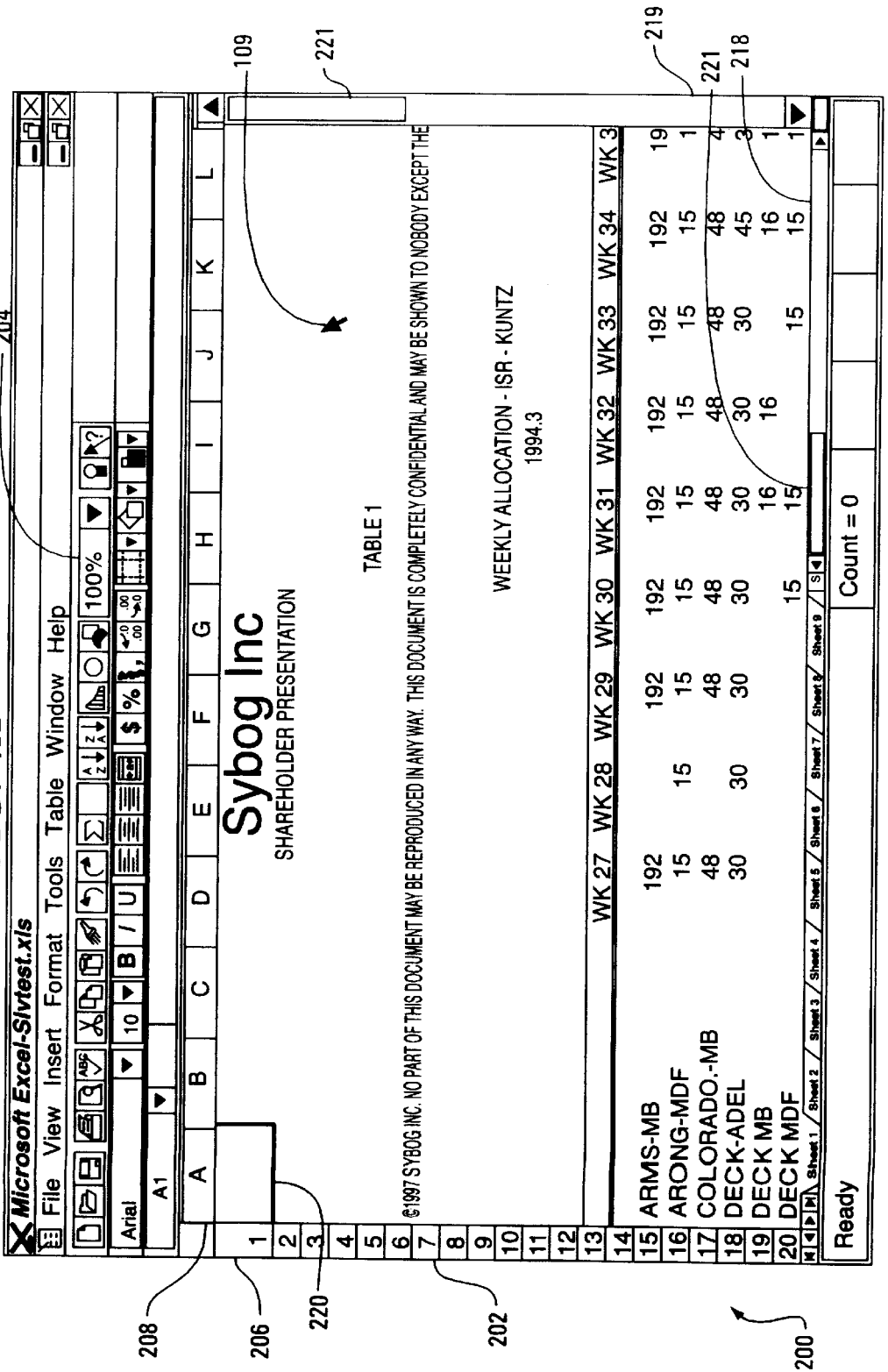

*Microsoft Excel-Slvtest.xls*

File  View  Insert  Format  Tools  Table  Window  Help

Arial  10  Z15  1720

| | W | X | Y | Z | AA | AB | AC | AD | AE |
|---|---|---|---|---|---|---|---|---|---|
| 3 | ASST. SUPERINTENDENT, ADULT & CONTINUING EDUCATION | | | | | | | | |
| 4 | | | | | | | | | |
| 5 | | | | | | | | TABLE 3 | |
| 6 | | | | | | | | | |
| 7 | | | | | | | | | ORIGINAL WORKING BUDGET |
| 8 | LCC | LN | PROG | BJ. | CLASESCRITION | | | | |
| 9 | | | | | | | | | |
| 10 | | | 6200 | | OFFICE OF THE ASSISTANT SUPERINTENDENT | | | | |
| 11 | | | | | SALARIES AND BENEFITS | | | | |
| 12 | 003942 | | | 1720.00 | ASST. SUPERINTENDENT | | | | $1,000.00 |
| 13 | 000537 | | | 1990.00 | ASST. SUPERINTENDENT (67%) | | | | 2,000.00 |
| 14 | 000538 | | | 2301.00 | OTHER CERTIFICATED | | | | 4,500.00 |
| 15 | 002489 | | | 2303.00 | CLERICAL - REGULAR | | | | 6,000.00 |
| 16 | 000539 | | | 2940.00 | CLERICAL - OVERTIME | | | | 7,750.00 |
| 17 | 000540 | | | 2990.00 | STUDENT WORKERS | | | | 9,500.00 |
| 18 | | | | 3000.00 | OTHER CLASSIFIED | | | | 11,250.00 |
| 19 | | | | | EMPLOYEE BENEFITS | | | | |
| 20 | | | | | | | | | $1,000.00 |
| 21 | | | | | SUPPLIES AND OTHER EXPENDI" | | | | |
| 22 | 000542 | | | 4510.00 | PAPER-NON-INSTRUCTIONS | | | | |

Sheet 1 / Sheet 2 / Sheet 3 / Sheet 4 / Sheet 5 / Sheet 6 / Sheet 7 / Sheet 8 / Sheet 9

Ready     Count = 1

| | A | B | C | D | E | F | G | H | I | J | K |
|---|---|---|---|---|---|---|---|---|---|---|---|
| 958 | | | NORTH TOTAL | | 202 | | 86346 | | | | |
| 959 | | | SOUTH TOTAL | | 110 | | 38626 | | | | |
| 964 | | | EAST TOTAL | | 152 | | 78819 | | | | |
| 969 | | | WEST TOTAL | | 196 | | 108533 | | | | |
| 970 | | OCTOBER TOTAL | | | 660 | | 312324 | | | | |
| 975 | | | NORTH TOTAL | | 269 | | 64425 | | | | |
| 980 | | | SOUTH TOTAL | | 164 | | 80718 | | | | |
| 985 | | | EAST TOTAL | | 201 | | 78270 | | | | |
| 990 | | | WEST TOTAL | | 228 | | 54470 | | | | |
| 991 | | NOVEMBER TOTAL | | | 862 | | 227883 | | | | |
| 996 | | | NORTH TOTAL | | 178 | | 115295 | | | | |
| 1001 | | | SOUTH TOTAL | | 163 | | 98766 | | | | |
| 1006 | | | EAST TOTAL | | 171 | | 70810 | | | | |
| 1011 | | | WEST TOTAL | | 234 | | 96900 | | | | |
| 1012 | | DECEMBER TOTAL | | | 746 | | 381771 | | | | |
| 1013 | 1993 TOTAL | | | | 8842 | | 3772436 | | | | |
| 1266 | 1994 TOTAL | | | | 8842 | | 3772436 | | | | |
| 1267 | | | GRAND TOTAL | | 44210 | | 18862180 | | | | |
| 1268 | | | | | | | | | | | |
| 1269 | | | | | | | | | | | |
| 1270 | | | | | | | | | | | |
| 1271 | | | | | | | | | | | |
| 1272 | | | | | | | | | | | |
| 1273 | | | | | | | | | | | |

Formula bar: =SUBTOTAL(9,G761:G1010)

Cell: G1013

FIG. 7D

| | A | B | C | D | E | F | G | H | I | J | K |
|---|---|---|---|---|---|---|---|---|---|---|---|
| 254 | 1990 TOTAL | | | | 8842 | | 3772436 | | | | |
| 507 | 1991 TOTAL | | | | 8842 | | 3772436 | | | | |
| 760 | 1992 TOTAL | | | | 8842 | | 3772436 | | | | |
| 765 | | | NORTH TOTAL | | 157 | | 76550 | | | | |
| 770 | | | SOUTH TOTAL | | 253 | | 129990 | | | | |
| 775 | | | EAST TOTAL | | 96 | | 52528 | | | | |
| 780 | | | WEST TOTAL | | 171 | | 95973 | | | | |
| 781 | | JANUARY TOTAL | | | 677 | | 35504 | | | | |
| 786 | | | NORTH TOTAL | | 233 | | 103923 | | | | |
| 791 | | | SOUTH TOTAL | | 218 | | 58187 | | | | |
| 796 | | | EAST TOTAL | | 217 | | 112718 | | | | |
| 801 | | | WEST TOTAL | | 76 | | 18693 | | | | |
| 802 | | FEBRUARY TOTAL | | | 744 | | 293521 | | | | |
| 807 | | | NORTH TOTAL | | 102 | | 22747 | | | | |
| 812 | | | SOUTH TOTAL | | 271 | | 115005 | | | | |
| 817 | | | EAST TOTAL | | 166 | | 50281 | | | | |
| 822 | | | WEST TOTAL | | 193 | | 77645 | | | | |
| 823 | | MARCH TOTAL | | | 732 | | 265678 | | | | |
| 828 | | | NORTH TOTAL | | 202 | | 86346 | | | | |
| 833 | | | SOUTH TOTAL | | 110 | | 38626 | | | | |
| 838 | | | EAST TOTAL | | 152 | | 78819 | | | | |
| 843 | | | WEST TOTAL | | 196 | | 108533 | | | | |
| 844 | | APRIL TOTAL | | | 660 | | 312324 | | | | |
| 849 | | | | | 260 | | 6425 | | | | |

Count = 1

SYSTEM AND METHOD OF ADJUSTING DISPLAY CHARACTERISTICS OF A DISPLAYABLE DATA FILE USING AN ERGONOMIC COMPUTER INPUT DEVICE

CROSS-REFERENCE TO PRIOR APPLICATION

This application is a continuation of application Ser. No. 08/614,147, filed Mar. 12, 1996, and which is a continuation-in-part of U.S. patent application Ser. No. 08/583,650, filed on Jan. 5, 1996, now abandoned.

TECHNICAL FIELD

The present invention relates to the field of systems and methods for receiving input signals from computer input devices such as an ergonomically designed pointing device and providing such signals as user commands to a computer to adjust displayable data files such as documents.

BACKGROUND OF THE INVENTION

Various computer input devices are currently employed to provide a variety of input signals to computers for certain applications. For example, keyboards are an ideal method of inputting alphanumeric characters to the computer for most applications. Joysticks, often used with computer games, provide two-dimensional position signals based on wrist movement. Joysticks provide a particularly intuitive way of providing position signals that correspond to movement either within the plane of the computer screen, or movement perpendicular to the plane of the computer screen (i.e., virtual movement into and out of the screen). Joysticks, however, are bulky and at times awkward, particularly when used in a business setting.

In contrast, most computer pointing devices, such as mice and trackballs, are less bulky. Mice and trackballs both include a housing partially enclosing a rotatable ball and have one or more actuatable buttons. Electronic encoders sense the rotation of the ball and generate signals ("counts") that indicate the ball's rotation. The counts are used to control the magnitude and direction of two-dimensional movement of a cursor or pointer on a display screen of the computer. Such mice, however, provide only two position signals corresponding to two-dimensional movement.

U.S. Pat. Nos. 5,298,919 to Chang and 5,313,230 to Venolia et al. describe mice capable of providing three-dimensional position signals that permit the illusory positioning of the cursor in three-dimensional space on a two-dimensional video display device. The patents describe mouse-input devices having a rotatable ball and a thumb-wheel for providing input signals representing three-dimensional movement.

The devices disclosed by Chang and Venolia et al. teach providing only three-dimensional position signals to a computer. As noted, standard mice and trackballs provide only two-dimensional position signals to a computer. There is a need, however, for a more robust input system for providing various input signals to a computer to control not only three-dimensional positions of an object, but other options or attributes for that object.

Several of such currently available pointing devices for providing multiple input signals to a computer have disadvantages, however, in that they are uncomfortable or difficult to use, especially for relatively long periods of time. This may manifest itself in several ways, for example, the finger or hand of a user may feel tired after operating the pointing device for any length of time. Therefore, a need exists for a pointing device for providing multiple input signals to a computer that is more comfortable and easy to use.

SUMMARY OF THE INVENTION

A U.S. patent application by one of the coinventors entitled "3-D Cursor Positioning Device," Ser. No. 08/467,549, filed Jun. 6, 1995, which is a continuation of Ser. No. 08/178,524, filed Jan. 6, 1994 (now U.S. Pat. No. 5,473,344), is assigned to the assignee of the present application. This application describes an input device for a computer that has a rotatable ball coupled with first and second transducers to produce first and second signals indicating rotation of the ball as with standard mice and trackballs. The input device also includes a roller protruding from the top or side of the device which is coupled to a third transducer for providing a third signal that indicates rotation of the roller. The third signal can be used not only for providing a third position signal, but also can be used to control a non-positional characteristic of an item displayed on a computer's visual display. The displayed item or "video object" can be a cursor, graphic, or other image or graphical data represented on the visual display. The first and second input signals can be used as standard position signals to position a cursor on a selected video object, while the roller can be rotated to provide the third signal that adjusts a characteristic "appearance" of the video object, such as the size, color, style, font, border, arrangement, brightness, etc. of the object.

The input device of the application is also directed to a system for selecting one of several overlapping windows or "plys." Typical methods of selecting one of several overlapping plys requires users to position the cursor on the desired ply and clicking the mouse to select that ply. The device in the application is directed to a system that allows the third signals produced by rotation of the roller to scroll through and select one of several overlapping plys (i.e., windows), where at least one of the plys is capable of fully obscuring at least some of the other plys. Each of the several plys corresponds to a predetermined amount of rotation of the rotatable roller. A computer is responsive to the third signal to determine a user selected amount of rotation of the roller so as to scroll through and select a visually obscured ply with the predetermined amount of rotation that corresponds to the user's selected amount of rotation and thereby display a selected ply.

As explained above, pointing devices typically provide two-dimensional position signals to a computer. Certain pointing devices allow three or more signals to be input to a computer to permit illusory positioning of a cursor in three-dimensional space on a two-dimensional visual display. The above-described application also describes the third signal to control the non-positional aspect or "appearance" of a selected object displayed on the visual display, or to select one of several overlapping plys.

Improving upon the device and system of the coinventor's prior application, a similar user input device such as a mouse is preferably coupled to a computer having a visual display device. The computer is capable of displaying a data file such as a word processing document or a spreadsheet document, where the data file has adjustable display characteristics such as size (zoom) or data structure (content). As the user rotates the roller, the mouse generates roller signals that are interpreted by the computer. The roller signals, together with a given application, can preferably be used in at least two inventive techniques for navigating through a document: "spatial navigation" and "data navigation."

There are at least five modes of spatial navigation. In the first mode, a user preferably rotates the roller to cause the computer and display device to adjust the magnification of the data file or document being displayed, and thereby zoom into and out of the document. For example, in a word processing document, a user can rotate the roller in one direction to zoom out from displaying only a portion of a page of the document to displaying several complete pages of the document simultaneously on the display device.

In a second spatial navigation mode, the user can rotate the roller or move the mouse to pan through the document in a selected direction. The panning mode is particularly suited for a large two dimensional document whose length and width are much greater than the size of the display device. In a third spatial navigation mode, the user can initially rotate the roller or move the mouse to cause the document to automatically and continuously scroll in a direction and at a rate based upon the initial rotation of the roller or movement of the mouse without the need for additional user input. As a result, the automatic scroll mode frees the user's hands to perform additional tasks.

In a fourth spatial navigation mode, the user can continually rotate the roller to navigate through the document to scroll up or down through a lengthy document. In a fifth spatial navigation mode, the user can rotate the roller or move the mouse to scroll through a document using scroll bars provided in a window display in the document.

Under the data navigation technique, the user can rotate the roller to view differing levels of content or detail with respect to a data file whenever data is grouped into hierarchical or logical structures. For example, in a spreadsheet document, the user can rotate the roller to thereby produce signals to the computer, which in turn change the display from daily totals to weekly, monthly, and finally annual totals during full rotation of the roller. As a result, by simply rotating the roller, a user can hide or suppress the display of detailed data for a given document such as a spreadsheet. Actuation of a special function key on a keyboard, or actuation of a switch associated with the roller, is preferably used to select between the spatial and data navigation techniques and between each of the different modes of spatial navigation (as described below).

Overall, the present invention provides the ability to quickly navigate through a document by displaying a high-level representation of the document on the display device, possibly the entire document simultaneously, to locate a desired location in the document, rather than having to repeatedly depress page down/page up or cursor movement keys on a keyboard or using scroll bars in MICROSOFT® WINDOWS® applications. The present invention also provides an ability to move from a detailed view of the data or content of a document up to a summary view of the data whenever data can be grouped into higher level categories. The present invention is particularly applicable to various software applications including word processor applications such as MICROSOFT® WORD®, spreadsheet applications such as MICROSOFT® EXCEL®, database applications such as MICROSOFT® ACCESS®, file management applications such as MICROSOFT® EXPLORER®, time management applications such as MICROSOFT® SCHEDULE PLUS®, project planning applications such as MICROSOFT® PROJECT®, presentation design and planning applications such as MICROSOFT® POWER POINT®, and navigation applications for the Internet or other distributed networks such as MICROSOFT® INTERNET EXPLORER®.

In a broad sense, an embodiment of the present invention provides an information display and user command input system including a computer and an aggregation of related data having groups of displayable data, each group having an amount of displayable data. The computer has a memory and a visual display device, the computer selectively displaying on the visual display device displayable data of the aggregation of data for each of the groups of data.

A user command input device is coupled to the computer and has a housing, and first and second transducers supported by the housing. The input device receives user commands indicative of movement in two orthogonal directions and outputs respective first and second signals to the computer in response thereto, The user command input device also has a user actuatable member supported by the housing, capable of being actuated in only a selected plurality of positions to cause a third signal to be outputted to the computer indicating the user's actuation of the actuatable member to one or more of the discrete positions. Each group of the aggregation of data corresponds to the selected amount of discrete actuation of the actuatable member. The computer is responsive to the third signal to determine the user selected amount of discrete actuation of the actuatable member and select a group of displayable data from the aggregation of data that corresponds to the user selected amount of discrete actuation, and to display the selected group of displayable data on the visual display device.

The present invention also embodies a method of using a 3-dimensional computer input device to display information, the input device being coupled to a computer. The computer input device has a switch, a rotatable ball, a user actuatable member moveable in opposing directions, and at least a first transducer. The computer has a visual display device capable of displaying a file, where the file has levels of displayable data.

The method includes the steps of: (i) moving the actuatable member to only one of a plurality of discrete positions; (ii) generating a first computer signal from the first transducer indicative of the user selected discrete amount of movement of the actuatable member; (iii) outputting the first computer signal to the computer; (iv) selecting a predetermined level of displayable data for the file based on the first signal; and (v) displaying the predetermined level of displayable data on the visual display device.

The present invention also provides a pointing device that has an ergonomic design. The roller or wheel extends above an upper surface of the pointing device by a selected amount and is positioned in a front region of the pointing device such that a user may rotate and depress the wheel with an index finger while maintaining the index finger in a biomechanically neutral position.

In a preferred embodiment, a body of the pointing device is configured in accordance with the teachings of U.S. Pat. No. 5,414,445, to Kaneko et al., which is assigned to the assignee of the present invention. The top surface of the body slopes upward from a front end of the pointing device to a high point, and slopes downward from the high point to a low back end, the curvature of the top surface and low back end allowing a user to position their lower palm on a work surface while the user's hand plane is supported by the pointing device.

In addition to the placement and height of the wheel, aspects of an embodiment include the wheel width, profile and material, which act together to allow a user to comfortably and accurately actuate the wheel, while maintaining the finger and hand in a biomechanically neutral position.

The wheel and associated structure can be configured to provide feedback to the user, thereby allowing the user to intuitively control the pointing device. The wheel is movable to a number of discrete positions, where movement of the wheel to each location results in a signal being sent to the computer. By controlling the amount of force and torque required to depress and rotate the wheel, and by configuring the structure associated with movement of the wheel to discrete positions in accordance with the present invention, inadvertent actuation of the pointing device is reduced, and the user may associate a given motion of the wheel with a given result, thereby allowing the user to intuitively actuate the wheel.

Overall, the present invention provides a system and method that intuitively provides visual feedback to a user as the user moves from summary-to detail in various data files or aggregations of data such as documents. As the user rotates the roller on the mouse (or moves the mouse), the user navigates through the document, or through data in the document, which is displayed on the display device, so that for a selected amount of rotation of the roller, a selected portion of the document is displayed on the display device. The roller provides a particularly intuitive way for users to navigate into and out of the area or "space" and data of a document. Other features and advantages of the present invention will become apparent from studying the following detailed description of the presently preferred embodiment, together with the following drawings.

BRIEF DESCRIPTION OF THE DRAWINGS

FIGS. 4A, 4B, and 4C are front views of a visual display device for the computer system of FIG. 1A showing spatial navigation (zooming) in a spreadsheet document of a spreadsheet application.

FIGS. 6A and 6B are front views of the display device illustrating an ability of the computer system of the present invention to rapidly move within the spreadsheet document of FIGS. 4A–4C using spatial navigation (zooming).

FIGS. 7A, 7B, 7C, 7D, and 7E are front views of the display device showing data navigation using the present invention in another spreadsheet document.

FIG. 11B is a front view of the display device showing spatial navigation (panning) of the present invention in a spreadsheet document.

FIG. 16 is a front view of the display device showing an alternative embodiment of spatial navigation (zooming) of the present invention in the spreadsheet document of FIGS. 4A–4C.

DETAILED DESCRIPTION OF THE PRESENTLY PREFERRED EMBODIMENT OF THE INVENTION

Figure 1A:
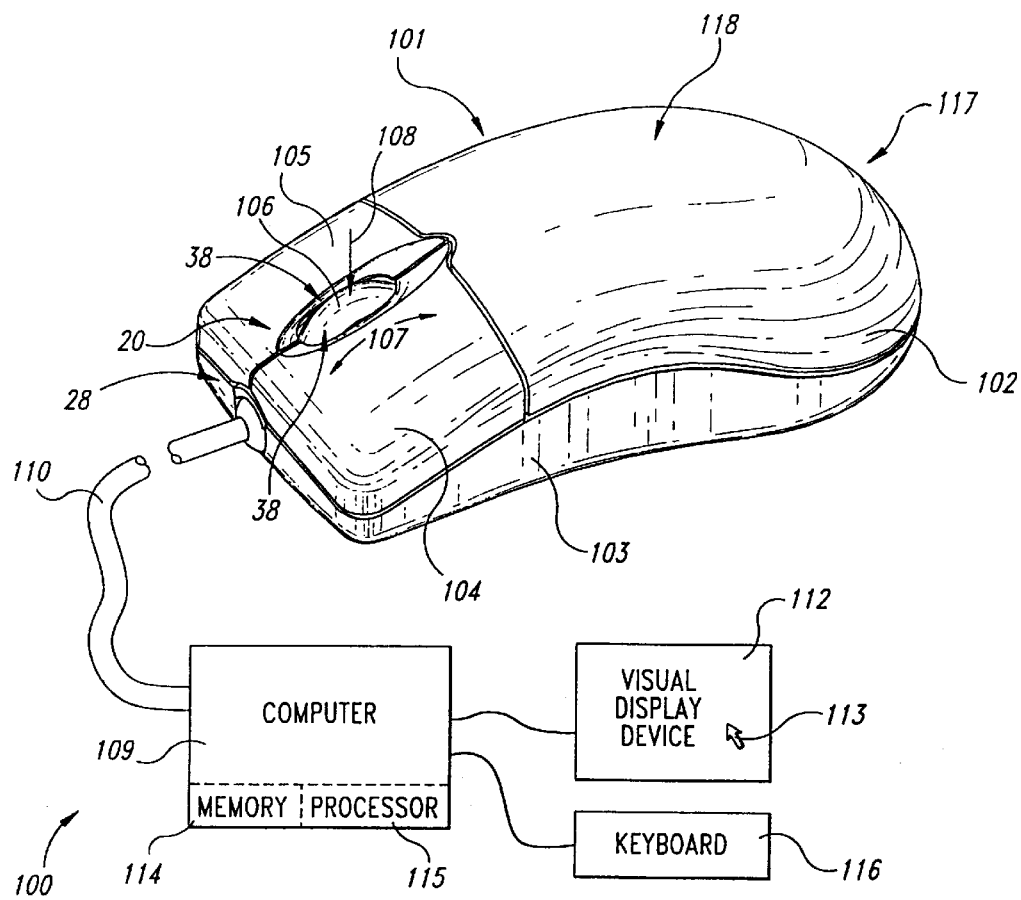
FIG. 1A is a partial front isometric, partial block diagram of a computer system with a mouse-type pointing device provided under the present invention.

A system and method of adjusting display characteristics of a document or data file in a computer system is described. In the following description, numerous specific details are set forth to provide a thorough understanding of the present invention, such as mechanical construction and components of a computer input device, certain steps performed by the computer system for adjusting display characteristics of a document, etc. One skilled in the relevant art, however, will find it obvious that the present invention may be practiced without some or all of these specific details. In other instances, well-known structures and methods are not shown or discussed in detail so that the description of the present invention is not unnecessarily obscured.

Referring to FIG. 1, a computer system 100 of the present invention includes a computer input device, illustrated as a mouse 101. The mouse 101 generally includes an upper housing 102 and a lower housing 103. Primary and secondary input buttons 104 and 105, respectively, are provided on the upper housing 102. A roller or wheel 106 projects from an upper surface of the upper housing 102 of the mouse 101, between the primary and secondary input keys or buttons 104 and 105. The wheel 106 can be rotated by a user's finger, as opposed to the users thumb, as his or her hand rests upon the upper surface of the upper housing 102. By being rotated by a user's index finger, the wheel 106 provides more accurate user input than if the roller were rotated by the user's thumb because the index finger is generally more dexterous than the thumb. Additionally, both left- and right-handed users can readily access the wheel 106.

As illustrated in FIG. 1A, a user may rotate the wheel 106 in either direction indicated by reference numeral 107, and may depress wheel 106 as indicated by reference numeral 108. As the wheel 106 is rotated and depressed, signals are generated and transmitted to a computer 109 to cause a selected change in a document, as explained below.

A cord 110, extending from a front end 28 of the mouse 101, couples the mouse to the computer 109. The computer 109 includes a visual display device 112 such as a cathode ray tube ("CRT"), active matrix display, or other suitable display device. The display device 112 is capable of displaying a pointer 113 and windows displaying documents, as described below. The computer 109 includes storage or memory 114 and a processor 115. A keyboard 116 is coupled to the computer 109.

The upper and lower housings 102 and 103 form a body 117 of the mouse 101, which is configured under the teachings of U.S. Pat. No. 5,414,445 to Kaneko et al., incorporated herein by reference. As a result, the mouse 101 provides support for a user's hand plane when a user positions a metacarpal-phalangeal joint ridge on a high point 30 of the body 117, and allows a user to grasp and use the mouse 101 while maintaining a wrist in a biomechanically neutral position. The wheel 106 is configured and positioned such that while a user's metacarpal-phalangeal joint ridge is resting on the high point 30 of the body 117, the user may rotate and activate the wheel 106 with a finger, e.g., the index finger, while maintaining the finger in a biomechanically neutral position. Specifically, in this context, a biomechanically neutral position refers to a position that provides access to the wheel 106 without exceeding a desired degree of flexion or range of motion for the finger. Although different fingers may be used, the index finger generally provides the greatest motor control at a fine scale, and the wheel 106 is therefore positioned to be reached and actuated most effectively by the index finger 26 of the user (FIG. 4).

Figure 1B:
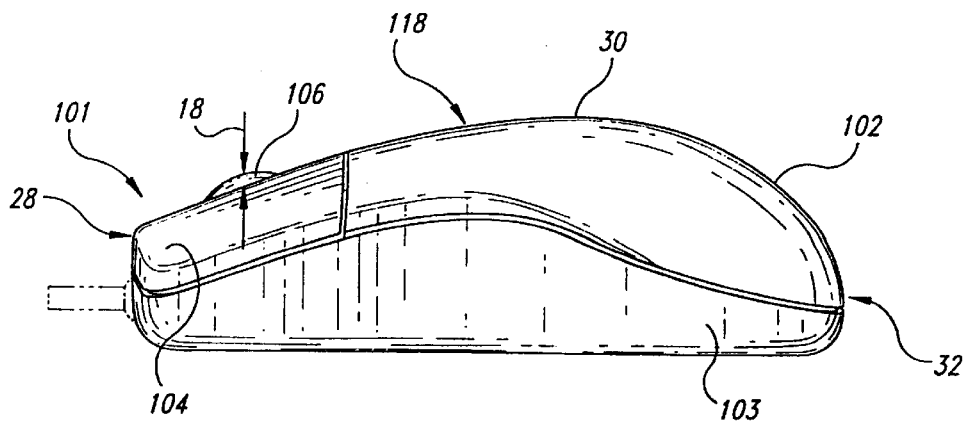
FIG. 1B is a side elevational view of the mouse of FIG. 1A.
Figure 1C:
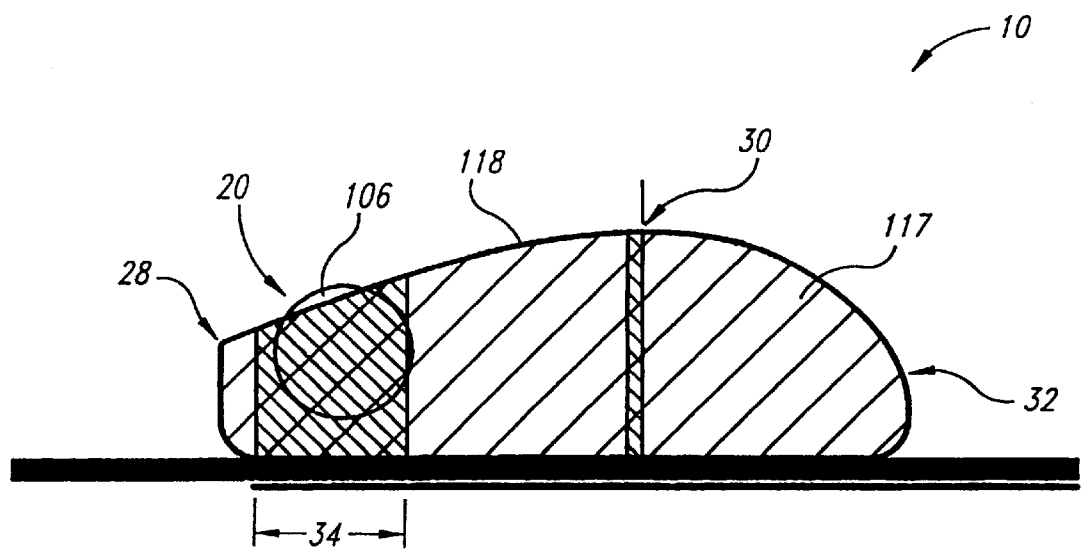
FIG. 1C is a schematic side elevational view of the mouse of FIG. 1A.

These benefits are achieved in a preferred embodiment of the present invention by providing a wheel 106 that extends above an upper surface 118 of the upper housing 102 of the mouse 101, preferably by no more than approximately 0.1 inch, as illustrated in FIG. 1B at reference numeral 18. As illustrated in FIG. 1C, the upper surface 118 slopes upward from a front end 28 of the pointing device to the high point 30 and downwards to a back end 32, the wheel 106 being positioned in a region 34 extending 41–66 millimeters forward from the high point 30. The wheel 106 is further positioned in a front central region 20 of the body 117, such that a finger of the user may move from a position of resting on either of the buttons 102 or 103 to a position of resting on the wheel 106 without exceeding a range of motion of 22°.

It is believed that the preferred embodiment of the invention described herein provides an ergonomic pointing device that will accommodate North American adult users falling within an ergonomically defined range, from a 5th percentile female to a 95th percentile male. The range is based on hand size, a larger percentage being assigned to a larger hand, and vice versa. This means that the ergonomic pointing device described herein is believed to accommodate a group of users ranging from a woman in the 5th percentile, having a relatively small hand, to a man in the 95th percentile, having a relatively large hand. It will be appreciated that users falling outside this design range may still enjoy advantages from the preferred embodiment and that alternate preferred embodiments can be developed for other target user groups (e.g., males with hand sizes above the 95th percentile) in accordance with the present invention.

Figure 1D:
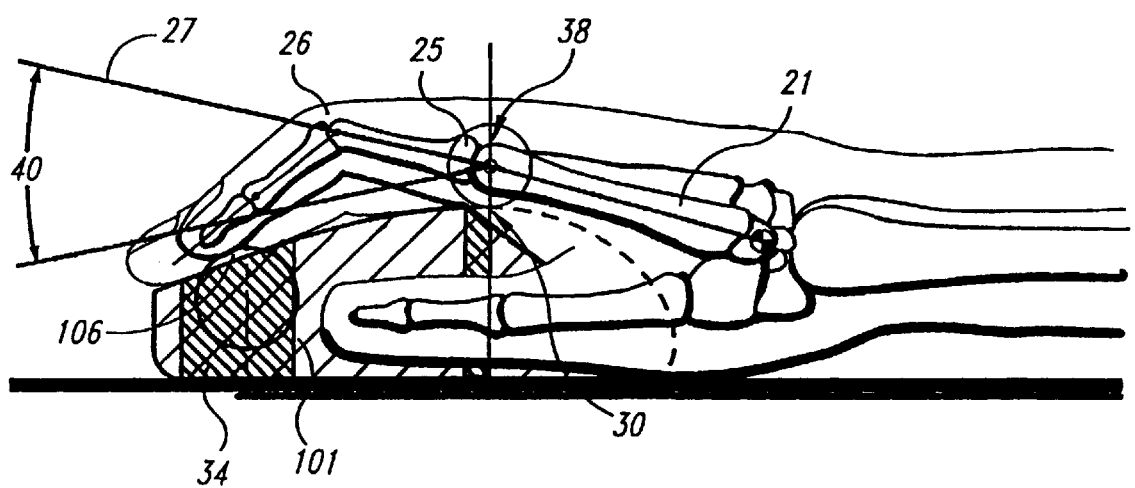
FIG. 1D is a side elevational view of a users hand resting on the mouse of FIG. 1A.

Therefore, by providing a pointing device in accordance with a preferred embodiment of the present invention, a user having a hand size that falls within a 5th percentile female to a 95th percentile male of North American adults may grasp the mouse 101 and actuate the wheel 106 within an acceptable range of neutral motion for the finger. As illustrated in FIG. 1D, flexion indicates motion of the first phalange 25 towards an upper surface 118 of the mouse body 117, measured relative to a reference line 27 at 0° when the first phalange 25 of the index finger 26 is aligned with the metacarpal bone 21, and extension indicates movement of the first phalange 25 away from the upper surface 118 of the mouse body 117 relative to reference line 27. Therefore, in an exemplary embodiment of the present invention, when the user's metacarpal-phalangeal joint ridge 38 is resting on the high point 30 of the mouse 101, the user may rotate the wheel 106 through it's full range of motion with the index finger while keeping the index finger in a biomechanically neutral range of motion of 0°–25° flexion, as indicated at reference numeral 40. As a result, muscle exertion for the finger, wrist and forearm are minimized, thereby increasing the ease and comfort with which the mouse 101 can be used.

By minimizing finger flexion and avoiding finger extension in accordance with a preferred embodiment of the present invention as discussed above, the likelihood of spastic or uncontrollable muscle contraction is reduced, thereby reducing the frequency with which a user may inadvertently actuate the pointing device. As noted above, a user may rotate and depress wheel 106, as well as depress the buttons 102 or 103. Inadvertent actuation occurs, for example, when a user intends to rotate the wheel but inadvertently depresses the wheel, or vice versa, or intends to rotate or depress the wheel and inadvertently depresses one of the buttons 102 or 103.

In an exemplary embodiment of the present invention, the force required to depress the wheel 106 is greater than the downward force created when rotating the wheel, thereby inhibiting inadvertent actuation between rotation and switch depression. It is believed that preferred results are achieved when the torque required to rotate the wheel 106 is 40–60 gram-centimeters, and the force required to depress the wheel 106 is 70–130 grams. These preferred ranges of forces are also within an acceptable range of force for the muscles in the forearm that control the index finger, thereby further contributing to the ability to actuate the wheel 106 without generating unacceptable stress in the finger, hand and forearm of the user.

Figure 2A:
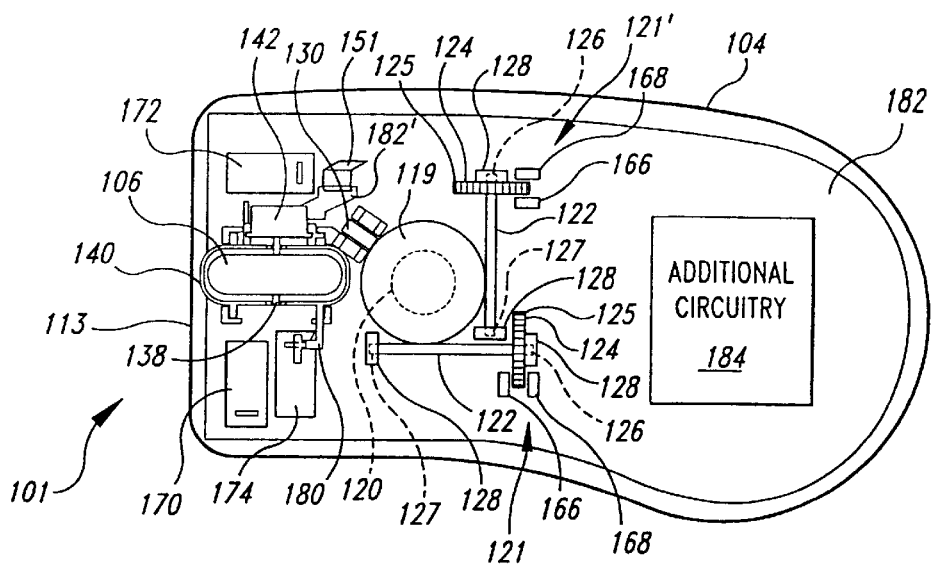
FIG. 2A is a schematic view of internal components of the mouse of FIG. 1A.

As shown in FIG. 2A, the mouse 101 includes a ball 119 that rests in a middle portion of the lower housing 103 and protrudes through a hole 120 (shown in dashed lines) in the lower surface of the mouse. X and Y axis transducers 121 and 121', respectively, translating motion to electrical signals, each include an encoder wheel shaft 122 and an encoder wheel 124 axially fixed to an end of each encoder wheel shaft 122. The encoder wheel shafts 122 are oriented perpendicular to each other within the lower housing 103, and adjacent to the ball 119.

A wheel pin 126 and an end pin 127 (both shown in dashed lines) axially extend from each encoder wheel shaft 122 into a pair of pin holes, formed in a pair of shaft supports 128, to rotatably receive the encoder wheel shaft. Each pair of shaft supports 128 rotatably retains one of the encoder wheel shafts 122. The wheel pin 126 axially extends from the end of the encoder wheel shaft 122 proximal to the encoder wheel 124. The end pin 127 axially extends from the end of the encoder wheel shaft 122 distal from the encoder wheel 124.

A spring-biased roller 130 projects upwardly from and is rotatably retained by the lower housing 103 The spring-biased roller 130 is positioned opposite to an interior angle formed by the perpendicularly positioned encoder wheel shafts 122 and biases the ball 119 into contact with the encoder wheel shafts and toward the interior angle, while allowing the ball to freely rotate, and cause the encoder wheel shafts 122 and the encoder wheels 124 to rotate.

Figure 2C:
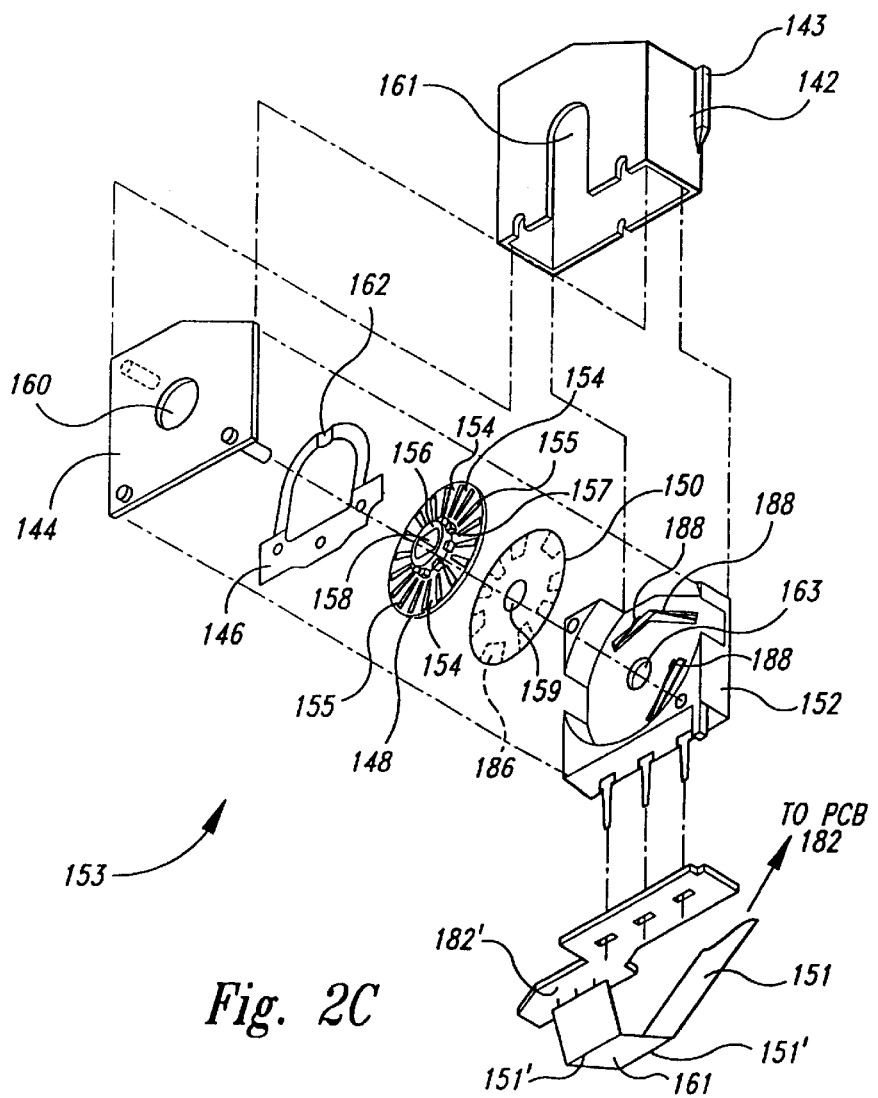
FIG. 2C is an exploded view of an encoder and tactile feedback assembly for the wheel assembly of FIG. 2B.
Figure 2B:
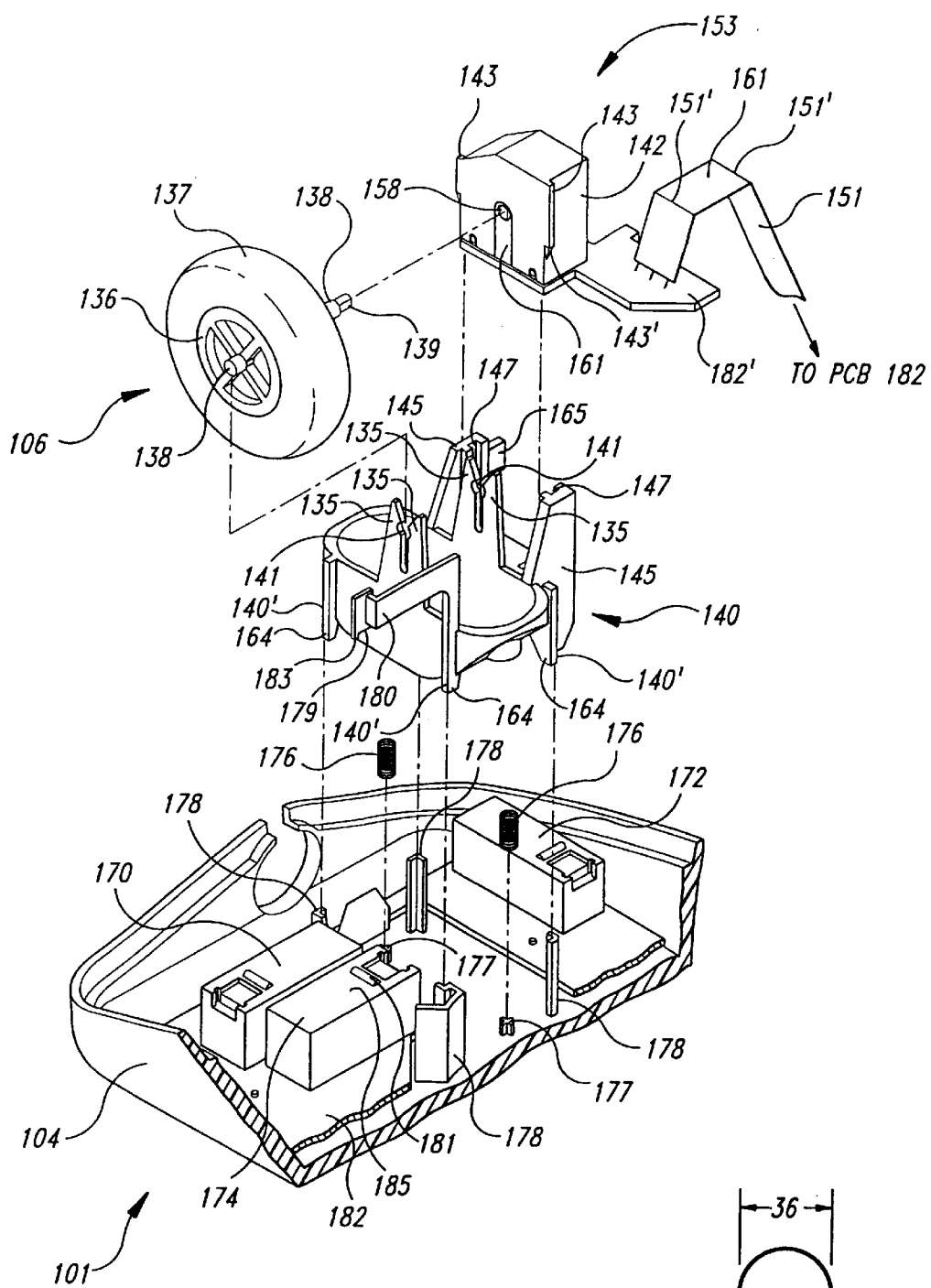
FIG. 2B is an enlarged, exploded view of a wheel assembly for the mouse of FIG. 2A.

As shown more clearly in FIG. 2B, the wheel 106 consists of a disk 136 having an elastomeric covering 137 extending circumferentially around the disk. A pair of pins 138 forming an axle extend axially from opposite sides of the disk 136. A substantially rectangular cross-section hub 139 extends from one of the pins 138. The pins 138 are snap-fit into a pair of round apertures 141 formed by two pairs of upwardly extending fingers 135 formed in a carriage 140. As explained more fully below, the carriage 140 is movably retained in position in the lower housing 103.

A pair of vertically extending flanges 143 protrude from opposite sides of an encoder enclosure 142, while a pair of vertically extending ribs 145 protrude from a side of the carriage 140. A pair of vertically extending grooves 147 formed in the ribs 145 each receive one of the flanges 143 of the encoder enclosure 142 so that the encoder closure is securely received by the carriage 140. When so received, an inverted U-shaped slot 161 in the encoder enclosure 142 is axially aligned with the round apertures 141 of the carriage 140. The flanges 143 preferably each have a tapered lower end 143' to readily allow the encoder closure 142 to be slid into the grooves 147 during manufacture.

As shown in FIG. 2C, an outer plate 144, a biased engagement member 146, a tactile feedback disk 148, an encoder ring 150 (affixed to the tactile feedback disk) and an encoder electrode frame 152 are sandwiched together and received within a downward opening aperture in the encoder enclosure 142. These components together form a Z axis transducer assembly, indicated generally by reference numeral 153, that is electrically and mechanically coupled to a portion 182' of a printed circuit board 182 (described below). A flexible web connector 151 electrically interconnects the portion 182' and the Z axis transducer assembly 153 with the printed circuit board 182.

The tactile feedback disk 148 has a number of radially extending detents 155 (e.g., eighteen). The detents 155 are equally spaced apart and circumferentially distributed about the tactile feedback disk 148 to form an equal number of valleys 154 therebetween. A hub 156 extends from both sides of the tactile feedback disk 148. The hub 156 has a shoulder defined by gear teeth 157 on a side toward the outer plate 144, and an axially formed, generally rectangular receiving aperture 158 sized to receive and operatively engage the rectangular cross-section hub 139 (see FIG. 2B) of the wheel 106 therein. A portion of the hub 156 extending beyond the gear teeth 157 freely rotates within a round aperture 160 formed in the outer plate 144. The round aperture 160 of the outer plate 144 is revealed through the U-shaped slot 161 formed in the encoder enclosure 142. The hub 156 extending from a side of the tactile feedback disk 148 toward the encoder ring 150 passes through an aperture 159 therein, and is received and freely rotates within a round aperture 163 formed in the encoder electrode frame 152.

The biased engagement member 146 is secured to the outer plate 144, and has an integrally formed protrusion 162 that extends toward, and is received within, the valleys 154, between detents 155 of the tactile feedback disk 148. In operation, when the wheel 106 is rotated, the pins 138 are rotatably supported within the round apertures 141 of the carriage 140, while the rectangular cross-section hub 139 mates with and causes the hub 156 to rotate freely within the round aperture 160 of the outer plate 144 and the round aperture 163 of the encoder electrode frame 152. The spring force of the biased engagement member 146, and the shape of the protrusion 162, valleys 154 and detents 155 force the wheel 106 into discrete positions (e.g., eighteen corresponding to eighteen valleys 154 and detents 155) during rotation of the wheel 106.

Referring back to FIG. 2A, a light-emitting element, such as a light-emitting diode ("LED") 166, is positioned on one side of each encoder wheel 124. A light-detecting element, such as a phototransistor 168, is positioned opposite each LED 166 on the other side of each encoder wheel 124. As each encoder wheel 124 rotates, light from the LED 166 is alternatively blocked and transmitted through the encoder wheel 124 and received by the phototransistor 158 depending on whether one of several notches 125 in the perimeter of the encoder wheel is positioned between the LED 166 and phototransistor 158.

A primary switch 170 and a secondary switch 172 are positioned below the primary input button 104 and the secondary input button 105, respectively (see FIG. 1A), whereby actuation of the primary or secondary input button results in actuation of the corresponding switch. A roller switch 174 is positioned adjacent to the wheel 106, and can be actuated by slidably depressing the wheel 106 downwardly as described below.

Referring to FIG. 2B, the carriage 140 rests upon a pair of springs 176. A pair of pins 177, extending upwardly from the lower housing 103, extend through and retain a lower portion of the springs 176. Four vertical guides 178 (having a substantially 45° angular cross-section) extend upwardly from the lower housing 103 to slidably retain four corners 140' of the carriage 140 and thereby allow the carriage to slidably rest upon the springs 162, while restricting movement of the carriage to sliding movement in a vertical direction. As a result, the wheel 106 can be depressed and the carriage 140 thereby slid downwardly toward the lower housing 103 of the mouse 101 so that a switch engagement arm 180 extending from the carriage (opposite the encoder enclosure 142) is moved downwardly to actuate the roller switch 174. In particular, a lower end portion 179 of the switch engagement arm 180 engages and depresses a switch button 181 of the roller switch 174, until a lower surface of a downwardly extending stop portion 183 of the switch engagement arm engages an upper surface 185 of the roller switch 174 to limit downward movement of the switch engagement arm (and therefore prevent further downward movement of the switch button 181). Without the stop portion 184, the switch button 181 of the roller switch 174 might be depressed inwardly too far, causing the button to become stuck in the downward position.

Additionally, the carriage 140 can be depressed downwardly to actuate the roller switch 174, while the wheel 106 can substantially simultaneously be rotated. Therefore, the user can depress and hold the roller switch 174, thereby generating a switch signal, while simultaneously rotating the wheel 106 to generate roller position signals or "Z axis signals," as described below. The above-described 70–130 grams of total force required to depress the carriage 140 and actuate the roller switch 174, by being greater than the force required to rotate the wheel 106, helps prevent the user from inadvertently actuating the switch and concurrently rotating the roller.

Several legs 164, extending downwardly from the carriage 140, rest against an upper surface of the lower housing 104 when the wheel 106 is fully depressed, to thereby restrict further downward movement of the carriage. A tab 165, extending outwardly from one of the ribs 145 of the carriage 140, and an upper surface of one of the pair of fingers 135 that are opposite the tab 165, rest against stop members 402 and 404, respectively, of the upper housing 102 (FIG. 3A), to thereby limit upward movement of the roller 106 and carriage 140.

As noted above, the spring force required to depress the carriage 140 (generated by the springs 176 and the roller switch 174) should be greater than the downward force applied when rotating the wheel 106 (generated by the biased engagement member 146 and the tactile feedback disk 148), to inhibit inadvertent activation of the roller switch 174. It will be understood by one of ordinary skill in the art that the force required to depress the wheel is dependent on the characteristics of the springs 176, the roller switch 174, and the travel distance of the switch button 181.

The roller switch 174 preferably has a spring force of between 40–75 grams, which is required to actuate the switch button 181 of the roller switch. The springs 176 together provide a spring force of 30–55 grams. As a result, the overall force required to depress the wheel 106 inward to actuate the roller switch 174 (the "depression force") results in the above-described 70–130 grams of total force required to actuate the switch.

To provide the 70–130 grams of depression force, it is important that no other components within the mouse 101 add significant additional forces to this preferred range of forces. To this end, the web connector 151 has two transversely extending bends 151' along its length, of about 90° each, so as to form a flat portion 161 therebetween that is approximately parallel to the printed circuit board 182. The bends 151' act as hinge lines to allow the web connector 151 to pivot about the bends and thereby freely move upward and downward, without applying any substantial additional force to the preferred range of depression forces required to depress the wheel 106. The web connector 151 can also be comprised of a material having high flexibility and limited spring force. By providing the flat portion 161, the web connector 151 not only applies little spring force (e.g., on the order of 0–10 grams), but also limits the height of the connector so that the connector can fit within the body 117 of the mouse 101 without contacting the underside of the upper housing 102.

To further minimize inadvertent actuation, the detents 155 are configured in accordance with an exemplary embodiment of the present invention to obtain consistent separation between rotation of the wheel 106 (in the directions indicated by line 107) and depressing the wheel 106 (in the direction indicated at reference numeral 108). As illustrated in FIG. 2C, 18 detents 155 are spaced circumferentially around tactile feedback disk 148. In one exemplary embodiment, the tactile feedback disk 148 has a diameter of 0.875 inch. The characteristics of the detents, together with the range of forces required to rotate and depress the wheel, provide a desired "feel" to rotating the wheel 106. This "feel" provides tactile feedback to the user, thereby increasing the accuracy and consistency with which the wheel may be controlled and actuated. Also, by configuring the detents in this manner, a given amount of play is possible in the movement of the wheel between the detents without inadvertently moving the wheel to a consecutive discrete position, thereby also reducing inadvertent rotation of the wheel.

Figure 2D:
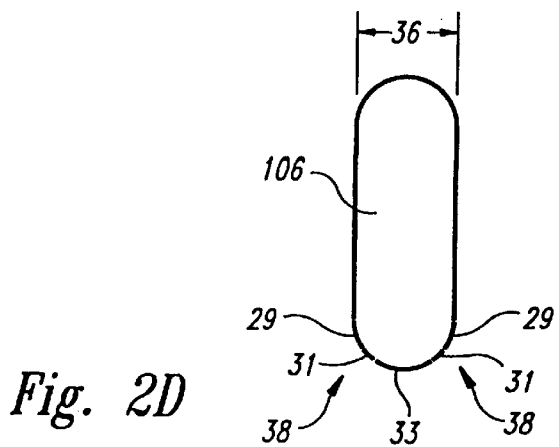
FIG. 2D is a side elevational view of a wheel for the mouse of FIG. 1A.

To further ensure accurate and comfortable activation of the wheel 106, an outer edge 38 of the wheel is radiused such that a user may approach the wheel from either side, i.e., from either of the mouse buttons 104 or 105, and rotate and depress the wheel along the outer edge 38. In a preferred embodiment, as illustrated in FIG. 2D, the outer edge 38 has a radius of 0.075–0.2 inch, with acceptable results being achieved when the outer edge 38 is defined by three tangent radii 29, 31 and 33, having dimensions of 0.50 inch, 0.125 inch and 0.1875 inch, respectively. As a result, the user has good control of the wheel, but the wheel is not a source of external trauma to the fingertip pulp. (The fingertip pulp is the soft tissue around the palmar surface of the distal phalanges).

In an exemplary embodiment, a width 36 of the wheel is 0.25–0.4 inch, with preferred results being achieved when the wheel width 36 is 0.275 inch. Using a dimension in this range, the wheel 106 is in contact with the user's fingertip pulp while still allowing the user to feel the edges of the wheel. This helps the user properly position his or her finger on the wheel, which in turn improves the transfer of forces from the finger to the wheel.

An outer surface of the wheel is made of an elastomeric material, thereby providing a good contact between the user's finger and the wheel 106 so that the user's finger does not slide off the wheel 106 and inadvertently depress one of the buttons 104 and 105. Although a variety of low-durometer elastomers may be used, such as Santoprene™, applicants believe that preferred results are achieved when the material is Krayton™, at 60 durometer.

By providing a pointing device in accordance with an exemplary embodiment of the present invention as described above, the mouse 101 further provides feedback to a user, allowing the user to intuitively use the pointing device and wheel 106. This feedback is provided by the feel of the wheel defined by the configuration and spacing of the detents 155, as well as the force required to move the wheel from one discrete position to the next. In an exemplary embodiment, the electrical signal generated by movement of the wheel 106 from one position to another is transmitted when the engagement member 146 is at the highest point of the detent 155 as it passes over the detent, thereby providing tactile and visual feedback to the user to associate a desired result with a given amount of motion of the wheel 106. The user may therefore navigate through a document more intuitively, without having to look at the pointing device. In an alternative embodiment, additional feedback is provided by a sound being generated as the wheel 106 moves from one discrete position to another.

Returning now to a further discussion of the mechanical aspects of the invention, as shown in FIG. 2A, the switches 170 and 172 are spaced apart in positions approximately within the front left and right corners of the lower housing 103, respectively, to accommodate positioning of the wheel 106 and carriage 140 therebetween. It is desirable to allow a user to depress the primary or secondary buttons 104 or 105 at any portion on the upper surface of these buttons (see FIG. 1A), while still actuating the switches 170 and 172, respectively in response thereto. However, in the prior art, a post typically extends downward from the upper housing 102 to the top of the ball 119 in order to protect the interior of the mouse 101 from damage due to movement of the ball 119 during drop tests and other forcible ball movement. Such a downwardly extending post, common in current mice, will split a hinge to which the buttons 104 and 105 are attached, and can affect desired movement of the buttons 104 and 105 when depressed, as described more fully below. Thus, such a post is not desirable in the present invention. However, the primary goal of protecting the interior of the mouse from damage is still desirable.

Figure 3A:
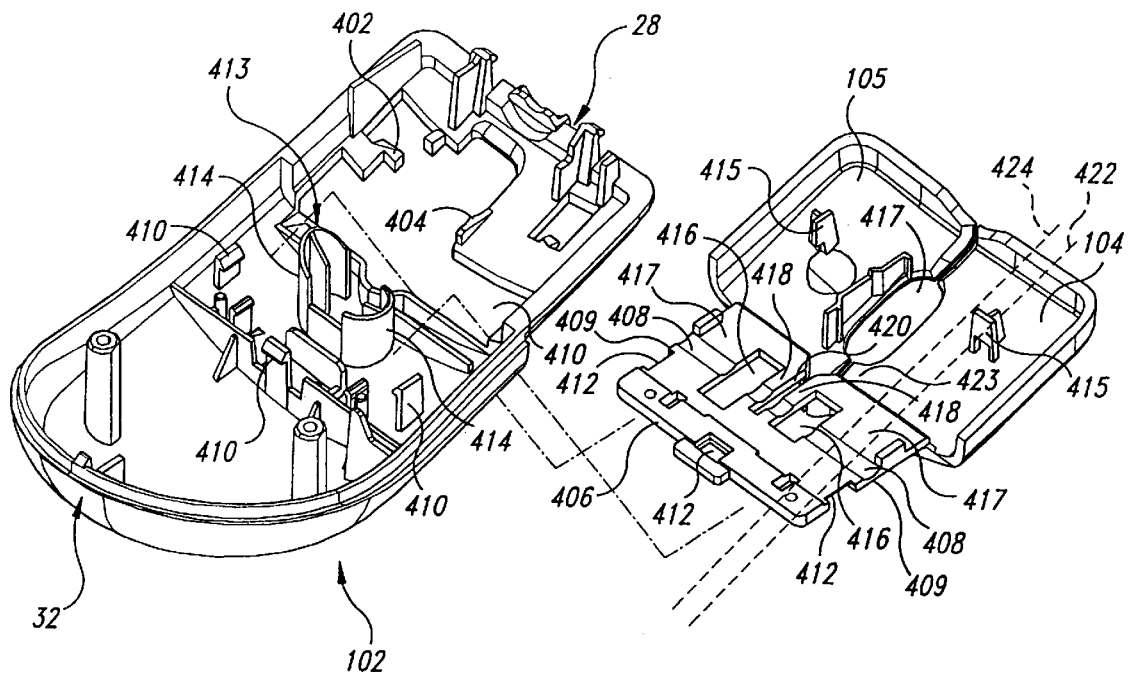
FIG. 3A is an exploded bottom isometric view of buttons and a top housing that form a portion of the body of the mouse of FIG. 1A.

Referring to FIG. 3A, the primary and secondary buttons 104 and 105 are integrally formed with a resilient hinge member 406 extending from a rearward edge of each of the buttons. The hinge member 406 is received through an opening 410 in the upper housing 102 and secured thereto by locking tabs 410 which snap-fit into recesses 412 in the hinge member. When the hinge member 406 is retained by the upper housing 102, and the upper housing is secured to the lower housing 103, a pair of switch-actuating plungers 415, one extending downward from each of the primary and secondary buttons 104 and 105, are positioned over corresponding ones of the switches 170 and 172 to engage and depress the buttons to actuate the switches. When the upper and lower housings 102 and 103 are secured together, the wheel 106 extends upward through an oval hole 417 formed between the primary and secondary buttons 104 and 105 (as shown in FIG. 1A).

A channel 408 extends transversely across the hinge member 406 between the left and right sides thereof to provide an area where the material (e.g., plastic) forming the hinge member is thinner, and thereby provides a hinge line at which the buttons 104 and 105 pivot when depressed. The hinge member 406 is resilient and provides an upwardly directed return force to return the buttons 104 and 105 to their original position after being depressed. Importantly, a post 413 extending downwardly from the upper housing 102 is split longitudinally with respect to the housing to form left and right post portions 414, with a gap therebetween. The hinge member 406 has left and right portions 409, each with a resilient, laterally outward primary hinge portion 417 and a resilient, laterally inward secondary hinge portion 418 having a hole 416 therebetween sized to receive a corresponding one of the left and right post portions therethrough when the hinge member is secured to the upper housing 102. By splitting the downwardly extending posts 413 into left and right post portions 414, the left and right secondary hinge portions 418 of the hinge member 406 can extend therebetween and provide an upward return force to the buttons 104 and 105 at a laterally inward side thereof to better distribute the return force applied by the hinge member 406, as will be described below. A longitudinally extending space 420 is provided between the left and right secondary hinge portions 418 to isolate the primary and secondary buttons 104 and 105 so that movement of either button does not cause movement of the other button.

Figure 3B:
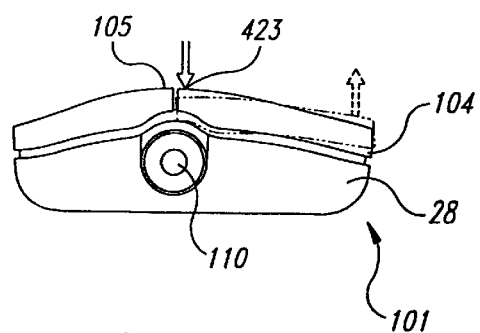
FIG. 3B is a schematic front elevational view of the mouse of FIG. 1A showing how torque forces can be generated while depressing one of the buttons of FIG. 3A in a mouse not employing the features of the present invention.

Without the secondary hinge portions 418, the primary button 104 would have an effective longitudinal center line shown as a dashed line 422 in FIG. 3A, which is offset from a true longitudinal center line for the button. As a result, referring to FIG. 3B, if a user depressed the primary button 104 at a laterally inward location 423 that is proximate to the wheel 106, the downward force could provide a torque or twisting force on the button that could deflect an opposite laterally outward portion of the button upward and away from the switch 170, thereby failing to actuate the switch. This would produce a different actuation effect, and feel to the user, if actuation did occur, that depended on where on the button 104 the user applied the force. Such a situation is obviously undesirable.

Figure 3C:
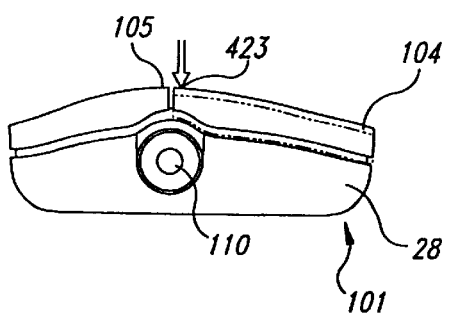
FIG. 3C is a schematic front elevational view of the mouse of FIG. 1A showing how torque forces are minimized while depressing one of the buttons of FIG. 3A in the mouse of the present invention.

By providing the secondary hinge portions 418 in addition to the primary hinge portions 417, the effective longitudinal center line is moved from line 422 to a dashed line 424 that is approximately a true longitudinal center line for the button 104. Additionally, the left and right primary and secondary hinge portions 417 and 418 provide a longer, transversely extending, hinge line (formed by the channel 408). As a result, referring to FIG. 3C, the increased transverse hinge line and movement of the effective longitudinal center line provides a more stable hinge line substantially unaffected by torque forces. As such, when the button is depressed at location 423, the primary button 104 moves downwardly at a substantially even keel relative to the lower housing 103.

The primary and secondary switches 170 and 172, the roller switch 174, the LEDs 166 and the phototransistors 168 are all mounted on a single printed circuit board (the board 182), and coupled by known means to additional circuitry 184 mounted thereon, as shown in FIG. 2A. The additional circuitry 184 includes a microcontroller and other discrete electronic devices known by those skilled in the relevant art to cause the LEDs 166 to emit light, to cause the phototransistors 168 to produce signals based on the light, to receive the signals, and to convert these signals to appropriate computer signals to be output over the cord 114 to the computer 109 (see FIG. 1A). Such technology is known to those skilled in the art. See, e.g., U.S. Pat. Nos. 4,464,652 to Lapson et al., 4,533,830 to Beauprey, and 4,562,314 to Hosogoe et al. for further information regarding the aspect of the mouse 101.

The mouse 101 generates X and Y axis position signals for the computer system 101 generally in a manner typical of most current mice. In operation, the mouse 101 is moved or slid along a planar surface, causing the ball 119 protruding through the hole 120 to rotate. As the ball 119 rotates, it rotates the encoder wheel shafts 122 of the X and Y axis transducers 121 and 121', which, in turn, rotate the encoder wheels 124 fixed thereon. As the encoder wheels 124 rotate, the phototransistors 168 receive pulses of light from the LEDs 166 as the notches 125 sweep past the LEDs. Each phototransistor 168 converts these proses of light into varying electrical signals which are input to the additional circuitry 184.

While each phototransistor 168 is shown and described generally herein as a single element, the present invention can use a single photodetector package having two phototransistors therein such as the photodetector Model No. LTR-5576D, manufactured by LITEON. Consequently, each phototransistor 168 produces two signals or "quadrature signals." The phototransistor 168 that forms part of the X axis transducer 121 produces quadrature signals "XA" and "XB." The phototransistor 168 that forms part of the Y axis transducer 121' produces quadrature signals "YA" and "YB."

The two phototransistors in each phototransistor 168 are separated by a known distance whereby one phototransistor in the photodetector is positioned at one of the notches 125 to receive light from the LED 166, causing the phototransistor to output a "high" signal that is interpreted by the additional circuitry 184 as a digital "1" quadrature signal.

Conversely, the other phototransistor in the phototransistor 168 is blocked by the encoder wheel 124 from receiving light from the LED 166 and consequently outputs a "low" signal interpreted as a digital "0" quadrature signal. As a result, the two quadrature signals output from the phototransistor 168 produce signals that are out of phase. The additional circuitry 184, namely the microcontroller, senses transitions between digital "0" and "1" input signals or levels in the two quadrature signals. Based on a comparison of these transitions, the additional circuitry 184 determines the direction in which the mouse is being moved. For example, if the quadrature signals XA and XB output from the phototransistor 168 are "00" followed by "10," then the additional circuitry 184 recognizes that the mouse 101 is being moved in one direction along the X axis. Conversely, if the quadrature signals XA and XB are "11" followed by "10," then the additional circuitry 184 recognizes that the mouse 101 is being moved in the opposite direction.

The number of transitions between digital "0" and "1" signals detected by the additional circuitry 184 indicates the magnitude of mouse travel. Together, determination of direction and magnitude of mouse travel are referred to in the art as quadrature calculation. Quadrature calculation is performed by the additional circuitry 184 using known techniques. The quadrature calculations convert the quadrature signals into count signals indicating movement of the mouse 101 along X and Y axes. The count signals are either positive or negative, indicating movement of the mouse 101 in either a forward or reverse direction along a particular axis. The host computer 109 converts these counts into movements of the pointer 113 on the display device 112, as explained below.

Based on the above discussion, the X axis transducer 121 and associated phototransistor 168 produce XA and XB quadrature signals which are converted by the additional circuitry 184 into count signals indicating movement or position of the mouse 101 along the X axis, referred to herein as "X axis computer signals." The Y axis transducer 121' and associated phototransistor 168 produce YA and YB quadrature signals which are converted by the additional circuitry 184 into count signals indicating movement or position of the mouse 101 along the Y axis, referred to herein as "Y axis computer signals."

The mouse 101 generates Z axis position signals for the computer system 100 in a manner similar to that for generating X and Y axis signals. The Z axis transducer assembly 153 produces Z axis quadrature signals (including a "ZA" and "ZB" component), which are input to the additional circuitry 184. When the user rotates the wheel 106, the tactile feedback disk 148 and the encoder ring 150 affixed thereto, rotates. The encoder wheel 150 is formed of an electrically conductive material and has radially projecting, equally spaced, insulative portions 186 (shown in dashed lines) in FIG. 2C. Three brush electrodes 188 secured to the encoder electrode frame 152, alternately conduct and do not conduct as the insulative portions 186 sweep past the electrodes while the encoder wheel 150 rotates, as is known in the art. As the encoder wheel 150 rotates, the brush electrodes 188 produce the Z axis quadrature signals ZA and ZB. The additional circuitry 184 determines the direction and magnitude of rotation of the wheel 106 from these quadrature signals using quadrature calculation, which can be conceptualized as "simulated" mouse travel along the Z axis, thus producing counts indicating the simulated movement or position of the mouse along the Z axis or "Z axis computer signals."

While the Z axis computer signal is described herein as being produced by the wheel 106 and encoder assembly 153, the present invention may also produce the Z axis computer signal by using other electromechanical means. Specifically, the present invention may instead use opto-electronic encoders, a rocker switch, pressure-sensitive switches, joysticks, or other electromechanical switches, with an appropriate transducer if necessary, known by those skilled in the relevant art.

The X and Y axis computer signals, and the primary and secondary switch signals are output to the computer 109 by the mouse 101 as three consecutive packets or bytes of data. The Z axis computer signals and roller switch signals are transmitted to the computer 109 immediately thereafter as a fourth packet or byte of data. An operating system running on the computer 109, such as WINDOWS 95® manufactured by Microsoft Corporation, receives and processes the four packets of data.

Under control of the operating system, the computer 109 displays a graphical "user interface" on the display device 112. The operating system logically divides the user interface into one or more windows (such as the window 200 shown in FIG. 4A) that are generated by software applications. In general, each window has a separate window procedure associated with it. The operating system maintains one or more message queues for each software application that generates windows. As the application may generate multiple windows, the message queue may hold messages for multiple windows. When an event occurs, the event is translated into a message that is put into the message queue for the application. The application retrieves and delivers the message to the proper window procedure by executing a block of code known as a "message loop". The window procedure that received the message then processes the message.

When a user positions the pointer 108 with the mouse 101 over a window and clicks the mouse by depressing one of the mouse buttons 110 or 112, the procedure for the window receives a mouse message. The operating system provides a number of predefined mouse messages. The mouse messages specify the status of primary, secondary and roller switches 170, 172 and 174 and the position of the pointer 113 within the window. The position of the pointer 113 within the window is specified in (X, Y) coordinates relative to the upper left-hand cover of the window and is based on the X and Y axis computer signals from the mouse 101. The window procedure receives the mouse message and utilizes the information contained in the message to respond to the mouse activities.

As a result, all software applications operating in conjunction with the mouse 101 receive mouse messages from the queue. The mouse messages include messages corresponding to X and Y axis coordinates for the pointer 113, and the status of the primary and secondary switches 170 and 172. The mouse messages also include an event message that indicates an amount of rotation of the wheel 106 by a message "WM_MOUSEWHEEL," which has the following or equally suitable format:

| WM_MOUSEWHEEL | |
|---|---|
| zDelta = (INT) wParam; | /* wheel rotation */ |
| xPos = LOWORD(lParam); | /* horizontal position of pointer 113 */ |
| yPos = HIWORD(lParam); | /* vertical position of pointer 113 */ |

The value zDelta is the value of the parameter "wParam," which indicates the rotational distance rotated by the wheel 106. The value wParam is expressed in multiples or divisions of a constant WHEEL_DELTA such as 120. If the value zDelta has a value less than zero, the wheel 106 is rotating away from the front end 28 of the mouse 101, while if it has a value greater than zero, the roller is rotating toward the front portion. The variable xPos is the value of the lower order portion of the word lParam, which specifies the X axis coordinate of the pointer 113. As noted above, the coordinate is relative to the upper-left corner of the window. The variable yPos is the value of the higher order portion of the word lParam, which specifies the Y axis coordinate of the pointer 113.

The roller message WM_MOUSEWHEEL is provided by either the operating system running on the computer 109 or a mouse driver routine for the mouse 101 that also runs on the computer. The WM_MOUSEWHEEL message is posted in the message queue for the window that is in the foreground (e.g. the active window).

The operating system and any applications running on the computer 109 also receive mouse messages posted to the message queue that indicate whether the roller switch 174 is actuated ("WM_MBUTTONDOWN") or not actuated ("WM_MBUTTONUP"). The WM_MBUTTONUP and WM_MBUTTONDOWN messages are posted in the message queue for the window under the pointer 113. The mouse messages indicating the status of the roller switch 174 are posted to the message queue with the following additional data:

| WM_MBUTTONUP | |
|---|---|
| fwKeys = wParam; | // key flags |
| xPos = LOWORD(lParam); | // horizontal position of cursor |
| yPos = HIWORD(lParam); | // vertical position of cursor |

The parameter fwKeys indicates the status of various keys on the keyboard or buttons 110 and 112 on the mouse 101. The variable fwKeys can have any of the following values:

| | |
|---|---|
| MK_CONTROL | Set if the Control key is depressed on the keyboard 116. |
| MK_LBUTTON | Set if the primary mouse button 110 is down. |
| MK_RBUTTON | Set if the secondary mouse button 112 is down. |
| MK_SHIFT | Set if the Shift key is depressed on the keyboard 116. |

As described in more detail below, the computer 109, running its operating system and various software applications, employs the X, Y and Z axis computer signals and the primary, secondary and roller switch signals (based on the windows messages described above) to spatially navigate through a document or navigate through the data (content) of the document in the application. The present invention will first be described as navigating through a spreadsheet document, and then be described as navigating through a word processing document. Thereafter, the details of the method and other embodiments will be described.

Figure 4B:
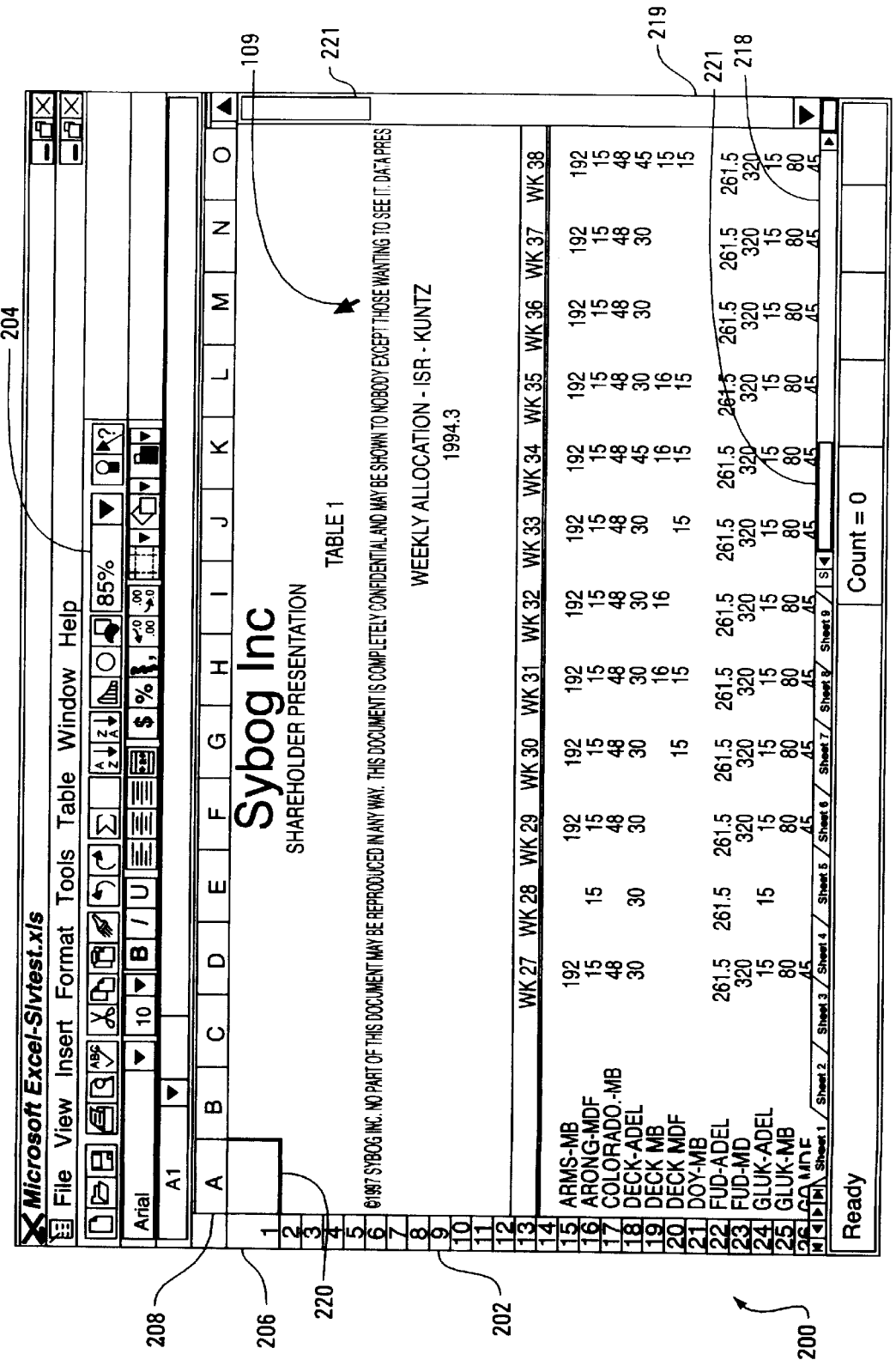
Figure 4C:
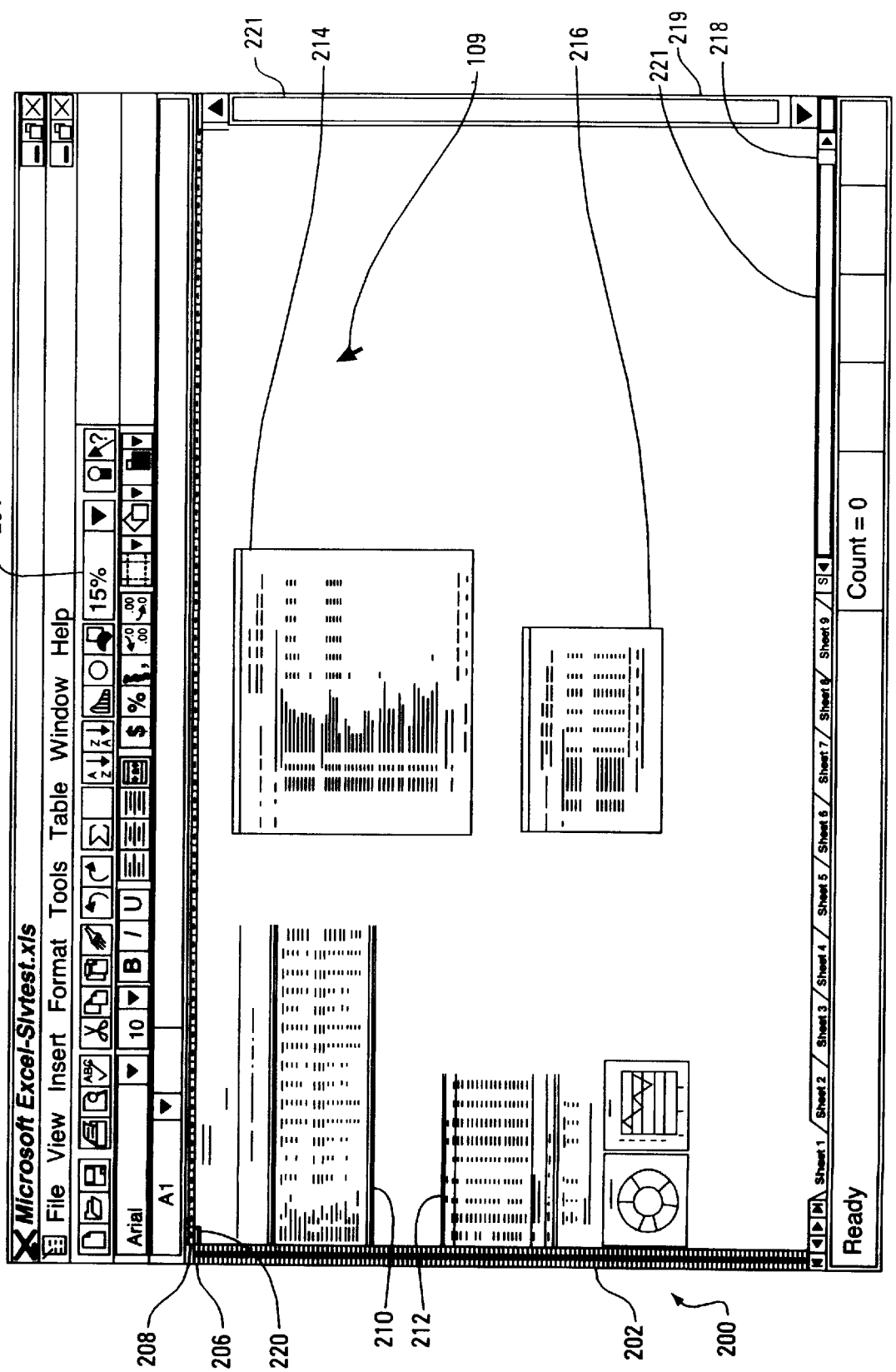

Referring to FIGS. 4A–4C, one mode of spatial navigation, in particular, or adjusting magnification of a document is shown with respect to an exemplary series of spreadsheet documents in a spreadsheet application. As noted above, the computer 109 displays one or more windows, such as a window 200, on the display device 112. The window 200 contains the visual output of a particular application running on the computer 109.

Referring to FIG. 4A, the window 200 shows an exemplary spreadsheet document 202 at 100% magnification, as reflected in a zoom text box 204. The. spreadsheet document of FIG. 4A is produced by the MICROSOFT® EXCEL® spreadsheet application. The spreadsheet document 202 includes row and column designators 206 and 208 along the left side and top, respectively. The pointer 113 is shown in the window 200, and as described above, is controlled by the X and Y axis computer signals produced by the mouse 101.

If the user rotates the wheel 106 by one of the detents 155 away from the front end 28 of the mouse 101 (FIG. 1A), the mouse generates Z axis computer signals for the computer 109 that command the computer to zoom out of or reduce the size of the spreadsheet document 202 displayed in the window 200 by one increment, such as 15%. The size of the spreadsheet document 202 in FIG. 4B has been reduced to 85% magnification, as reflected in the text box 204. The row and column designators 206 and 208 similarly decrease in size. Notably, the sizes of the pointer 113 and the window 200 do not change; only the spreadsheet document 202 displayed within the window changes.

As the user continues to rotate the wheel 106 one or more detents 155 (see FIG. 2C) away from the front end 28 (FIG. 1A), magnification of the spreadsheet document 202 continues to decrease. As shown in FIG. 4C, the spreadsheet document 202 has been reduced to 15% magnification, as reflected in the text box 204. Importantly, since the wheel 106 rotates in discrete intervals (based on the detents 155) and since the tactile feedback disk 148 provides positive tactile feedback for each detent or increment, the user intuitively or viscerally knows the number of decreases (or increases) in magnification based on his or her rotation of the roller. Since the user can feel each detent 155 as he or she rotates the wheel 106, he or she can count the number of detents, and by knowing the amount of magnification change for each detent, readily determine the amount of magnification change for a given rotation of the roller.

Figure 5:
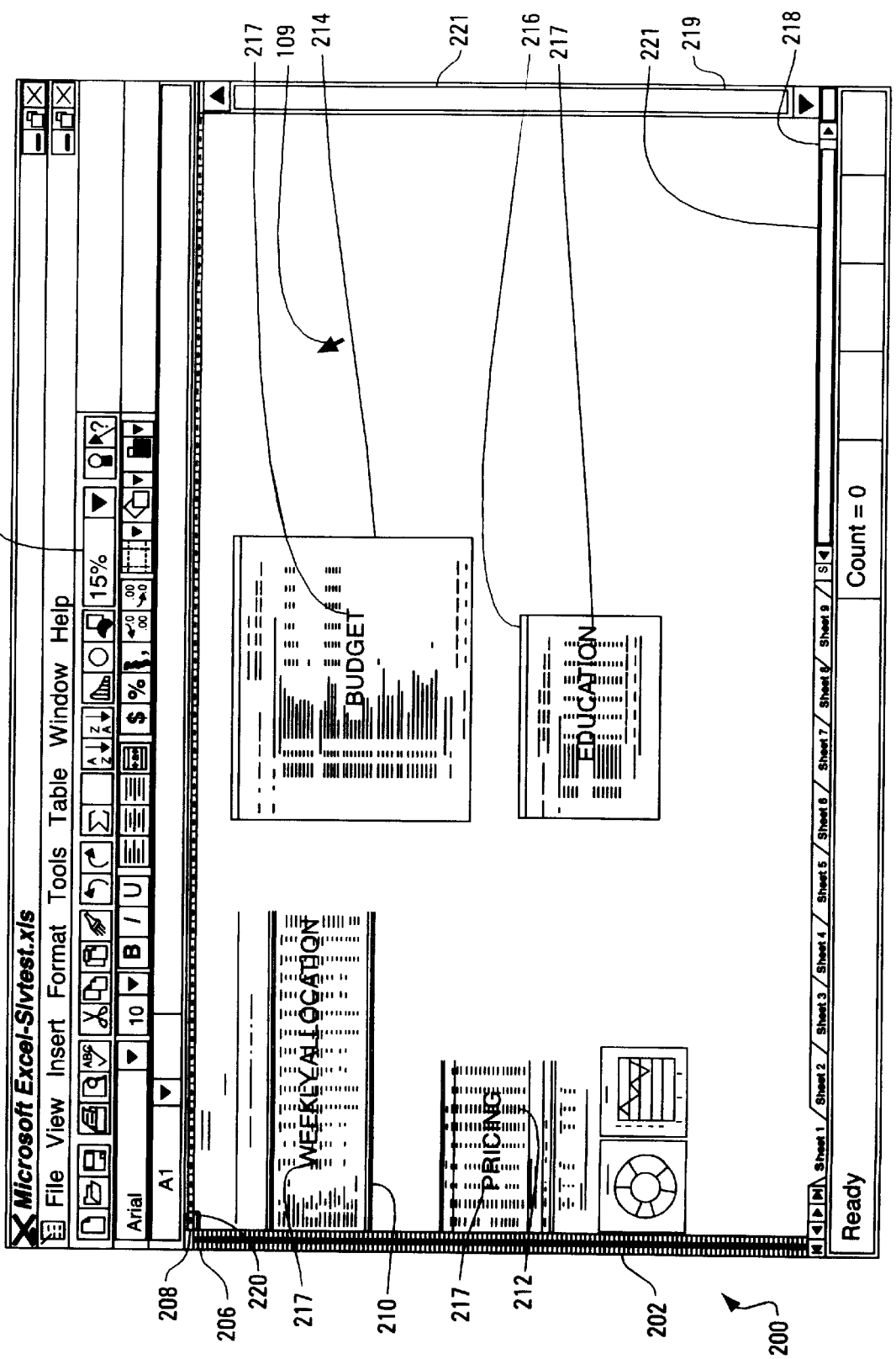
FIG. 5 is a front view of the display device and spreadsheet document of FIG. 4C showing labels associated with portions of a reduced size document.

At 15% magnification, the entire spreadsheet is visible within the window 200, although specific entries within individual cells are illegible. To compensate for illegible cells within the spreadsheet document 202, labels are added to portions of the spreadsheet document. For example, an upper left area of cells forming a portion 210 of FIG. 4C correspond to weekly allocation figures. Therefore, as shown in FIG. 5, a "Weekly Allocation" label 217 is displayed over the portion 210, which can be in a color differing from the color of the data within the portion to improve its visibility. Likewise, portions 212, 214 and 216 in FIG. 4C correspond to pricing, budget and education values. Therefore, in FIG. 5, the portions 212, 214 and 216 have corresponding labels 217 of "Pricing," "Budgets" and "Education" overlaying such portions.

By using the labels 217, the user can identify a desired portion of the spreadsheet document 202 based on the labels, even though individual data cells and words/numbers in the cells within the document are illegible. The user can then move the pointer 113 to the desired portion of the spreadsheet document 202 and select a data cell within that portion (e.g., by depressing the primary button 110). Thereafter, the user can rotate the wheel 106 toward the front end 28 of the mouse 101 to increase the magnification from 15% (FIGS. 4C and 5) back to 100% (FIG. 4A).

Figure 6A:
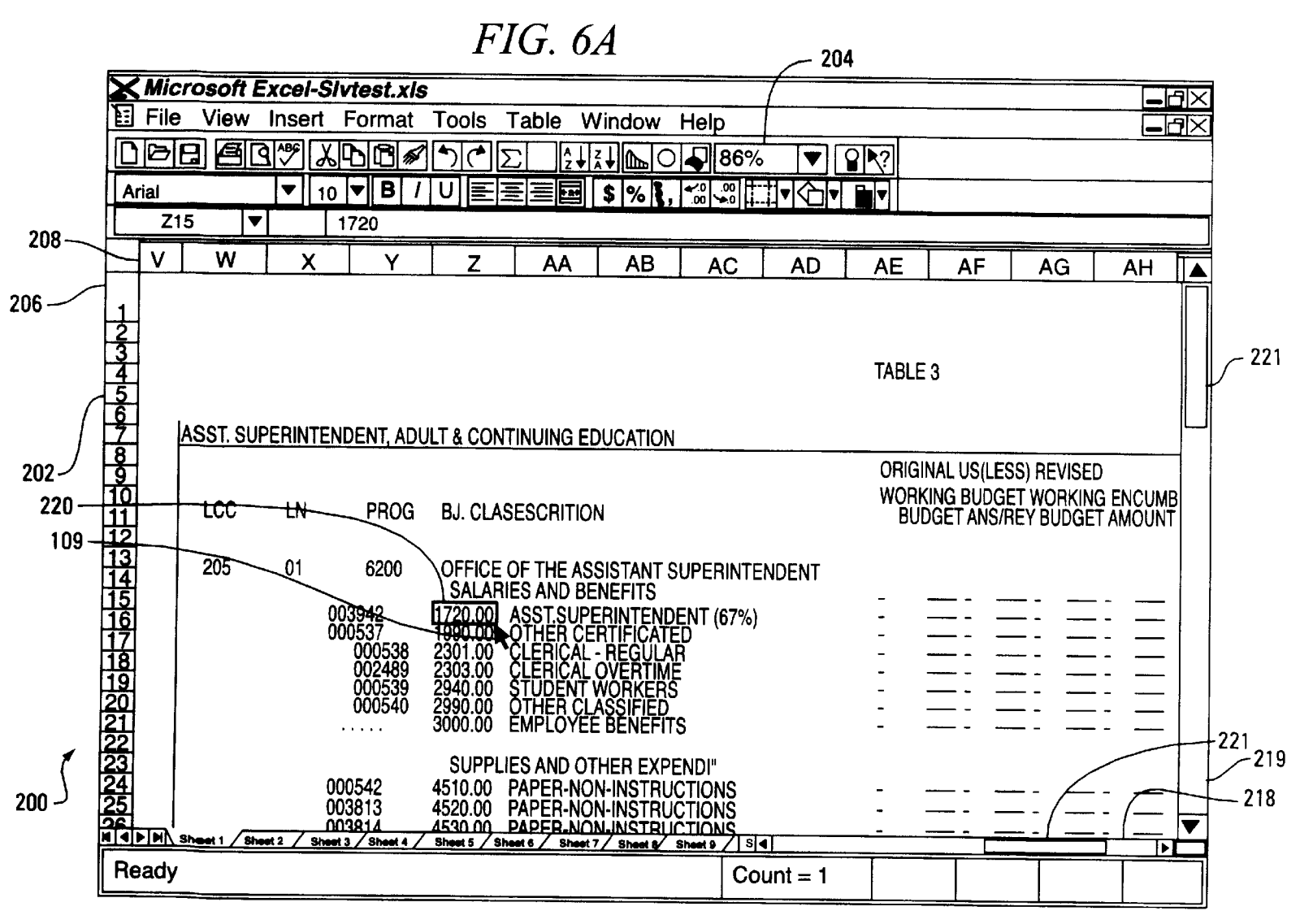

For example, a selected active cell 220 is positioned in FIG. 4A in the upper leftmost cell having column and row address of A, 1. The user can decrease the magnification of the spreadsheet document 202 to 85%, as shown in FIG. 4B, in order to view a greater portion of the spreadsheet document by rotating the wheel 106 one detent 155 away from the front end 28. Referring to FIG. 6A, the user can then move the mouse 101, thereby generating X and Y axis computer signals to move the pointer 113 to a new location of the spreadsheet document 202. The user selects a new data cell, using known techniques such as depressing the primary button 110 to thereby cause the active cell 220 to be located at the new location (i.e., a cell having a column and row address of Z,15). Thereafter, the user can rotate the wheel 106 toward the front end 28 to return the magnification to 100%, as shown in FIG. 6B.

Importantly, the active cell 220 and the pointer 113 are still at the desired locations, but the spreadsheet document 202 is more readable at its 100% magnification. Prior to the computer system 100 of the present invention, users typically moved throughout a document by using cursor movement keys or page up/down keys on the keyboard 116. Alternately, using the pointer 113, users could manipulate a prior art slider bar or scroll thumb 221 within horizontal or vertical scroll bars 218 and 219 displayed in the window 200 that move a document and thereby control which portion of a document were visible in the window 200, as is known in the art. With the computer system 100 of the present invention, a user can rapidly, spatially move through the spreadsheet document 202 without the need of cursor movement keys and page up/down keys on the keyboard 116, and without using either of the horizontal or vertical scroll bars 218 or 219.

In another navigation embodiment of the present invention, the computer system 100 provides data navigation through a document by viewing various levels of detail in any document containing data that is grouped into higher-level categories. This embodiment, and all other embodiments and modes of operation described herein, are substantially similar to the previously described embodiment, and common elements and steps are identified by the same reference numbers. Only the significant differences in construction, materials or operation are described in detail.

Figure 7A:
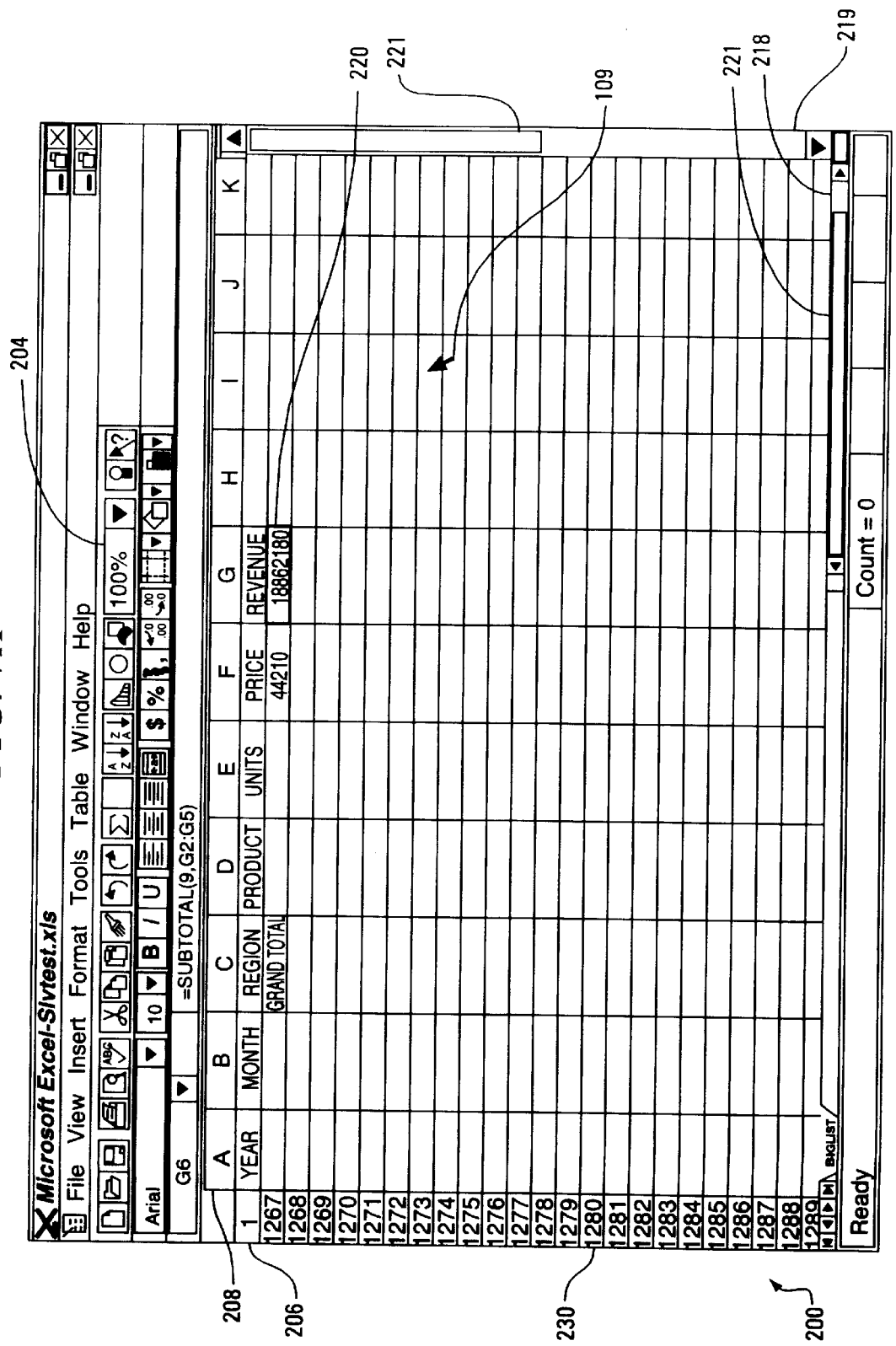
Figure 7B:
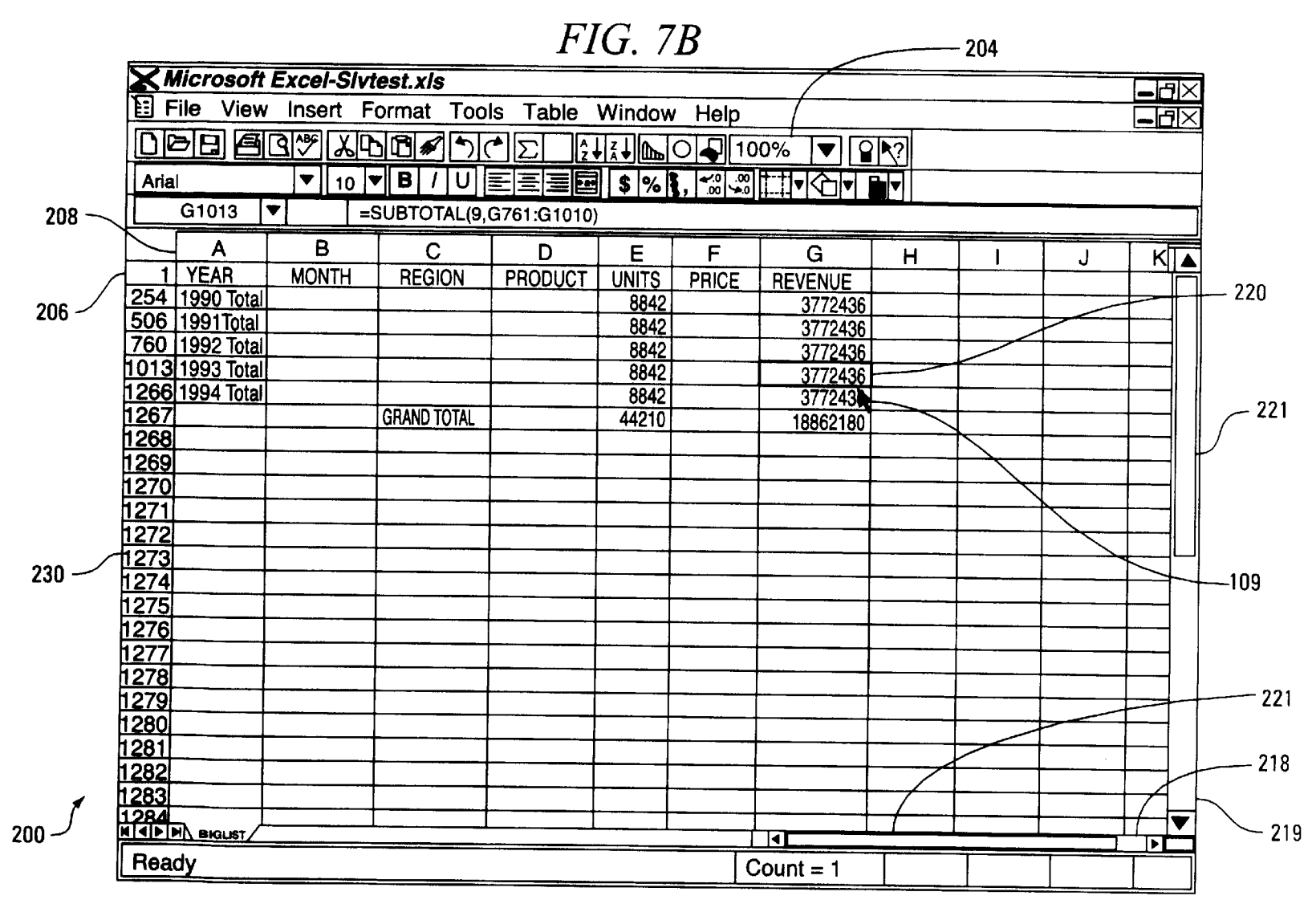

Referring to FIG. 7A, the window 200 contains another spreadsheet document 230 that shows a grand total value for "Revenue." Notably, the window 200 shows only row 1 and rows 1267–1289 for the spreadsheet document 230. As the user rotates the wheel 106 toward the front end 28 by one of the detents 155, preferably while also depressing a special function key such as a shift key on the keyboard 116, the computer 109 displays in the window 200 the annual totals from the years 1990–1994 that produce the grand total, as shown in FIG. 7B. Notably, only rows 1, 254, 507, 760, 1013, and 1266–1284 are shown in window 200 for the spreadsheet document 230. As a result, rotation of the wheel 106 by one of the detents 155 increases by one level the amount of detail shown in the window 200 for all of the data hierarchically arranged within the spreadsheet document 230.

The user can select a cell to cause it to be the active cell 220 as being, for example, the 1993 revenue total (having column and row address G,1013). The user then rotates the wheel 106 toward the front end 28 (by two detents 155) to cause the computer 109 to display two levels of increasing detail for the data in the spreadsheet document 230: the computer first displays monthly totals for the year 1993 (first detent 155), and then displays totals for four locations, North, South, East and West (second detent 155), as shown in FIG. 7C. Scrolling upwards (described below) through the monthly totals, the user can then select a cell to cause it to be the active cell 220 to be the total for the West region in January (column and row address of G,780), as shown in FIG. 7D. Thereafter, the user can rotate the wheel 106 by one more detent 155 toward the front end 28 to cause the computer 109 to display the January 1993 totals for sales of various products and services ("Airplane," "Helicopter," "Engine" and "Training") for the West region, as shown in FIG. 7E.

Figure 7E:
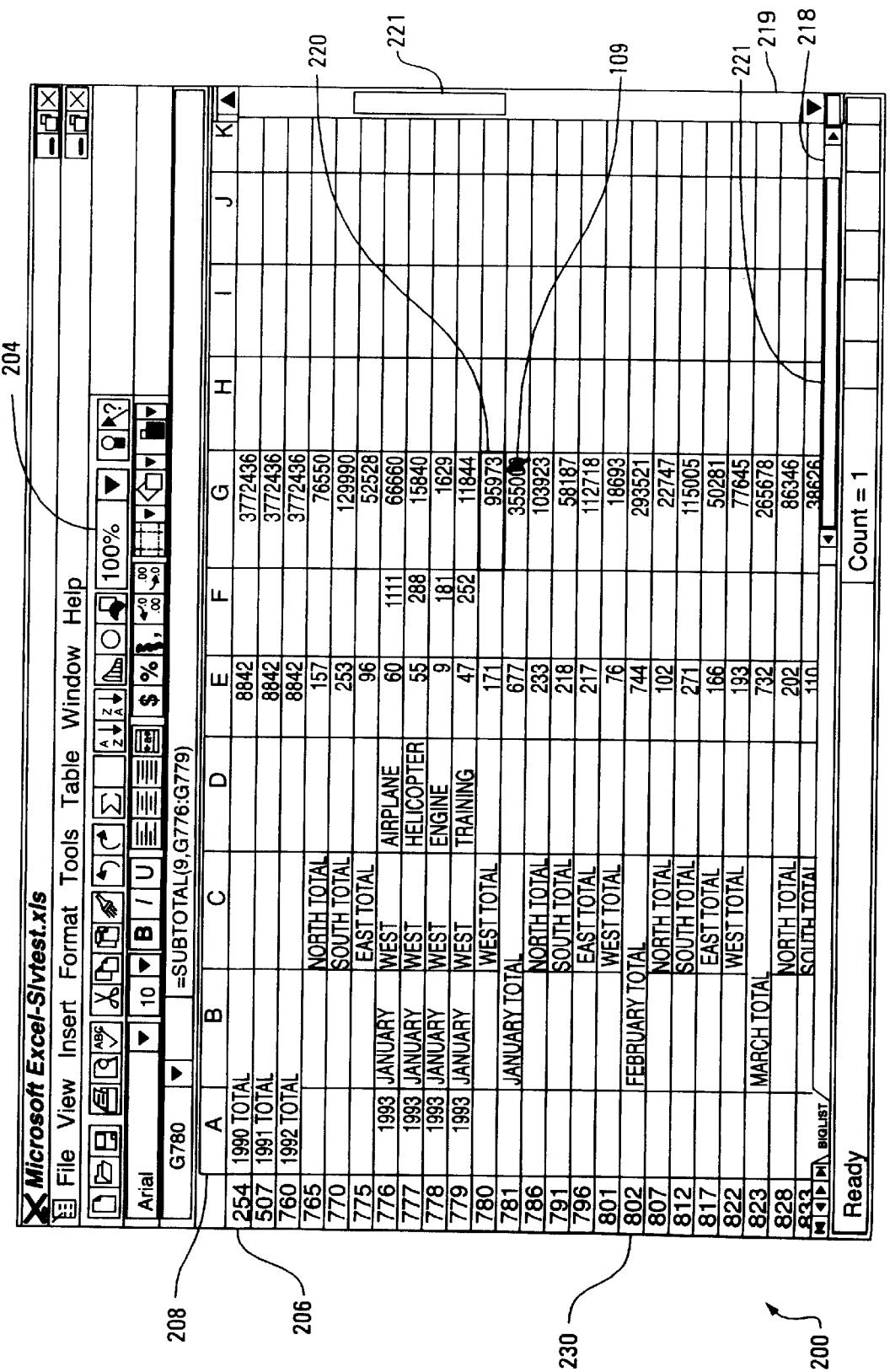

The series of FIGS. 7A–7E illustrate that as a user rotates the wheel 106, he or she can quickly move from viewing the grand total (FIG. 7A) to viewing revenues, by product for a particular region in a particular month (FIG. 7E). As a result, the user can view trends, see the organization of data, and other important information in a spreadsheet document by simply rotating the wheel 106 on the mouse 101. In general, data navigation can be used whenever data is grouped into a hierarchical structure or into higher level categories, i.e., when a set of data has subsets of data within itself. By simply rotating the wheel 106, the user can hide a detail in a document and move to a higher level of content for the document. Rotation of the wheel 106 by each detent 155 corresponds to changing and displaying the data for a change in one level of the hierarchical structure of the data. Overall, such data and spatial navigation through a spreadsheet document is equally applicable to other documents such as a word processing document produced by a word processing application.

Figure 8A:
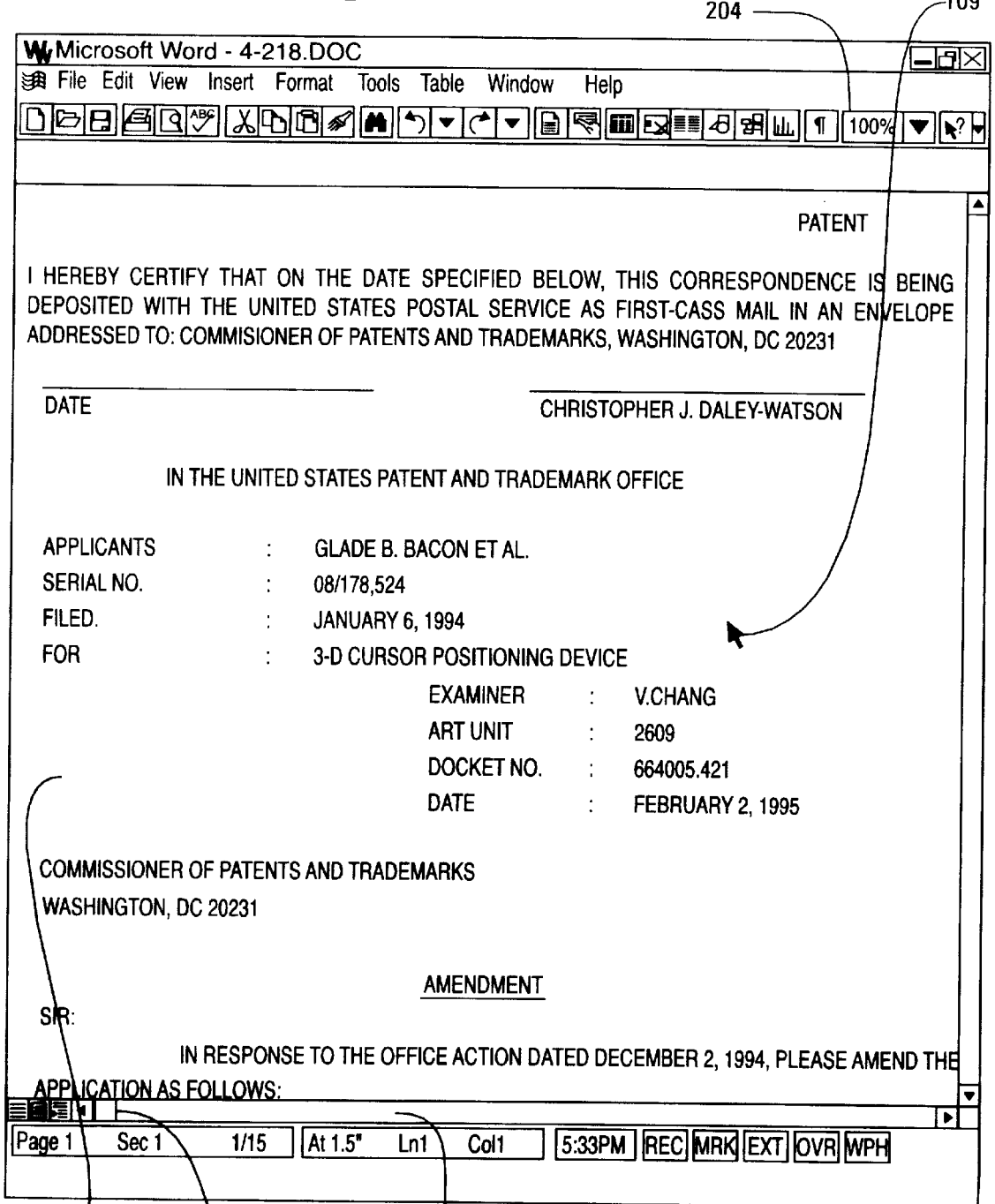
FIGS. 8A, 8B, and 8C are front views of the display device showing spatial navigation (zooming) of the present invention in a word processing document of a word processing application.
Figure 8B:
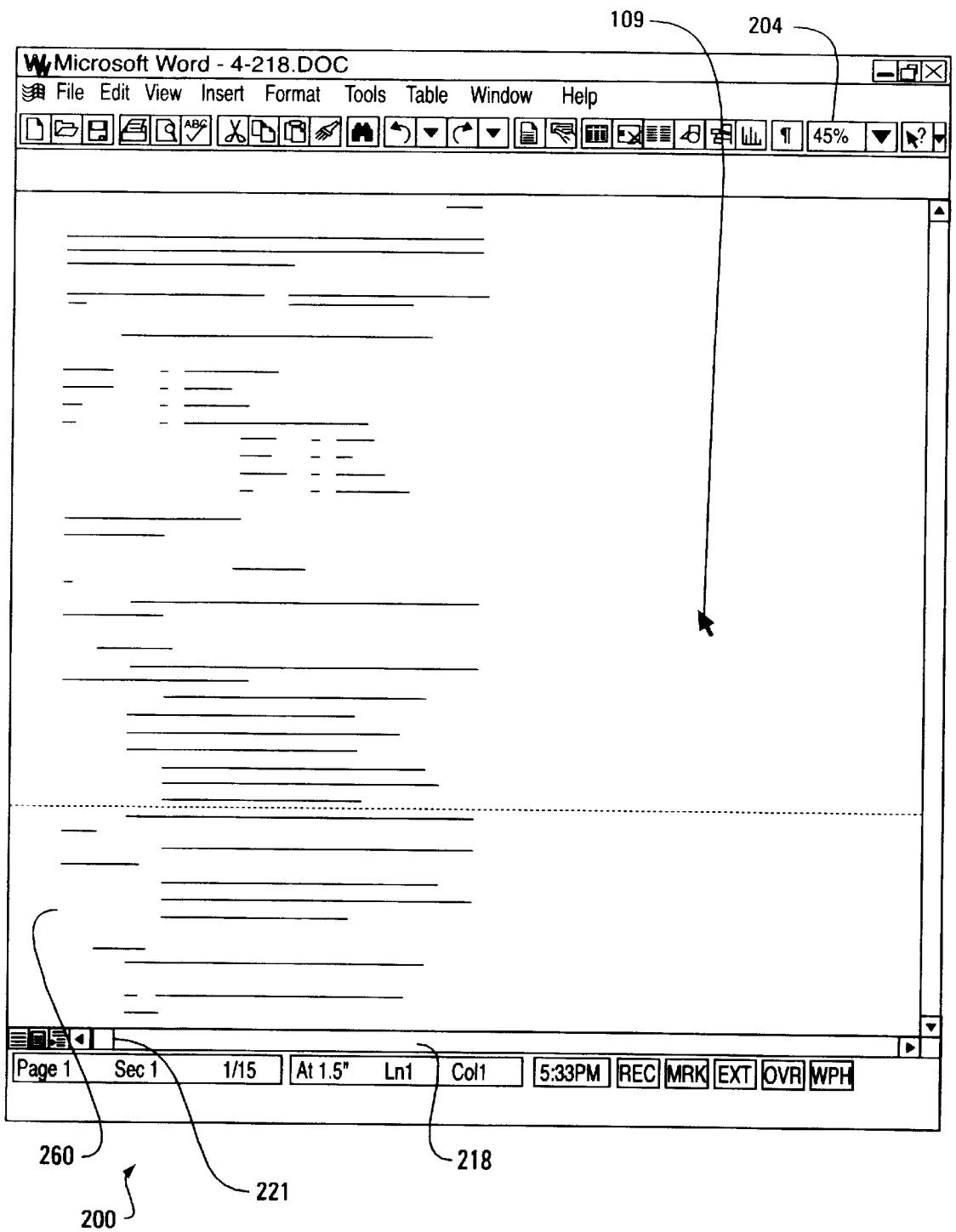
Figure 8C:
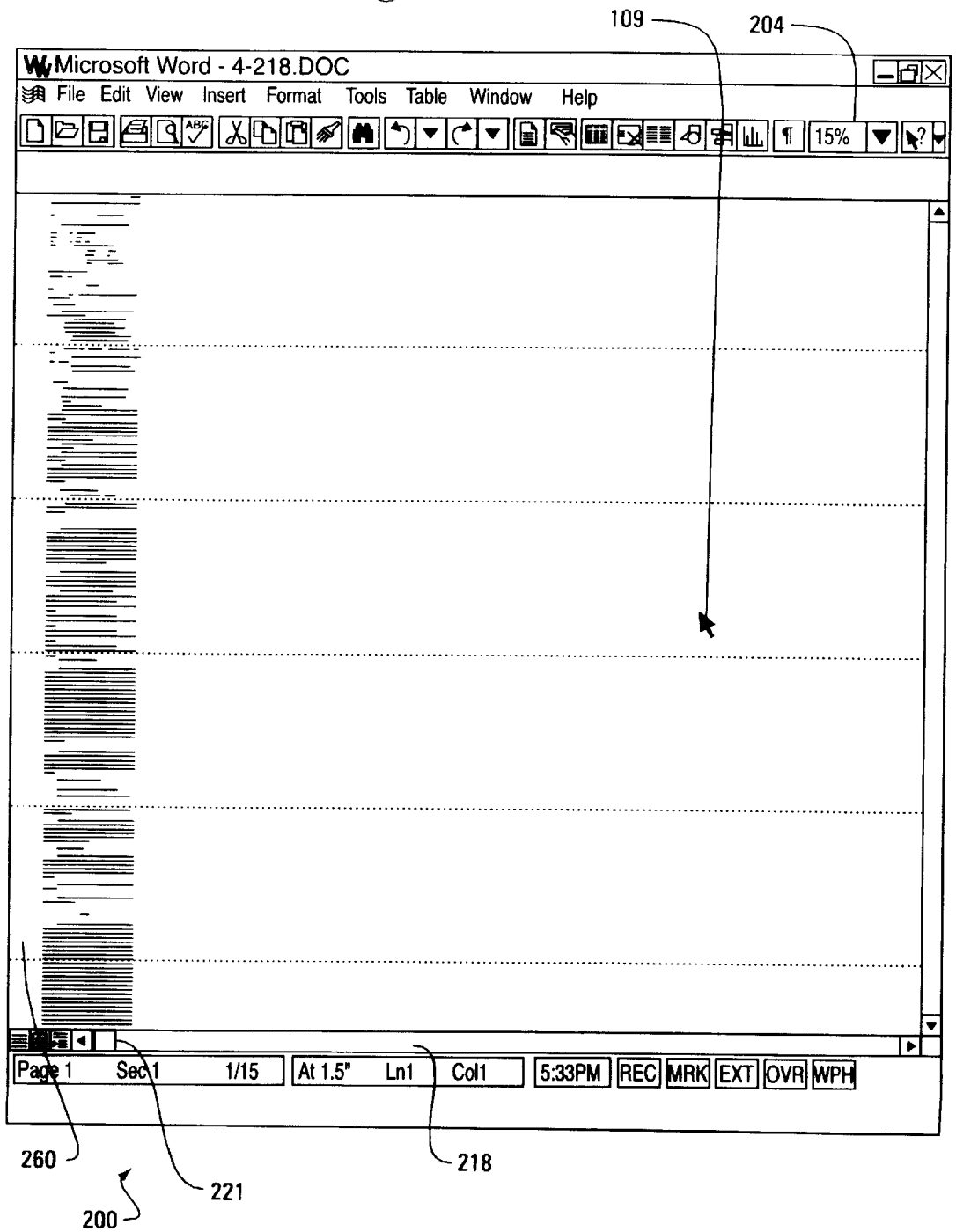
Figure 9A:
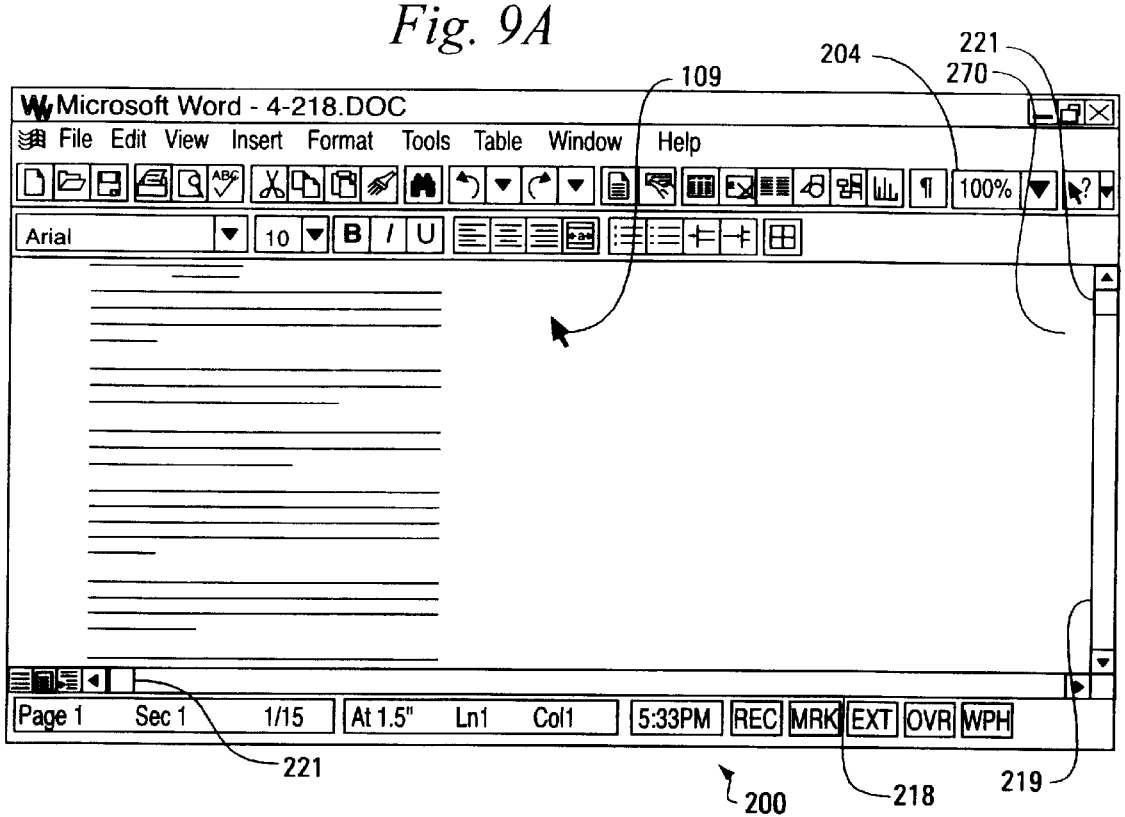
FIGS. 9A and 9B are front views of the display device showing an alternative embodiment of spatial navigation (zooming) of the present invention in another word processing document.
Figure 9B:
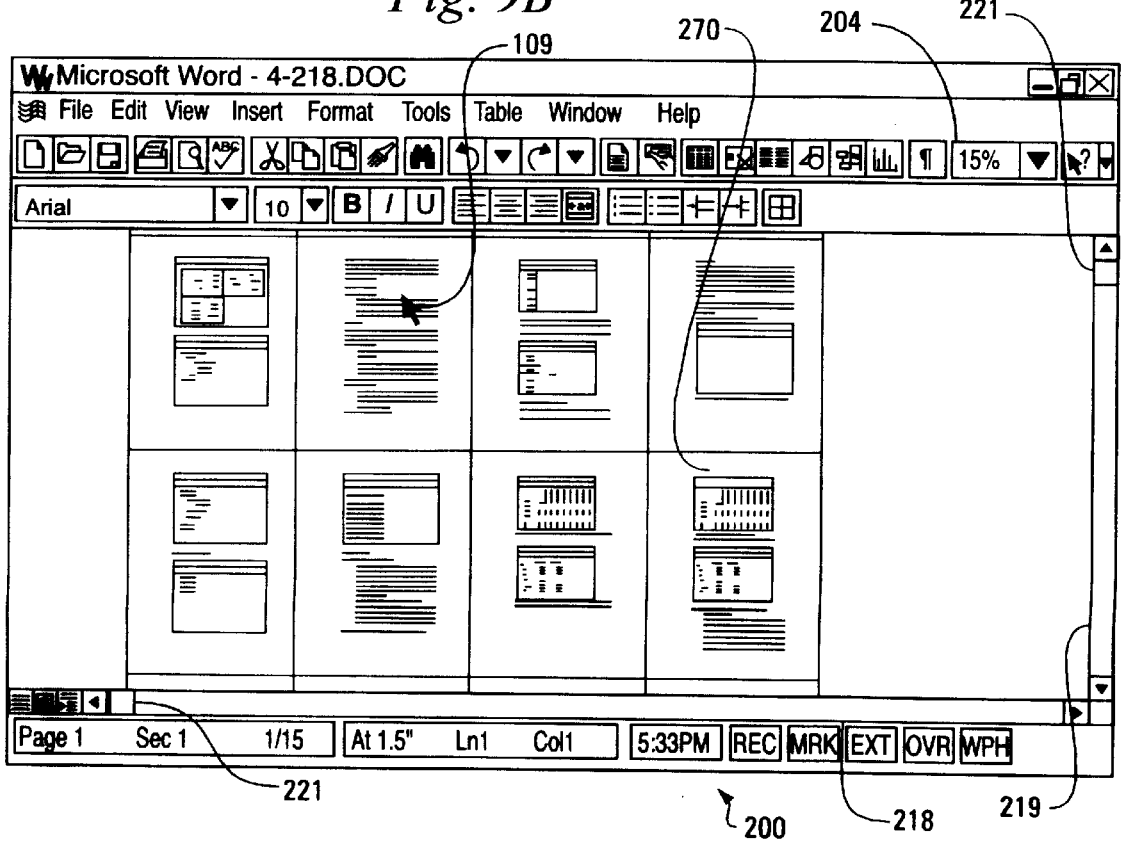

Referring to FIGS. 8A–8C, spatial navigation through an exemplary word processing document 260 produced by MICROSOFT® WORD® word processing application is shown. As the user rotates the wheel 106 away from the front end 28, the magnification of the document 260 changes from 100% (FIG. 8A) to 45% (FIG. 8B), to 15% FIG. 8C) where approximately six pages of the document are shown simultaneously within the window 200 on the display device 112. Each page in FIG. 8C is separated by a horizontal dotted line. In an alternative embodiment, as shown in FIGS. 9A and 9B, the size of another word processing document 270 can be altered within the window 200 from a magnification of 100% (FIG. 9A) to a magnification of 15% (FIG. 9B) by rotating the wheel 106. Notably, as shown in FIG. 9B, the pages of the document 270 are arranged in a two row by four column layout to thereby permit a greater number of pages to be displayed in the window 200 than in the embodiment of FIG. 8C. With either embodiment, the user can readily move through the document by moving the pointer 113 to a desired portion within a reduced size word processing document (FIGS. 8C or 9B), selecting that portion, and then rotate the wheel 106 toward the front end 28 to increase the magnification back to 100%, but at that desired portion of the document.

Figure 10A:
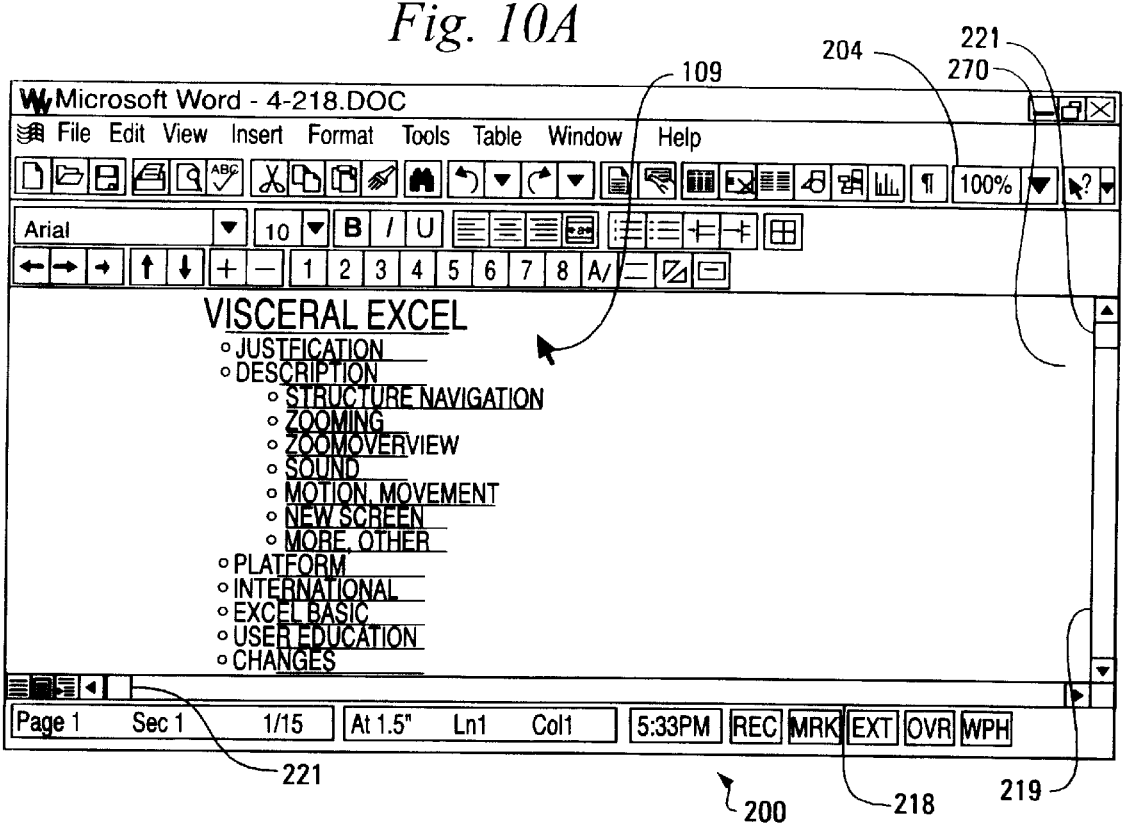
FIGS. 10A and 10B are front views of the display device showing data navigation of the present invention in the word processing document of FIGS. 9A–9B.
Figure 10B:
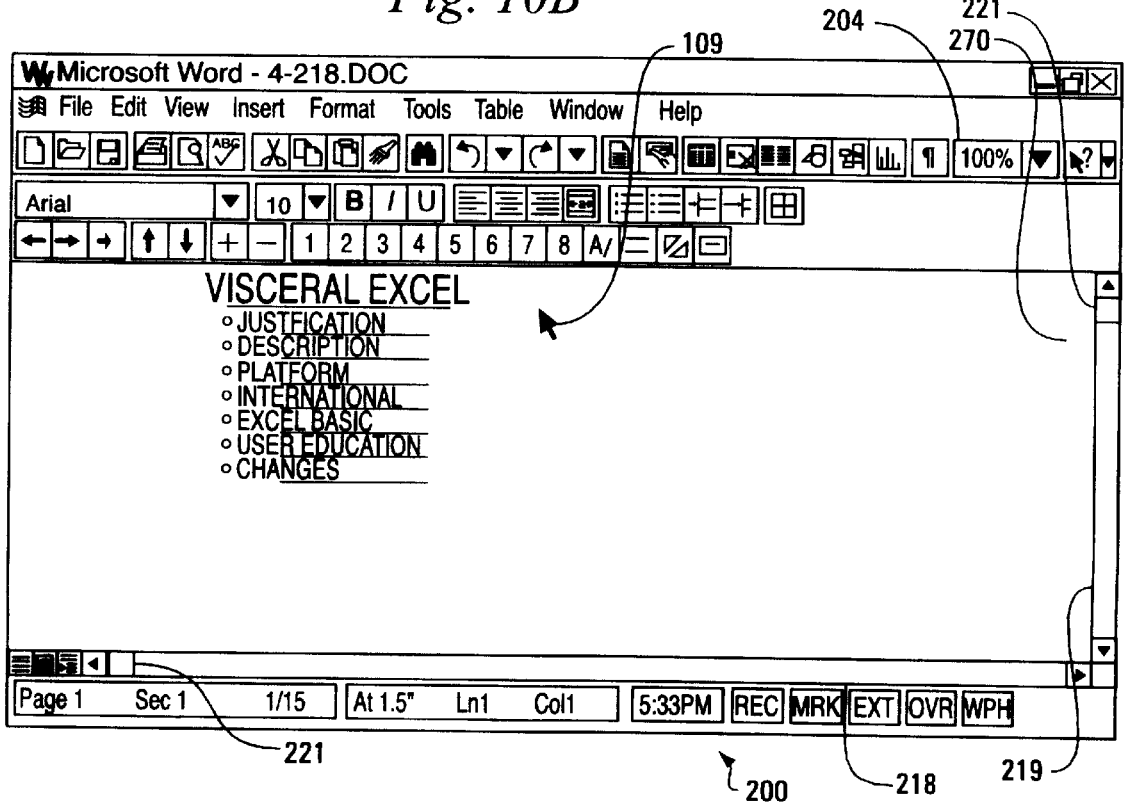

Data navigation can similarly be performed in the word processing document 270 under the computer system 100. For example, the user can rotate the wheel 106 one detent 155 away from the front end 28 to command the computer 109 to change from displaying the detailed text of the document 270 (FIG. 9A) on the display device 112, to displaying an outline of the document, as shown in FIG. 10A. The user can then rotate the wheel 106 by another detent 155 away from the front end 28 to command the computer 109 to change from displaying the outline of the document 270 to displaying a collapsed or condensed outline of the document, as shown in FIG. 10B.

In addition to spatially navigating through the document by increasing and decreasing the magnification ("zooming"), the computer system 100 can provide alternative spatial navigation embodiments or modes, such as (i) panning, (ii) automatic scrolling, (iii) roller scrolling, and (iv) scroll bar scrolling. Each of such alternate spatial navigation modes will be discussed separately below.

Figure 11A:
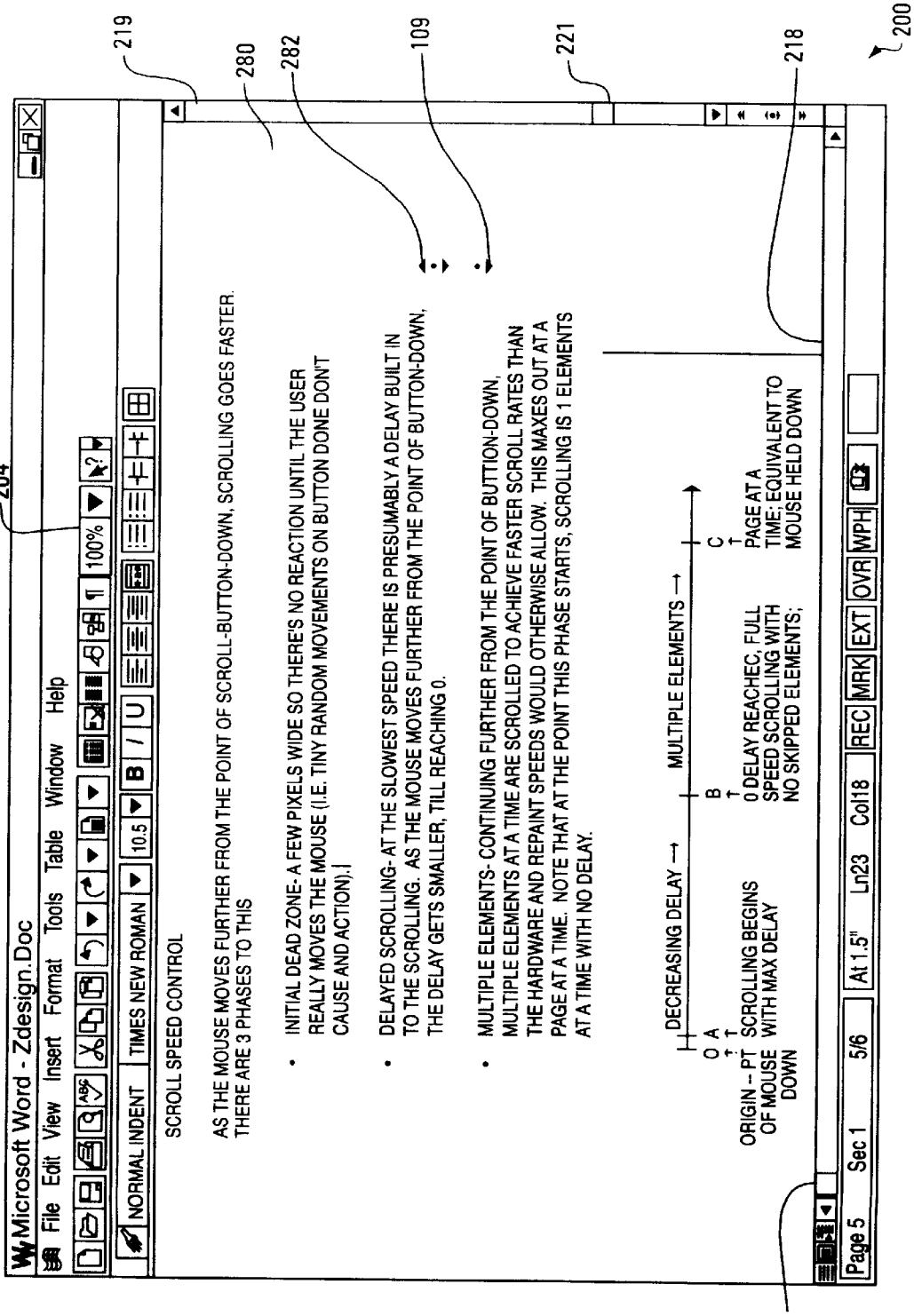
FIG. 11A is a front view of the display device showing spatial navigation (panning) of the present invention in a word processing document.

Referring to FIG. 11A, a second alternative embodiment of the present invention allows the computer system 100 to readily scroll through a document such as a word processing document 280 without the need for using the vertical scroll bar 219. When the user depresses the wheel 106 to actuate the roller switch 174, the resulting switch signals command the computer 109 to enter into the panning mode. Under the panning mode, the computer 109 initially displays an origin symbol 282 within the window 200 at a location where the pointer 113 is located. As shown in FIG. 11A, the origin 282 consists of upward and downward pointing triangles, which are separated by a dot. The user then moves or slides the mouse 101 toward or away from itself or herself while depressing and holding the roller switch 174, causing the ball 119 to rotate and generating X and Y axis computer signals that are input to the computer 109. In response thereto, the computer 109 moves the pointer 113 in a direction up or down on the display device 112 depending upon the received Y axis computer signal. The pointer 113 changes from an arrow, as shown in the previous figures, to a triangle and a dot, the triangle pointing in the direction indicated by the Y axis computer signal. The word processing document 280 then begins to scroll or pan in the indicated direction and continues to so pan until the user releases the wheel 106 and thus releases the roller switch 174.

For example, if the user moved the mouse toward himself, then the pointer 113 becomes a downward pointing triangle having a dot above it, as shown in FIG. 11A. The word processing document 280 then begins to pan downward in the direction of the downward pointing pointer 113. The speed at which the word processing document 280 pans downward can be exponentially proportional to the distance between the origin 282 and the pointer 113, as described in more detail below. If the user then moves the mouse 101 away from themselves, the pointer 113 returns to a position closer to the origin 282, which causes the rate of panning to decrease. As a result, a user can depress and hold the wheel 106 to actuate the roller switch 174, and move the mouse 101 in the desired direction in which he or she desires the document to scroll, to thereby pan the document in the desired direction, without relying on the vertical scroll bar 219. Additionally, the user can adjust the rate at which the document pans within the window 200 by moving the mouse 101, and thereby moving the pointer 113 closer and farther from the origin 282.

Figure 11B:
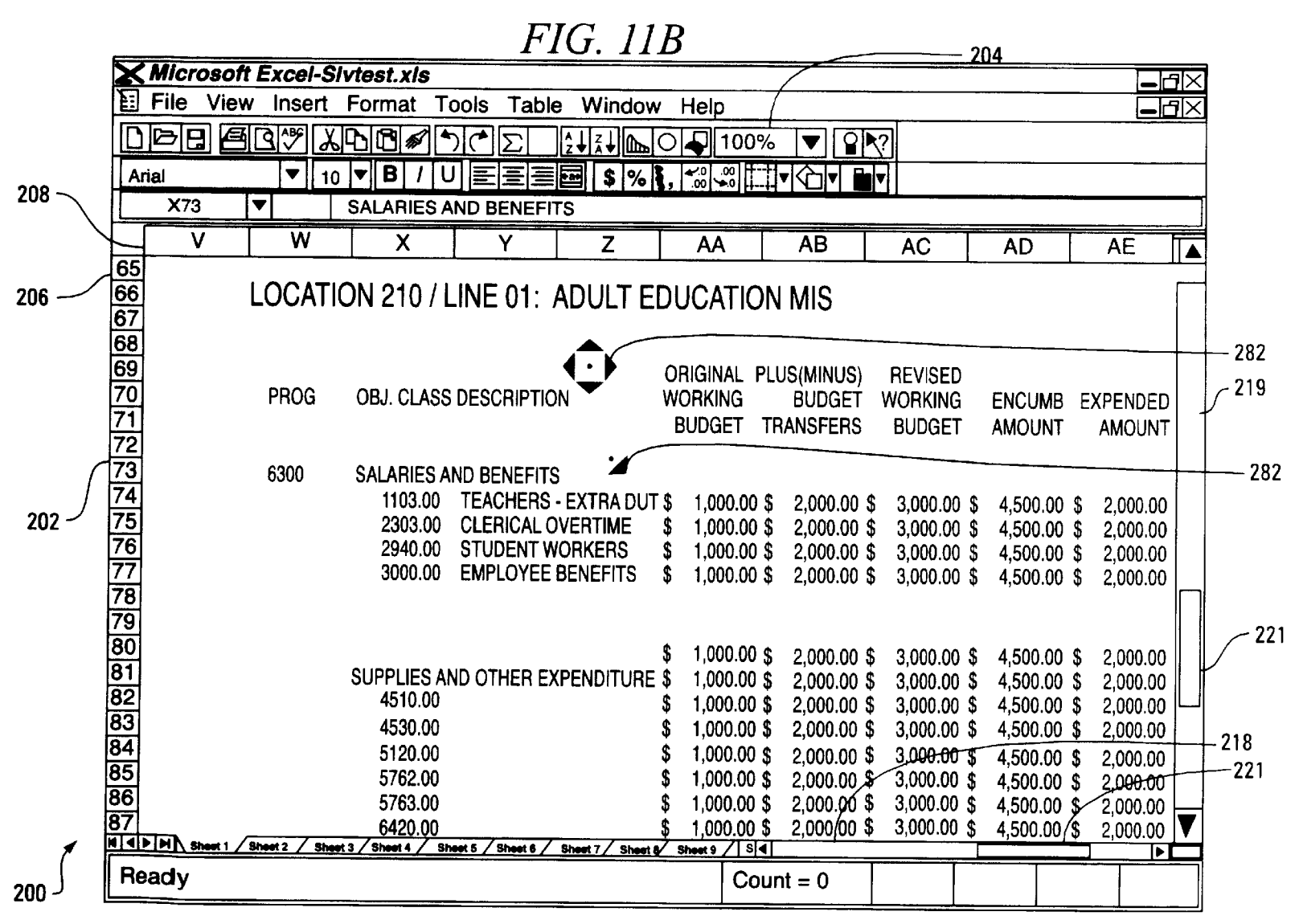

The panning mode of spatial navigation is similarly applicable to other applications, such as spreadsheet applications. Referring to FIG. 11B, the spreadsheet document 202 has a large two-dimensional area, and therefore, the panning mode is expanded to allow panning to occur not only in vertical, but also horizontal and diagonal directions. As a result, the origin 282 in the spreadsheet document 202 includes left and right facing triangles, as well as the upward and downward facing triangles. The computer 109 analyzes the X and Y axis computer signals to determine an initial panning direction based on movement of the mouse 101. By analyzing both the X and Y axis computer signals, the computer 109 allows the spreadsheet document 202 to scroll in upward, downward, left and right, as well as in diagonal directions based oh such signals. Therefore, as shown in FIG. 11B, as the user moves the mouse 101 in a direction toward himself and rightward, the pointer 113 becomes a triangle pointing downward and rightward, or "southeast." The spreadsheet document 202 then begins to pan in the southeast direction. The panning rate is dependent upon the distance between the pointer 113 and the origin 282. The spreadsheet document 202 continues to pan until the user releases the wheel 106 and deactuates the roller switch 174.

Figure 12A:
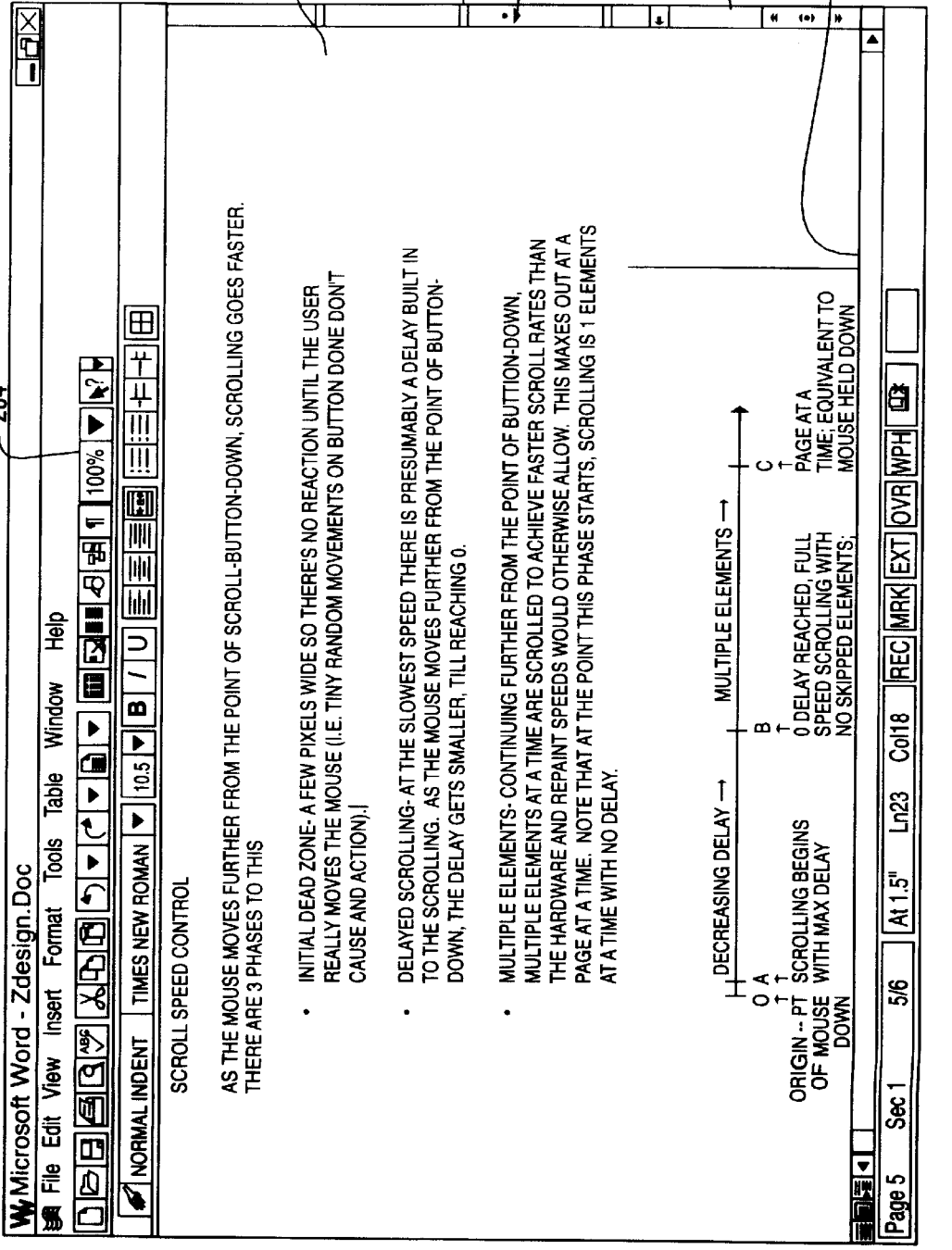
FIG. 12A is a front view of the display device showing spatial navigation (automatic scrolling) of the present invention in the word processing document of FIG. 11A.

Referring to FIG. 12A, the automatic scrolling mode of spatial navigation can be initiated when the user depresses and releases the wheel 106 which briefly actuates or "clicks" the roller switch 174. In response to clicking the roller switch 174, the computer 109 displays a vertical scroll bar 219' that has a marking or origin 284 centrally positioned along the length of the scroll bar. The pointer 113 is also moved and positioned over or adjacent the origin 284 within the vertical scroll bar 219'. The user then moves the mouse 101 to thereby generate Y axis computer signals to move the pointer 113 within the vertical scroll bar 219'. Movement of the pointer 113 downward from the origin 284 causes the word processing document 280 in FIG. 12A to scroll upward within the window 200, and vice versa.

As in the panning mode, the farther the pointer 113 is from the center origin 284, the faster the word processing document 280 automatically and continuously scrolls upward or downward depending upon whether the pointer 113 is moved above or below the origin 284. The computer 109 can also shade the background of the vertical scroll bar 219' in decreasing levels of color or gray both upward and downward from the origin 284. The gradations of color or shade thereby allow a user to more accurately position the pointer 113 at a location in the vertical scroll bar 219', and thereby achieve a desired speed of automatic scrolling, than if no such shading were present.

The panning mode of spatial navigation allows a user, by simply actuating the roller switch 174 once, and moving the mouse 101 in an initially intended scrolling direction, to establish an automatic and continuous scroll rate at which they can continuously read a document that scrolls upward (or downward) within the window 200. No additional user input is required once the automatic scrolling mode is initiated by the computer 109, and therefore, the user can perform other tasks with his or her hands while reading a document. As a result, the automatic scrolling mode can be referred to as an "automatic reading mode."

The automatic scrolling mode is terminated when the user depresses any key on the keyboard 107 or button such as the primary or secondary button 110 or .12 on the mouse 101. The speed can be adjusted by moving the mouse 101. When the user moves the mouse 101 in the reverse direction so that the pointer 113 returns to the origin 284, the continuous scrolling speed is returned to zero. The automatic scroll mode embodiment can be particularly useful for handicapped users.

The automatic scrolling mode can be applied to other documents such as spreadsheet documents. Within a spreadsheet document, while not shown, the automatic scrolling mode allows a user to automatically and continuously scroll either vertically or horizontally, depending upon the movement of the mouse 101 from the origin 284. Within a spreadsheet document, both the horizontal and vertical scroll bars 218 and 219 include the origin 284.

In a "manual" scrolling mode of spatial navigation ("roller scrolling"), the user can rotate the wheel 106 to scroll through a document whereby each detent 155 corresponds to, for example, two lines of text for a word processing document. Therefore, referring back to FIG. 9A, the user can rotate the roller toward the front end 28 and cause two lines of text in the word processing document 280 to scroll upward and be visible at the bottom in the window 200 for each detent 155. As a result, the user need not use the cursor movement keys or page up/down keys on the keyboard 116, or the vertical scroll bar 219. Additionally, the pointer 113 remains in its current location (assuming that the user does not move the mouse 101 as he or she rotates the wheel 106).

Figure 12B:
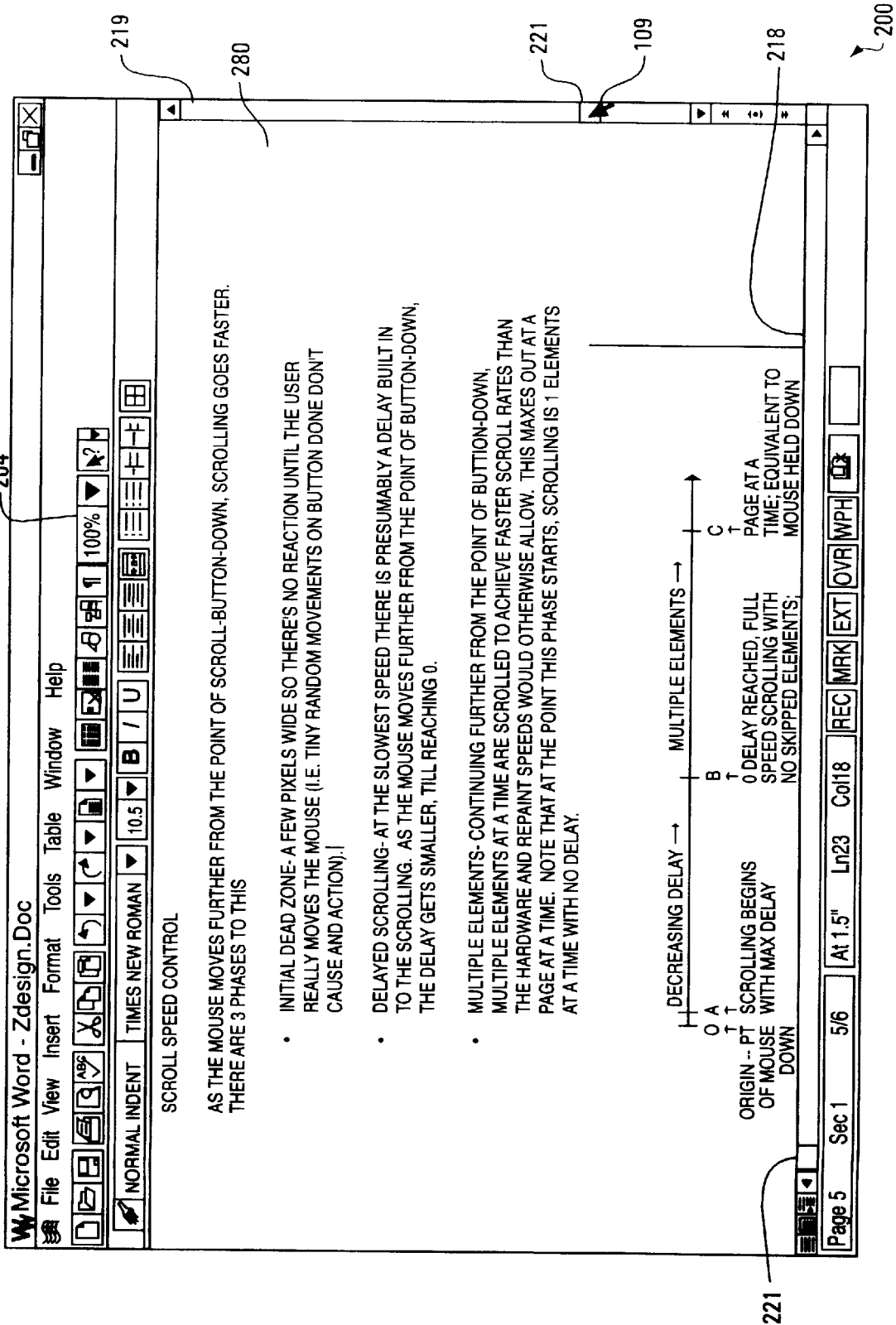
FIG. 12B is a front view of the display device showing spatial navigation (scroll bar scrolling) of the present invention in the word processing document of FIG. 11A.

Referring now to FIG. 12B, the scroll bar mode allows the user to depress the wheel 106 while depressing the control key on the keyboard 116 to scroll through a document using the horizontal and vertical scroll bars 218 and 219. After depressing and holding the wheel 106 and the control key on the keyboard 116, whenever the user moves the mouse 101 in an intended scrolling direction, the corresponding scroll bar thumb 221 in the horizontal or vertical scroll bar 218 or 219 moves in a manner corresponding to movement of the mouse. Therefore, if the user depresses the wheel 106, depresses the control key and then moves the mouse 101 downward (toward the user), the pointer 113 jumps to the scroll thumb 221 in the vertical scroll bar 219 and the scroll thumb moves downward. The word processing document 280, in response thereto, scrolls upward. After the user releases the control key, the pointer 113 jumps back to a position that it originally had within the window 200 before the scroll bar mode was initiated. While shown in FIG. 12B, the window 200 need not display the horizontal and vertical scroll bars 218 and 219 during the scroll bar mode of spatial navigation.

Figure 13:
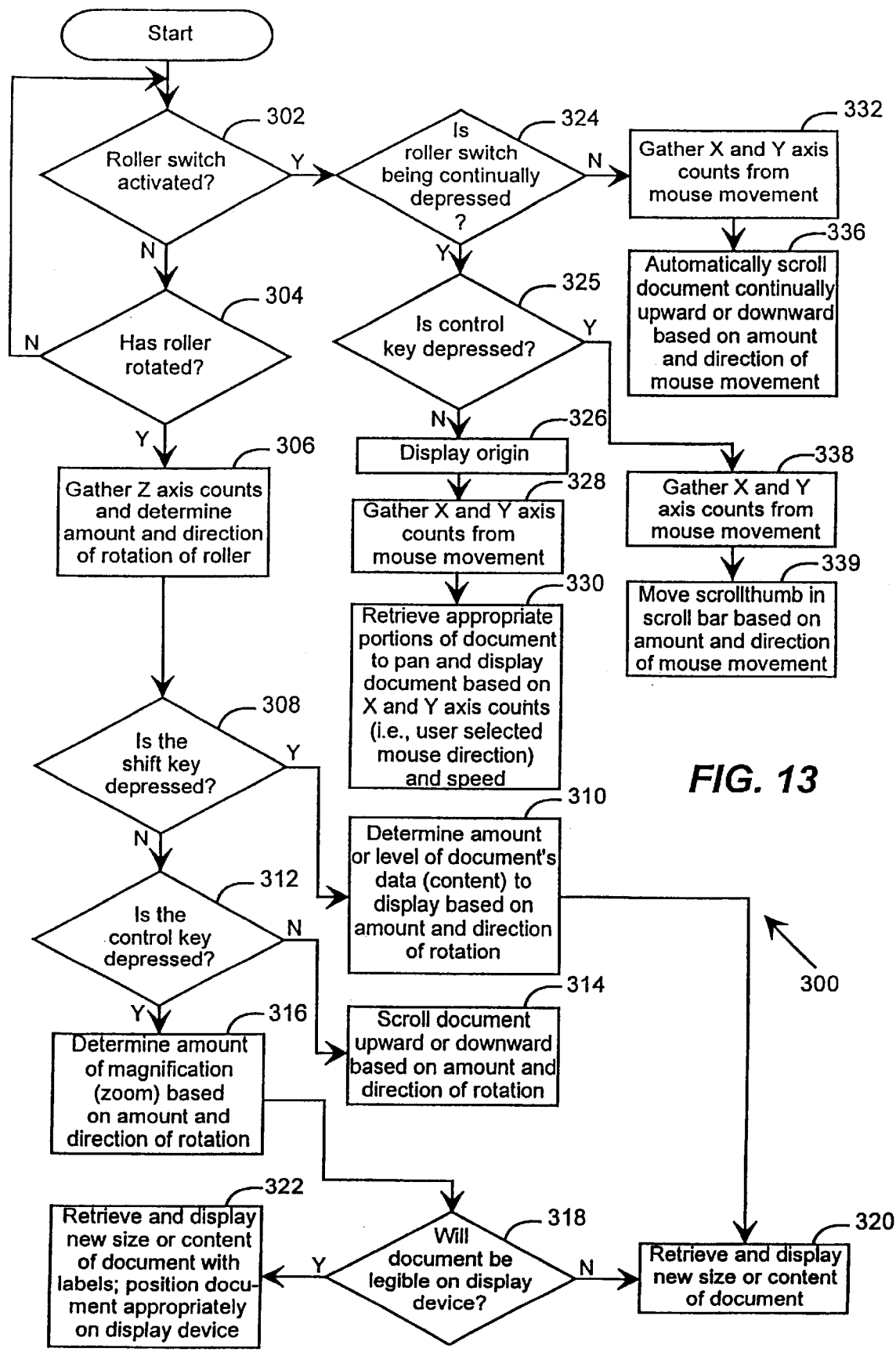
FIG. 13 is a flowchart showing the basic steps performed by the computer system of FIG. 1A to perform a preferred method of spatial and data navigation of the present invention.

Referring to FIG. 13, a flowchart diagram illustrates the main steps carried out under a routine 300 of the present invention for navigating through a word processing document in a word processing application. Based on FIG. 13 and the detailed description provided herein, those skilled in the art can readily construct source code for performing the present invention. Additionally, those skilled in the art can readily adapt and incorporate the routine shown in FIG. 13 for other computer software applications, such as spreadsheet applications, presentation applications, time management applications, etc.

The routine 300 begins in step 302 where the computer 109 determines whether the roller switch 174 is activated. If the roller switch 174 is not activated, then in step 304, the computer 109 determines whether the wheel 106 has rotated, and therefore whether Z axis computer signals have been received by the computer. If they have not been received, then step 304 loops back to step 302. When Z axis computer signals are received, then in step 306, the computer 109 gathers the Z axis signals to determine an amount and direction of rotation of the wheel 106 as is described above.

In step 308, the computer 109 determines if the shift key is depressed on the keyboard 116. If the shift key is depressed, then in step 310, the computer 109 enters into the data navigation mode described above. The computer 109 determines an amount or level of the document's data (content) to display on the display device 112 based on an amount and direction of rotation of the wheel 106. In other words, the computer 109 determines how many detents 155 the wheel 106 has rotated and therefrom determines the number of levels to show or suppress for the hierarchical data structure of the document.

If the shift key were not depressed on the keyboard 116 in step 308, then in step 312, the computer 109 determines whether the control key is depressed on the keyboard 116. If the control key on the keyboard 116 is not depressed in step 312, then in step 314 the computer 109 enters into the scroll mode. The computer 109 scrolls the word processing document upward or downward within the window 200 based on an amount and direction of rotation of the wheel 106.

If the control key on the keyboard 116 is depressed in step 312, then in step 316 the computer 109 enters one of the spatial navigation modes and determines an amount of magnification (zoom) based on the amount and direction of rotation of the wheel 106. Thereafter, the computer 109 in step 318 determines whether the document will be legible on the display device 112. If the document will be legible, then in step 320, the computer 109 retrieves the appropriate data from the memory 114 and displays the new size of the document on the display device 112. For example, if the current magnification were set at 100% and the user rotated the roller two detents 155 toward the front end 28, then in step 316 the computer 109 determined that the user wished the magnification level to increase by two levels (i.e., 30%). In step 318, the computer 109 determines that the document will still be legible on the display device 112 (and therefore, no labels 217 are required to be displayed with the document). Therefore, in step 320, the computer 109 increased the magnification of the document by 30% to 130%.

If the document will not be legible in step 318, then in step 322, the computer 109 retrieves any appropriate labels for display with the document, such as the labels 217 shown in FIG. 5. For example, if the current magnification were set at 100% and the user rotated the roller four detents 155 away from the front end 28, then in step 316 the computer 109 determined that the user wished the magnification level to decrease by four levels (i.e., 60%). In step 318, the computer 109 determines that the document will not be legible on the display device 112, and therefore, in step 322 decreases the magnification of the document by 60% to 40%, and displays the appropriate labels on portions of the document. The labels are surrogates of the data contained within the document, that is, the labels are higher level constructs that describe illegible data.

In step 322, the computer 109 can also position the document appropriately on the display device 112. Therefore, as shown in FIG. 9B, the computer displays multiple pages in an N row by M column layout in the window 200 when the computer 109 determines that data within the document is no longer legible (e.g., at a magnification of below 60%).

The computer 109 in step 322 can perform other adjustments to the documents displayed within the window 200 to improve the legibility of the document. For example, if the document were a spreadsheet document, and the magnification were reduced below 60%, then the computer 109 can suppress gridlines within the document (as shown in FIGS. 7A–7E) so that such lines are not visible (as shown in FIG. 4A–4C), if such gridlines are black. As a result, when the spreadsheet document is reduced below the 60% magnification, the gridlines do not cause the resulting document to be depicted as a visually noisy gray area. The computer 109 can draw a gray border around formulas shared by various columns or rows of data in a reduced spreadsheet document, while the computer draws a black border around names arranged in such document. Borders of tables and lists in a word processing document can be displayed in a word processing document that has been reduced to a magnification below 60%, but the text within the tables or lists is displayed at only a gray level tone.

Step 320 also follows step 310, and therefore, the computer 109 retrieves the appropriate data from the memory 114 and displays the new content for the document on the display device 112. Therefore, following step 310, if the wheel 10I6 were rotated one detent 155 away from the front end 28, and the window 200 currently displayed the detailed text of the word processing document, then the computer 10S determined in step 310 that the user desired to display the next higher level organization, of data in the document. Accordingly, in step 320, the computer 109 retrieves from the memory 114 (or other storage device) the detailed outline of the document. In step 320, the computer 109 also selects the appropriate portion of the detailed outline to display in the window 200 if the detailed outline was larger than the size of the window 200.

If the roller switch 174 is activated in step 302, then the computer 109 determines in step 324 whether the roller switch is being continually depressed. If the roller switch 174 is being continually depressed, then in step 325 the computer 109 determines whether the control key on the keyboard 116 is depressed. If the control key is not depressed, then in step 326 the computer 109 enters into the panning mode and displays the origin symbol 282 (FIG. 11A) at the location of the pointer 113 in the window 200. In step 328, the computer 109 gathers X and Y axis computer signals based on movement of the mouse 101 and rotation of the ball 119. In step 330, the computer 109 determines a preselected orientation or initial direction of the mouse 101 based on the X and Y axis computer signals (e.g., downward for the example of FIG. 11A). In step 330, the computer 109 continually retrieves appropriate portions of the document to pan and display on the display device 112, based on the X and Y axis computer signals (i.e., the user selected mouse direction). The computer 109 also determines the desired panning speed based on a distance between the origin 282 and a current position of the pointer 113, as explained below. Panning continues in step 330 until the user releases the roller switch 174.

If the roller switch 174 is not being continually depressed in step 324, then the computer 109 in step 332, gathers X and Y axis computer signals based on movement of the mouse 101. Thereafter, in step 336, the computer 109 enters into the automatic scroll mode. In step 336, the computer 109 continually retrieves appropriate portions of the document to scroll and display on the display device 112, based on the X and Y axis computer signals and the speed. The computer 109 determines the desired automatic scrolling speed based on a distance between the origin 284 and a current position of the pointer 113 in the vertical scroll bar 219' (FIG. 12A) as explained below.

If the roller switch 174 is being continually depressed in step 324 and the control key is being continually depressed in step 335, then in step 338 the computer 109 gathers X and Y axis computer signals based on movement of the mouse 101. Thereafter, in step 339, the computer 109 enters into the scroll bar mode (FIG. 12B). The computer 109 determines a desired scroll direction for the document and positions the pointer 113 on the appropriate scroll bar thumb 221 in the horizontal or vertical scroll bar 218 or 219. The computer 109 then continually retrieves appropriate portions of the document to scroll and display on the display device 112, based on the X and Y computer signals gathered in step 338 for the position of the pointer 113 and scroll bar thumb 221.

The routine 300 can, in steps 328, 332 and/or 338, gather Z axis computer signals. Therefore, the computer 109 can determine the desired speed and direction for panning, automatic scrolling and scroll bar scrolling based on rotation of the wheel 106, rather than movement of the mouse 101.

For spatial navigation, the routine 300 in steps 314, 316, 230 and 336, employs or calls known subroutines for moving, scaling and repainting the image of the document on the display device 112. For each detent, one or more logically adjacent groups of data, such as lines of pixels or text, are moved in the scrolling, panning, automatic scrolling and scroll bar scrolling modes. Video processors, video memory, and other hardware may be employed by the computer 109 to expedite such moving, scaling and repainting of the image of the document on the display device 112.

In step 310 of the routine 300, the computer 109 must determine an amount or level of data of the document to display based on the amount and direction of rotation of the wheel 106. If the pointer 113 has selected a single item (e.g. a particular data cell in a spreadsheet document), and the user rotates the wheel 106 away from the front end 28, the routine 300 performs a "Hide Detail" subroutine to hide any lower level detail of the selected item so that only higher level data is displayed on display device 112. High level pseudocode instructions for performing the "Hide Detail" subroutine are as follows:

Hide Detail:
if the selected item is the parent of displayed detail, hide that detail;
else if there is an enclosing group for the item (i.e., the item itself has a parent), hide the detail for the smallest such enclosing group and move the selection to the parent of the group being hidden;
else noop.

The selected item is a "parent" if it includes detail associated with that item. In other words, an item is a parent if it is a set containing subsets of data.

In step 310, if the user rotates the wheel 106 toward the front end 28, the routine 300 in step 310 performs a "show detail" subroutine for the selected item. This "show detail" subroutine reveals and displays on the display device 112 any lower level data associated with the selected item. For example, if the item were a parent, the corresponding information contained within its set (i.e., its "children") would be displayed. Exemplary high level pseudocode instructions for performing the "show detail" subroutine are as follows:

Show Detail:
if there is hidden detail belonging to the selected item, show it;
else noop.

The computer system 100 can allow the user to select more than one item in a document (e.g., several data cells in a spreadsheet document). For multiple selected items, exemplary high level pseudocode instructions for hiding and showing detail are as follows:

Multiple Item Hide Detail:
if any selected item is a parent with displayed detail, then hide the detail for all the parents selected;
else if there is an enclosing group for any selected item, hide the detail for the lowest enclosing groups for all the items, considering each item individually, and move the selection to the parents of the group being hidden;
else noop.

Multiple Item Show Detail:
For each item selected, if there is hidden detail belonging to it, show it;
else noop.

As explained above, the computer system 100 allows users to navigate through the area and content of documents in spreadsheet and word processing applications. The computer system 100, however, is applicable to any number of computer applications. For example, the computer system 100 can navigate through a series of entries in a calendaring or scheduler program, such as SCHEDULE+®, manufactured by Microsoft Corporation. In the data navigation mode, rotation of the wheel 106 allows the user to move between viewing annual, monthly, weekly, and daily entries in the user's calendar.

In a presentation application, such as MICROSOFT® POWER POINT®, the computer system 100 can allow a user to spatially navigate through a series of slides as is described above for navigating through a series of pages in a word processing document. In the data navigation mode, the user can also navigate through hierarchical arrangements of slides for the presentation, in a manner similar to that described above for the word processing application. In a file management application, such as MICROSOFT® EXPLORER®, the data navigation mode of the computer system 100 can allow the user to move with ease within files and subfiles of a complex file hierarchy by simply rotating the wheel 106 (possibly while also depressing the shift key).

The computer system 100 can also be used in an application, such as MICROSOFT® INTERNET EXPLORER®, for browsing through a massive networked series of logically linked documents, such as hypertext linked pages in the World Wide Web of the Internet. In the data navigation mode, the user can access through linked hypertext linked documents by rotating the wheel 106, and then return to their starting place by reversing rotation of the roller. For example, if the user is currently reading a document having a hypertext link on a related topic to another document, the user can use the mouse 101 to point to a link and then rotate the wheel 106 and thereby quickly access the linked document to review material on the related topic. After reviewing the related topic, the user can rotate the wheel 106 in the reverse direction to return to the original document The computer system 100 can furthermore be used in database applications such as MICROSOFT® ACCESS®. The data navigation mode of the computer system 100 can allow users to move between detailed and summary reports of data in a database by simply rotating the wheel 106 (possibly while also depressing the shift key). Additionally, users can readily change views of joined databases or wherever databases have hierarchical structure.

Since various applications have differing navigation needs, the differing types of spatial navigation (zooming, panning, automatic scrolling, manual scrolling and scroll bar scrolling) can be activated in differing ways depending upon the application. Table 1 below summarizes an exemplary structure for operating the computer system 100 with respect to the spreadsheet application EXCEL®, the word processing application WORD®, the scheduling application SCHEDULE+®, the presentation application POWER POINT®, the file managing application EXPLORER®, and the Internet navigation application INTERNET EXPLORER®, all manufactured by Microsoft Corporation.

In Table 1 above, "zoom" refers to adjusting magnification levels for a document and "datazoom" refers to data navigation within a document.

Figure 14A:
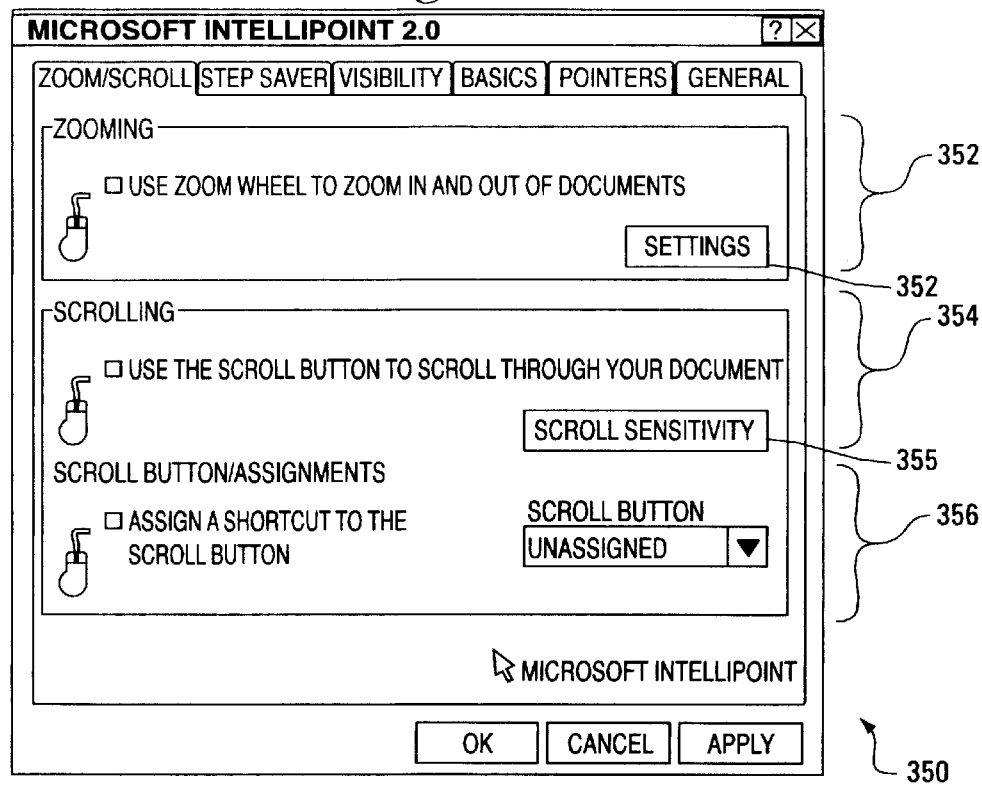
FIGS. 14A, 14B and 14C are front views of the display device showing a visual user interface for entering commands to adjust parameters of the method of FIG. 13.

The operation of the computer system 100 can have options or software switches to allow the user to customize various settings. Referring to FIG. 14A, a dialog box 350 displays three options 352, 354 and 356 for allowing a user to customize the computer system 100. The dialog box 350, and other dialog boxes described below, are displayable within the window 200, and may be accessed through a menu or selection of settings within the operating system running on the computer 109.

Under the first option 352, the user can adjust the default setting for the operation of the wheel 106. As described above and shown in Table 1, the user can enter into the zooming spatial navigation mode by depressing the control key while rotating the wheel 106. By selecting the option 352 (positioning the pointer 113 within the small white box and depressing the primary button 110), the computer system 100 always adjusts the magnification for a given document in the window 200 whenever the wheel 106 is rotated, without the need for the user to simultaneously depress a special function key on the keyboard 116, the roller switch 174, or other switch.

Figure 14B:
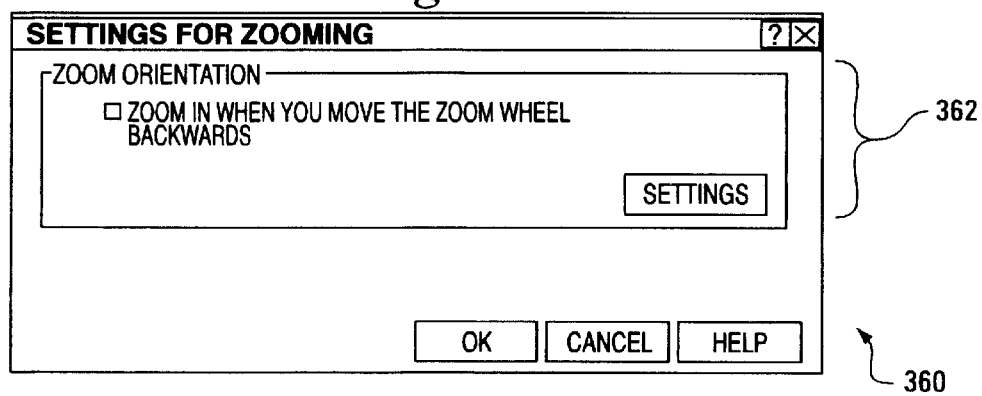

A "settings" button 353 in the first option 352 allows a user to adjust the setting for the orientation of the wheel 106. Referring to FIG. 14B, a dialog box 360 includes an option 362 that allows the user to change the default setting for the wheel 106. As described above, when the wheel 106 is moved toward the front end 28 of the mouse 101, the computer system 100 shows greater detail under data navigation, increases magnification under zooming, etc., and vice versa. By selecting the option 362, operation of the wheel 106 is reversed within the computer system 100. Therefore, when the option 362 is selected, rolling the wheel 106 away from the front end 28 causes less detail (content) of a document to be displayed in data navigation, the magnification to decrease in zooming, etc., and vice versa.

Referring back to FIG. 14A, in the second option 354, the user can adjust the default setting for actuation of the roller switch 174, from its default setting as shown in Table 1, to allowing the user to scroll or pan through a document after the roller switch has been clicked. In the third option 356, a user can assign a different command to actuation of the roller switch 174, from the default, settings of the switch for a given application as shown in Table 1.

TABLE 1

|  | Excel | Word | Scheduler | Power Point | Explorer | Internet Explorer |
|---|---|---|---|---|---|---|
| Roller | zoom | scroll | scroll | scroll | datazoom | datazoom |
| Shift key and roller | datazoom | datazoom | datazoom | datazoom | datazoom | datazoom |
| Control key and roller | zoom | zoom | zoom | zoom | zoom | zoom |
| Continually depress roller switch and drag mouse | pan | pan | pan | pan | pan | pan |
| Click roller switch | continuous scrolling | continuous scrolling | continuous scrolling | continuous scrolling | continuous scrolling | continuous scrolling |
| Continuously depress roller switch and control key | scroll bar scrolling | scroll bar scrolling | scroll bar scrolling | scroll bar scrolling | scroll bar scrolling | scroll bar scrolling |

Alternatively, the first and second options 352 and 354 can allow a user to simply enable use of the wheel for a particular function. Therefore, by selecting the first option 352, the user can enable zooming to occur in a given application by rotating the wheel 106. Similarly, by selecting the second option 354, the user can enable scrolling within a given application after actuating the roller switch 174.

Figure 14C:
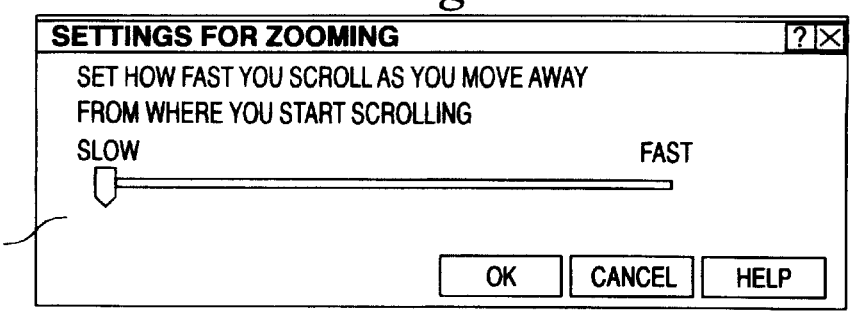

The second option 354 includes a "scroll sensitivity" button 355 that allows a user to adjust the speed at which automatic scrolling and/or panning occurs (the "scroll rate"). Referring to FIG. 14C, a dialog box 370 includes a slider bar 372 that the user can move with the pointer 113 to adjust the scroll rate of the automatic scrolling and panning modes of spatial navigation.

Figure 15:
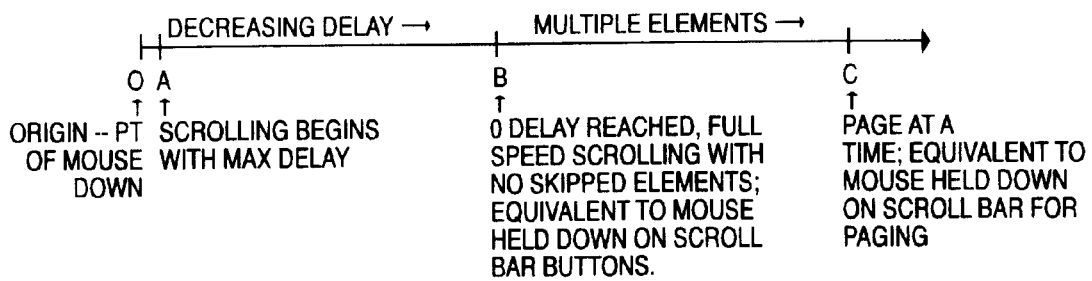
FIG. 15 is a schematic diagram showing variable scroll rate as a function of distance for spatial navigation of the present invention.

The scroll rate has three ranges or areas of speed change shown schematically in FIG. 15. Within a first range between the location of the origin 282 or origin point O and a point A few pixels away from the origin point O, the scroll rate is set at zero. Therefore, no scrolling occurs within a region proximate to the origin 282 (e.g., within 3–10 pixels from the dot at the center of the origin). As a result, minor movements of the mouse 101 or the wheel 106 do not cause the document to move in the window 200.

Within a second range between point A and a point B established at a preselected distance from point A, an established scrolling rate for a document in a particular application is delayed. Applications (or the operating system) running on the computer 109 have an established scroll rate for moving a document within the window 200 by way of; for example, the horizontal and vertical scroll bars 218 and 219 (FIG. 11A). Depending upon the speed of the processor 115, the amount of available memory 114, the complexity of the document and other factors, the established scrolling rate for documents vary. However, typical established scrolling rates for a word processing document having only text (and not tables or pictures) are between 10 and 15 lines of text per second. At this rate, most users cannot read individual data cells, words or lines of text in a document as they are being scrolled within the window 200.

Therefore, in steps 330 and 336 of the routine 300 (FIG. 13), the computer 109 applies a delay factor TimePerRow to the established scroll rate of the particular application so that the scroll and panning rates of document vary from the established scroll rate. The delay factor TimePerRow is a rate at which a given row of pixels are painted and displayed on the display device 112. The delay factor TimePerRow decreases as the pointer 113 moves from point A (origin 282) to point B. An exemplary equation for determining the delay factor TimePerRow is as follows:

$$TimePerRow = \frac{MaxTime}{n^{Exp}}. \quad (1)$$

In equation (1), the maximum delay factor MaxTime is a preselected value, such as 100 milliseconds per row of pixels, which is selected as a minimum scrolling rate found acceptable for most people when viewing a slowly scrolling document. The base n for the exponent Exp can have a value such as 2, while the exponent Exp may be determined from the following equation:

$$Exp = \left(\frac{P}{WaitWidth}\right) * MaxExp. \quad (2)$$

In equation (2), P refers to a distance, in pixels, that the pointer 113 is from the origin point O (origin 282), using known methods. The value WaitWidth is a preselected value depending upon the width of the display device 112. The value WaitWidth corresponds to the distance between points A and B, and therefore corresponds to the second range during which the established scroll rate is delayed. If the display device 112 has a width of approximately 800 pixels, then the value WaitWidth is approximately 200 pixels.

The maximum exponent value MaxExp is computed as follows:

$$MaxExp = \log_n(MaxTime/MinTime) \quad (3)$$

where the minimum delay value MinTime is a preselected value such as 4. The minimum delay value MinTime can correspond to approximately the established scroll rate in time per horizontal row of pixels. Using the above values for MaxTime, MinTime and n, the maximum exponent MaxExp has a value of 4.643856.

Under equation (1) above, the delay factor TimePerRow decreases until a distance of 200 pixels (the value of WaitWidth), at which point the scroll rate is approximately equal to the established scrolling rate for the particular application and hardware configuration. At point B, the established scroll rate continuously scrolls one horizontal line of pixels at a time at the maximum repaint or display rate for the application and hardware in the system 100.

In the third range, between point B and a point C established at a preselected distance from the point B, the established scroll rate for the application is increased. In other words, the delay factor TimePerRow becomes a multiplicative factor (greater than 1) that increases the established scrolling rate. The scroll rate between point B and point C continuously increase beyond the established scrolling rate for the application, which can require pixel elements to be skipped, i.e., two or more logically adjacent groups or horizontal lines of pixels are repainted at a time. Pixel elements are skipped when the scroll rate is faster than that allowed by the display device 112 and the computer 109 to paint or refresh lines of pixel elements on the display device. A maximum continuous scroll rate at point C is established under equation (1) to be a maximum scroll rate (e.g., one entire page or window at a time). As the pointer 113 moves past point C, the scroll rate remains fixed at the maximum value occurring at point C.

The present invention has been generally described above as scrolling vertically. The above description of the present invention applies equally to horizontal scrolling whereby the established scrolling rate is increased or decreased for vertical columns of pixels. Additionally, while the present invention has been generally described above for scrolling, the above-description applies equally to other methods of navigation such as panning.

Referring back to FIG. 14C, as the user moves the slider 372 within the dialog box 370, the computer 109 adjusts the distances, in numbers of pixels, between the points O, A, B and C (FIG. 15). Therefore, as the user moves the slider 372 toward the "fast" end of the slider scale, the distance between points O and A decreases from, e.g., 8 pixels to 4 pixels. Similarly, the distance between points A and B is reduced from, e.g., 200 pixels to 100 pixels. The distance between points B and C is likewise reduced. As a result, the user need only move the pointer 113 a short distance from the origin 282 (FIG. 11A) for the document to pan at a rapid scroll rate.

Figure 16:
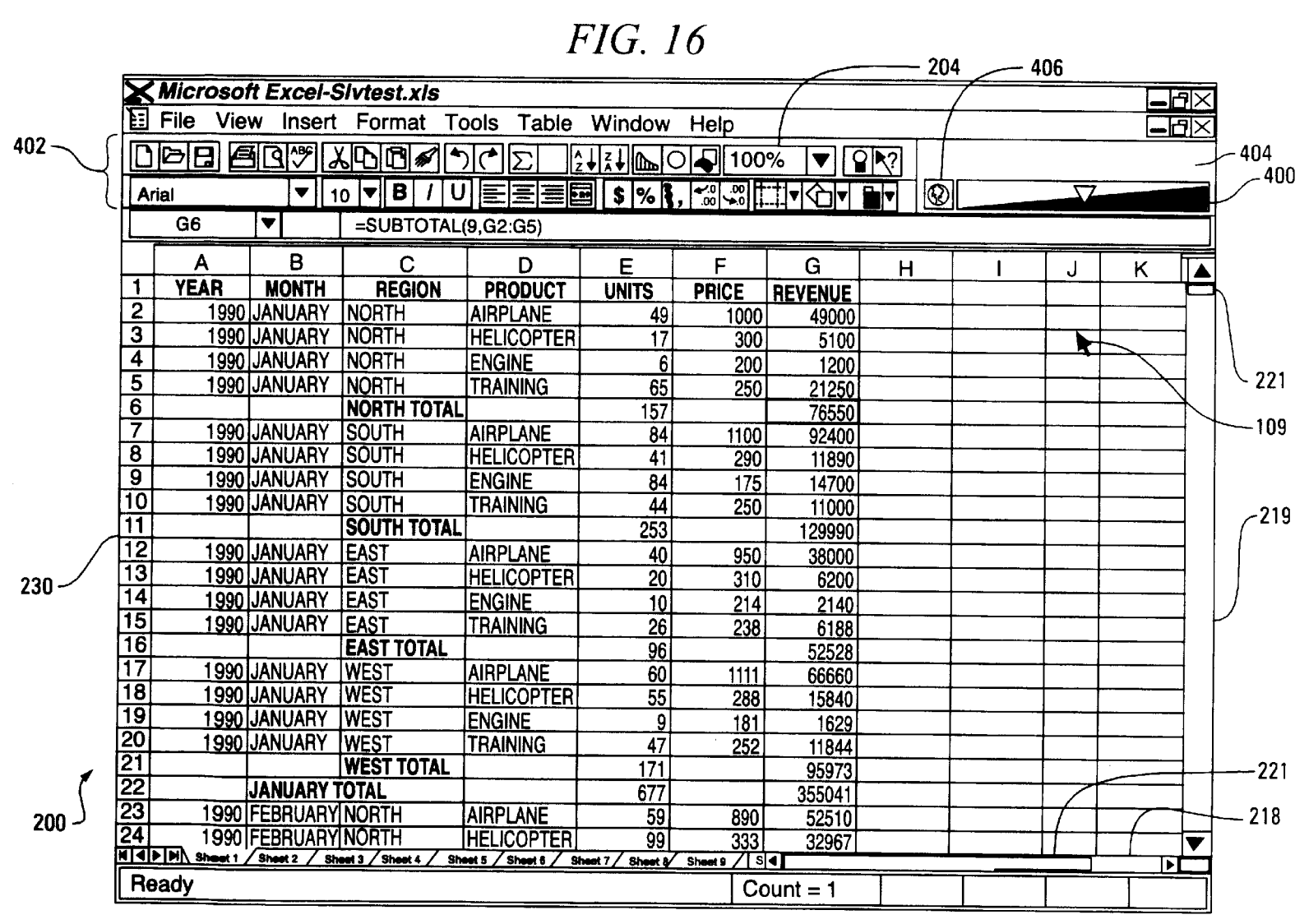

While the present invention has been described above for use with the mouse 101 having a wheel 106, the present invention can be applied to users without a mouse having a roller. Referring to FIG. 16, the window 200 showing the spreadsheet document 230 includes a navigation control 400 positioned within a tool bar portion 402 of the window. The navigation control 400 includes a slider button 404 that can be moved using a standard mouse under known techniques for manipulating objects in a window as mentioned above. By moving the slider button 404 leftward or rightward, magnification of the spreadsheet document 230 decreases or increases, in a manner similar to rotating the wheel 106 away from and toward the front end 28, all respectively.

As in the above embodiments, as the user moves the slider button 404, the magnification in the text box 204 correspondingly changes. Clicking the primary button 110 while the pointer 113 is not on the slider pointer 404, but to one side of it, causes the slider pointer to incrementally move toward the pointer 113 in 15% magnification intervals. The special function keys (shift, control, etc.) on the keyboard 116 can be employed in conjunction with the navigation control 400 to provide the other modes of navigation described above (i.e., data navigation, panning, automatic scrolling, manual scrolling and scroll bar scrolling). A "global" button 406 in the navigation control 400 can be depressed to jump to a global view of the document (e.g., 15% magnification as shown in FIG. 5).

Aspects of the present invention can also be performed without use of the navigation control 400 or the wheel 106. As a result, users employing standard two or three button mice (ie., mice having at least the primary and secondary buttons 110 and 112) can perform many of the modes of operation described above. For example, actuating the second or third button on such standard mice, the user can employ any mode of navigation described above that does not require rotation of the roller (e.g., panning, automatic scrolling and scroll bar scrolling).

The present invention has generally been described above as providing discrete changes in navigating through a document (e.g., magnification changes of 15% per detent 155). Discrete changes in navigating may be used when the speed of the processor 115 and amount of available memory 114 is such that continuous changes during navigation are not possible to show smooth transitions on the display device 112. Additionally, with the roller 105 such discrete changes provide a particularly intuitive and visceral method of incrementally navigating through and changing the display of a document in the window 200. However, in an alternative embodiment, the present invention can be equally applicable to continuous changes in navigating. For example, the roller assembly can omit the tactile feedback disk 148 so that the wheel 106 can be continuously and smoothly rotated, and the routine 300 modified to provide infinitely adjustable magnification levels of a document. Such a continuously rotatable wheel 106 provides a particularly intuitive method of continuously scrolling or zooming in a document, and continuous scrolling can be preferred in many applications such as word processing applications.

In such a continuous navigation embodiment, the routine 300 may employ subroutines that "gravitates" the zooming at a 100% magnification and the panning, automatic scrolling and other spatial navigation functions at a zero or no operation value. The gravity subroutines allow the user to more readily return the wheel 106 to the standard 100% magnification, or to a zero scrolling rate. For example, under the zooming mode the subroutine performed by the routine 300 may operate under the following values.

TABLE 2

| Previous zoom (%) | New zoom (%) | Result (%) |
|---|---|---|
| <=60 or >=130 | >80 & <120 | 100 |
| >60 & <=80 | >=90 & <=110 | 100 |
| >=110 & <130 | >=90 & <=110 | 100 |

In such a continuous navigation embodiment, if the user rotates the wheel 106 rapidly, the routine 300 may also perform a rounding function to establish the new zooming or magnification level based on the following table.

TABLE 3

| Difference between previous and new zoom levels (%) | Rounding |
|---|---|
| 1 to 7 | Remains at old zoom level |
| 8 to 30 | Nearest 5% |
| >30 | Nearest 10% |

By remaining at the old zoom level when the user moves between 1% and 7% from the old zoom level allows the user to retain the old zoom level after he or she has begun to change the level without having to precisely reposition the wheel 106 at its previous position. The routine 300 similarly performs gravity and rounding subroutines for the other navigation modes described above.

Certain objects within documents are difficult to display, such as complex pictures, tables, etc. Therefore, in order to speed the display of a document as it is being continually changed under one of the navigation modes, the computer 109 can simply draw the outlines of complex objects. As a result, the computer 109 can rapidly and continually change the display of the document until it reaches the intended size or position (e.g., the user ceases rotating the wheel 106 at a desired magnification), at which point the objects are then fully depicted on the display device 112.

U.S. patents and applications cited above are incorporated herein by reference as if set forth in their entirety.

Although specific embodiments of; and examples for, the present invention have been described for purposes of illustration, various modifications may be made without departing from the spirit and scope of the invention, as is known by those skilled in the relevant art. For example, although all features of the embodiments described herein are believed to contribute to the improved ergonomic results of the present invention, modification or omission of an individual feature or features may be made and still gain benefits of the present invention. As another example, while data navigation has been described above as moving between a detailed word processing document and a collapsed outline for the document, the data navigation mode could also be used to show revision marks, and other changes sequentially made to a document over time by rotating the wheel 106. Therefore, as the user rotated the roller away from the front end 28, the document would show decreasingly older revisions made to that document.

As a further example of modifications that can be made using the present invention, while labels 217 have been described above as being applied to spreadsheet documents, the computer 109 can similarly apply them to word processing documents. Therefore, the computer 109 can apply headings in an outline to appropriate portions of a document when the document's magnification level drops below 60%. Similarly, page numbers can be displayed below the 60% magnification level.

The teachings provided herein of the present invention may be applied to other computer input devices, including trackballs, optical mice or pen and tablets where the Z axis computer signal is produced by a roller provided on the optical mouse or the pen. These and other changes may be made to the invention in light of the above detailed description. Accordingly, the invention is not limited by the disclosure, but instead its scope is to be determined entirely by reference to the following claims.

What is claimed is:

1. An input device for a computer comprising:
    a housing having an upper surface;
    first and second input buttons at the upper surface of the housing;
    a first switch actuable by the first button and adapted to produce a first switch signal upon actuation of the first button;
    a second switch actuable by the second button and adapted to produce a second switch signal upon actuation of the second button;
    a rotatably mounted roller projecting from the upper surface of the housing, at a location between the first button and the second button, the roller being mounted to an axle;
    a tactile assembly coupled to the roller that allows the roller to be moved to only a plurality of discrete positions, each discrete position providing a tactile feedback to the user to indicate movement of the roller to the discrete position, the tactile assembly including a tactile feedback disk having a plurality of radially extending bumps having detents formed therebetween and a bias engagement member having an integrally formed protrusion that extends toward and is received between the detents of the tactile feedback disk;
    rotatable ball projecting from the housing;
    first and second transducers positioned within the housing and coupled to the rotatable ball, the first and second transducers producing first and second signals indicative of rotation of the ball;
    a third transducer positioned within the housing and coupled to the roller, the third transducer producing a third signal indicative of rotations of the roller; and
    a control circuit coupled to the first and second switches and to the first, second and third transducers for receiving the first and second switch signals and the first, second and third signals and outputting computer signals to the computer in response thereto.

2. The input device of claim 1, further comprising a third switch coupled to the control circuit and positioned adjacent to the roller, wherein the roller is non-rotatively movably mounted within the housing for movement between a rest position and an actuation position, and wherein the third switch is adapted to produce a third switch signal when the roller is moved from the rest position to the actuation position.

3. The input device of claim 1, further comprising a third switch coupled to the control circuit and positioned adjacent to the roller wherein the roller is rotatively moveably mounted within the housing for movement between a rest position and an actuation position, wherein the third switch is adapted to produce a third switch signal when the roller is moved from the rest position to the actuation position, and wherein the roller is rotatable to produce the third signal while substantially simultaneously moved to the actuation position to cause the third switch to produce the third switch signal.

4. The input device of claim 1 wherein the third transducer includes at least one brush electrode and an encoder ring affixed to the tactile feedback disk on a side opposite of the bumps, the encoder ring having radially extending and alternately arranged conductive and nonconductive portions that rotate and contact the at least one brush electrode as the roller rotates.

5. The input device of claim 1 wherein the roller has a pair of pins axially extending therefrom, wherein the tactile assembly and third transducer together form an encoder assembly that is operatively coupled to at least one of the pins of the roller, and wherein the input device further comprises a third switch, a carriage and a spring member, the third switch being coupled to the control circuit and positioned adjacent to the carriage, and the carriage rotatably receiving the roller and fixedly holding the encoder assembly in operative engagement with the roller, wherein the spring member is positioned between a bottom side of the housing and the carriage to apply an upward biasing force to the carriage, and wherein the carriage is depressable to actuate the third switch, the carriage further including a pair of members extending away from the roller, with a groove formed in each member, and wherein the encoder assembly includes an outer casing having longitudinally extending flanges that are slidably received within the grooves of the members.

6. The input device of claim 5, further comprising a web-type electrical connector coupled between the encoder assembly and the control circuit, the electrical connector having at least two transversely extending bends formed therein so as to produce a substantially flattened portion of the electrical connector between the bends, the bends forming hinge lines for pivotal movement of the electrical connector as the carriage is depressed to actuate the third switch.

7. The input device of claim 5 wherein the housing includes a lower surface and a plurality of vertical guides extending upwardly from the lower surface of the housing and slidably retaining the carriage over the spring member.

8. The input device of claim 5 wherein the spring member includes first and second springs that provide a combined spring force at between about 30 and 55 grams of force, wherein the third switch requires approximately 40 to 75 grams of force to actuate, and wherein the roller requires approximately 70 to 130 grams of force to depress and actuate the third switch.

9. An input device for providing user commands to a computer comprising:
    a body having upper and lower portions;
    first and second input buttons positioned at the upper portion of the body;
    first and second switches actuable by the first and second buttons, respectively, and adapted to produce first and second switch signals upon actuation of the first and second switches, respectively;
    first and second transducers positioned within the housing and producing first and second transducer signals based on user commands;
    a carriage positioned within the body;
    a roller rotatably mounted within the carriage and projecting outward from the upper portion of the body, at a position between the first and second buttons, the roller and the carriage being depressable as a unit;
    a third transducer positioned within the body and coupled to the roller, the third transducer producing a third transducer signal indicative of the rotations of the roller;

a third switch positioned adjacent to the carriage to actuate the third switch and produce a third switch signal in response upon depression of the roller and carriage as a unit;

a control circuit coupled to the first, second and third switches and to the first, second and third transducers for receiving the first, second and third switch signals and the first, second and third transducer signals and outputting computer signals to the computer in response thereto; and wherein the roller includes an axle and wherein the third transducer includes a tactile assembly having a tactile feedback disk and a biased engagement member, wherein the tactile feedback disk is operatively coupled to the axle and has a plurality of regularly extending detents, wherein the biased engagement member has a protrusion member that extends toward and is received between the detents of the tactile feedback disk, so that the roller is movable to only a plurality of discrete positions, each discrete position providing a tactile feedback to the user to indicate movement of the roller to the discrete position.

10. The input device of claim 9, further comprising a spring member positioned between the lower portion of the body and the carriage to apply an upward biasing force to the carriage;

wherein the carriage fixedly holds the third transducer in operative engagement with the roller for travel with the carriage, and wherein the input device further comprises an electrical connector coupled between the third transducer and the control circuit, the electrical connector having at least two transversely extending bends formed therein that produce a portion of the electrical conductor between the bends, the bends acting as hinge points for pivotal movement of the electrical connector as the roller and carriage are depressed as a unit to actuate the third switch.

11. The input device of claim 9, further comprising a rotatable ball projecting from the housing, wherein the first and second transducers are coupled to the ball and produce the first and second transducer signals indicative of rotation of the ball, wherein the upper portion of the body forms a top side of the body and includes a post member extending downward toward the ball to protect the input device from possible damage caused by movement of the ball within the body, the post member being split into first and second post portions each having an outside surface and an inside surface, the inside surfaces being spaced apart to define a void formed therebetween; and wherein the first and second buttons are coupled with a hinge member, the first and second buttons each having a top surface and being positioned at the top side of the upper portion of the body, the hinge member being secured to the upper portion, the hinge member including first and second primary hinge portions extending outward of the first and second post portions, respectively, and having at least one secondary hinge portion extending within the void and between the first and second post portions, wherein the first and second primary and at least one secondary hinge portions have a hinge line extending transversely to the buttons.

12. The input device of claim 9 further comprising a spring member positioned between the lower portion of the body and the carriage to apply an upward biasing force to the carriage, wherein the spring member includes first and second springs that provide a combined spring force of between about 30 and 55 grams of force, wherein the third switch requires approximately 40 to 75 grams of force to actuate, and wherein the roller requires approximately 70 to 130 grams of force to depress and actuate the third switch.

13. The input device of claim 9 wherein the roller is rotatably moveable to cause the third transducer to produce the third transducer signal, while substantially simultaneously the roller and carriage are depressable to cause the third switch to generate the third switch signal.

14. In an input device for providing user commands to a computer, the input device including a body having upper and lower portions, and a control circuit for outputting computer signals to the computer, a user command input assembly comprising:

a carriage positioned within the body;

a roller rotatably mounted within the carriage and projecting outward from the upper portion of the body, the roller including an axle and the roller and carriage being depressable as a unit;

a transducer positioned within the body and coupled to the roller, the transducer producing a transducer signal indicative of rotations of the roller, wherein the transducer includes a tactile assembly having a tactile feedback disk and a biased engagement member, wherein the tactile feedback disk is operatively coupled to the axle and has a plurality of regularly extending detents, wherein the biased engagement member, has a protrusion member that extends toward and is received between the detents of the tactile feedback disk, so that the roller is movable to only a plurality of discrete positions, each discrete position providing a tactile feedback to the user to indicate movement of the roller to the discrete position;

a spring member positioned between the lower portion of the body and the carriage to apply an upward biasing force to the carriage; and a switch positioned adjacent to the carriage to actuate the switch and produce a switch signal upon downward depression of the roller and carriage as a unit, the control circuit being coupled to the transducer and to the switch to receive the transducer and switch signals, and outputting the computer signals in response thereto.

15. The user command input assembly of claim 14 wherein the carriage fixedly holds the transducer in operative engagement with the roller for travel with the carriage, and wherein the input device further comprises an electrical connector coupled between the transducer and the control circuit, the electrical connector having at least two transversely extending bends formed therein that produce a portion of the electrical conductor between the bends, the bends acting as hinge points for pivotal movement of the electrical connector as the roller and carriage are depressed as a unit to actuate the switch.

16. The user command input assembly of claims 14 wherein the spring member provides a spring force between about 30 and 55 grams of force wherein the switch requires approximately 40 to 75 grams of force to actuate, and wherein the roller requires 70 to 130 grams of force to depress and actuate the switch.

17. An input device for a computer comprising:

a housing having an upper surface;

first and second input buttons at the upper surface of the housing;

a first switch actuable by the first button and adapted to produce a first switch signal upon actuation of the first button;

a second switch actuable by the second button and adapted to produce a second switch signal upon actuation of the second button;

a rotatably mounted roller projecting from the upper surface of the housing, at a location between the first button and the second button, the roller having a pair of pins extending axially therefrom;

a tactile assembly coupled to the roller that allows the roller to be moved to only a plurality of discrete positions, each discrete position providing a tactile feedback to the user to indicate movement of the roller to the discrete position;

a rotatable ball projecting from the housing;

first and second transducers positioned within the housing and coupled to the rotatable ball, the first and second transducers producing first and second signals indicative of rotation of the ball;

a third transducer positioned within the housing and coupled to the roller, the third transducer producing a third signal indicative of rotations of the roller;

a control circuit coupled to the first and second switches and to the first, second and third transducers for receiving the first and second switch signals and the first, second and third signals and outputting computer signals to the computer in response thereto;

wherein the roller has a pair of pins axially extending therefrom, wherein the tactile assembly and third transducer together form an encoder assembly that is operatively coupled to at least one of the pins of the roller, and wherein the input device further comprises a third switch, a carriage and a spring member, the third switch being coupled to the control circuit and positioned adjacent to the carriage, and the carriage rotatably receiving the roller and fixedly holding the encoder assembly in operative engagement with the roller, wherein the spring member is positioned between a bottom side of the housing and the carriage to apply an upward biasing force to the carriage, and wherein the carriage is depressible to actuate the third switch, the carriage further including a pair of members extending away from the roller, with a groove formed in each member, and wherein the encoder assembly includes an outer casing having longitudinally extending flanges that are slidably received within the grooves of the members.

18. A computer input device, comprising:

a housing having an upper portion and a lower portion;

a ball rotatably mounted to the housing;

a post extending from the upper portion of the housing toward the lower portion of the housing and having a first end disposed proximate the ball;

a first transducer assembly operably coupled to the ball to provide a first sensor signal indicative of rotation of the ball;

first and second buttons, each button having first generally laterally extending edges;

second and third transducers arranged relative to the first and second buttons, respectively, to sense actuation of the first and second buttons and to provide second and third signals indicative of the actuation; and a hinge, coupled to the housing and the first and second buttons and disposed about the post, configured to provide a substantially uniform return force across the first lateral edge of the first button and to provide a substantially uniform return force across the first lateral edge of the second button.

19. The computer input device of claim 18 wherein the first and second buttons define an aperture therebetween, and further comprising:

a rotatable member, rotatably mounted relative to the housing and extending away from the lower portion of the housing through the aperture.

20. The computer input device of claim 19 wherein the first end of the post is split into first and second post portions laterally spaced from one another.

21. The computer input device of claim 20 wherein the hinge defines a hinge axis and comprises:

a first hinge member coupled to the first button and pivotable about the hinge axis; and a second hinge member coupled to the second button and pivotable about the hinge axis.

22. The computer input device of claim 21 wherein the first hinge member defines a first opening disposed to receive the first post portion upon pivotal movement of the first hinge member about the hinge axis.

23. The computer input device of claim 22 wherein the second hinge member defines a second opening disposed to receive the second post portion upon pivotal movement of the second hinge member about the hinge axis.

24. The computer input device of claim 23 wherein the first hinge member includes first and second hinge portions disposed on laterally opposite sides of the first opening and extending from the first button to the hinge axis.

25. The computer input device of claim 24 wherein the second hinge member includes first and second hinge portions disposed on laterally opposite sides of the second opening and extending from the second button to the hinge axis.

26. The computer input device of claim 25 wherein the hinge further comprises:

a connection portion disposed on an opposite side of the hinge axis from the first and second hinge members and being rigidly coupled to the upper portion of the housing.

27. A computer input device, comprising:

a housing having an upper portion and a lower portion;

a ball rotatably mounted to the housing;

a first transducer assembly operably coupled to the ball to provide a first signal indicative of rotation of the ball;

first and second buttons, each button having first and second generally laterally extending edges extending between first and second generally longitudinally extending edges;

second and third transducers arranged relative to the first and second buttons, respectively, to sense actuation of the first and second buttons and to provide second and third signals indicative of the actuation;

a first hinge pivotable about a pivot axis and connected to the first button at least in a first connection region disposed closely proximate the first longitudinal edge and a second connection region disposed closely proximate the second longitudinal edge;

a second hinge pivotable about the pivot axis and connected to the second button at least in a first connection region disposed closely proximate the first longitudinal edge of the second button and a second connection region disposed closely proximate the second longitudinal edge of the second button; and a post disposed generally between the first and second hinges and extending from the upper portion of the housing toward the lower portion of the housing and having a first end disposed proximate the ball.

28. The computer input device of claim 27 wherein the first end of the post comprises:

first and second laterally spaced portions, the first hinge having a first hinge portion extending from the pivot axis to the first button between the first and second laterally spaced portions of the post and a second hinge portion extending from the pivot axis to the first button and being laterally spaced from the first hinge portion.

29. The computer input device of claim 28 wherein the second hinge comprises:

a third hinge portion extending from the pivot axis to the second button between the first and second laterally spaced portions of the post and a fourth hinge portion extending from the pivot axis to the second button and being laterally spaced from the third hinge portion.

30. The computer input device of claim 29 wherein the first and second buttons define an aperture therebetween, and further comprising:

a rotatable wheel, rotatably mounted relative to the housing and extending away from the lower portion of the housing through the aperture.

31. A computer input device, comprising:

a housing having an upper portion and a lower portion;

a ball rotatably mounted to the housing;

a first transducer assembly operably coupled to the ball to provide a first signal indicative of rotation of the ball;

first and second pivotal buttons, each button having first and second generally laterally extending edges extending between first and second generally longitudinally extending edges and a true longitudinal center line disposed between the first and second longitudinally extending edges;

second and third transducers arranged relative to the first and second buttons, respectively, to sense actuation of the first and second buttons and to provide second and third signals indicative of the actuation; and a hinge assembly pivotally coupling the first and second buttons to the housing, the hinge assembly having first and second apertures therein which tend to displace an effective center line of each of the first and second buttons from the true center lines thereof, the hinge assembly being configured to reduce the displacement of the effective center lines from the true center lines such that the effective center lines approximate the true center lines.

32. The computer input device of claim 31 wherein the first aperture is proximate the first button and the second aperture is proximate the second button and wherein the hinge assembly defines a hinge axis and comprises:

first and second supports extending between the hinge axis and the first button on opposite sides of the first aperture; and third and fourth supports extending between the hinge axis and the second button on opposite sides of the second aperture.

33. The computer input device of claim 32 wherein the hinge assembly comprises:

a connection portion fixedly connected to the housing, the connection portion having a hinge axis region of resilient material defining the hinge axis.

34. The computer input device of claim 33 wherein the hinge axis region comprises an area of reduced thickness material, reduced relative to a thickness of material in the connection portion.

* * * * *

UNITED STATES PATENT AND TRADEMARK OFFICE
CERTIFICATE OF CORRECTION

PATENT NO.    : 6,281,881 B1
DATED         : August 28, 2001
INVENTOR(S)   : Siddiqui et al.

It is certified that error appears in the above-identified patent and that said Letters Patent is hereby corrected as shown below:

Title page,
Item [56], References Cited, U.S. PATENT DOCUMENTS, add
-- 5,446,481, 8/1995, Gillick et al.........345/163 --

Column 10,
Lines 29 and 32, replace "158" with -- 168 --.
Line 48, replace "162" with -- 176 --.
Line 63, replace "184" with -- 183 --.

Column 14,
Line 32, replace "114" with -- 110 --.
Line 39, replace "101" with -- 100 --.
Line 47, replace "proses" with -- pulses --.

Column 16,
Line 35, replace "108" with -- 113 --.
Line 37, replace "110 or 112" with -- 104 or 105 --.
Line 43, replace "cover" with -- corner --.

Column 15,
Line 42, replace "110" with -- 104 --.
Line 43, replace "112" with -- 105 --.

Column 21,
Line 59, replace "oh" with -- on --.

Column 22,
Line 38, replace "107" with -- 116 --.
Line 39, replace "110 or .12" with -- 104 or 105 --.

Column 24,
Line 60, replace "10I6" with -- 106 --.
Line 63, replace "105" with -- 109 --.

UNITED STATES PATENT AND TRADEMARK OFFICE
CERTIFICATE OF CORRECTION

PATENT NO.    : 6,281,881 B1
DATED         : August 28, 2001
INVENTOR(S)   : Siddiqui et al.

It is certified that error appears in the above-identified patent and that said Letters Patent is hereby corrected as shown below:

Column 25,
Line 57, replace "230" with -- 330 --.

Column 26,
Line 67, replace "descried" with -- described --.

Column 28,
Line 18, replace "110" with -- 104 --.

Column 31,
Line 11, replace "110" with -- 104 --.
Line 28, replace "110 and 112" with -- 104 and 105 --.
Line 43, replace "105" with -- 106 --.

Column 36,
Line 51, replace "claims" with -- claim --.

Signed and Sealed this

Eleventh Day of March, 2003

JAMES E. ROGAN
*Director of the United States Patent and Trademark Office*